INVENTOR.
DALTON H. PRITCHARD
BY
Floyd M. Harris
ATTORNEY

INVENTOR.
DALTON H. PRITCHARD
BY
Floyd M. Harris
ATTORNEY

GRAPHS FOR SCREEN OF FIG. 3.

INVENTOR.
DALTON H. PRITCHARD
BY
Floyd M. Harris
ATTORNEY

INVENTOR.
DALTON H. PRITCHARD
BY
Floyd M. Harris
ATTORNEY

INVENTOR.
DALTON H. PRITCHARD
BY
Floyd M. Harris
ATTORNEY

INVENTOR.
DALTON H. PRITCHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 7

INVENTOR.
DALTON H. PRITCHARD
BY Floyd M. Harris
ATTORNEY

INVENTOR.
DALTON H. PRITCHARD
BY Floyd M. Harris
ATTORNEY

INVENTOR.
DALTON H. PRITCHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 10

$$V = V_0\left\{1+\frac{\gamma}{1.3}\left[\sin\omega t - \tfrac{1}{2}\sin 2\omega t\right]\right\}$$

$$V = V_0\left\{1+\frac{\gamma}{1.3}\left[\sin\omega t - \tfrac{1}{2}\sin 2\omega t\right]\right\}$$

INVENTOR.
DALTON H. PRITCHARD
BY
Floyd M. Harris
ATTORNEY

CHROMATICITY DIAGRAM FOR SCREEN OF FIG. 10.

INVENTOR.
DALTON H. PRITCHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 12

INVENTOR.
DALTON H. PRITCHARD
BY
Floyd M. Harris
ATTORNEY

INVENTOR.
DALTON H. PRITCHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 14

INVENTOR.
DALTON H. PRITCHARD
BY
Floyd M. Harris
ATTORNEY

INVENTOR.
DALTON H. PRITCHARD
BY Floyd M. Harris
ATTORNEY

INVENTOR.
DALTON H. PRITCHARD
BY
Floyd M. Harris
Attorney

INVENTOR.
DALTON H. PRITCHARD
BY
Floyd M. Harris
ATTORNEY

NOTE:- $S_1$ TO $S_5$ INDICATE THE STAGES IN LAYING DOWN THE SCREEN LAYERS.

INVENTOR.
DALTON H. PRITCHARD
BY
Floyd M. Harris
Attorney

INVENTOR.
DALTON H. PRITCHARD
BY
Floyd M. Harris
ATTORNEY

INVENTOR.
DALTON H. PRICHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 21

INVENTOR.
DALTON H. PRITCHARD
BY
Floyd M. Harris
Attorney

INVENTOR.
DALTON H. PRITCHARD
BY
Floyd M. Harris
ATTORNEY

Aug. 31, 1965 D. H. PRITCHARD 3,204,143

PENETRATION COLOR SCREEN, COLOR TUBE, AND COLOR TELEVISION RECEIVER

Filed May 8, 1961 24 Sheets-Sheet 23

INVENTOR.
DALTON H. PRITCHARD
BY Floyd M. Harris
Attorney

INVENTOR.
DALTON H. PRITCHARD
BY
Floyd M. Harris
Attorney

United States Patent Office 3,204,143
Patented Aug. 31, 1965

3,204,143

PENETRATION COLOR SCREEN, COLOR TUBE, AND COLOR TELEVISION RECEIVER

Dalton H. Pritchard, Princeton, N.J., assignor to Radio Corporation of America, a corporation of Delaware Filed May 8, 1961, Ser. No. 108,565
30 Claims. (Cl. 315—13)

TABLE OF CONTENTS

| | Column No. |
|---|---|
| Introduction | 1 |
| Three considerations for television | 2 |
| Objects of the invention | 2 |
| A specific example | 2 |
| General discussion of the invention | 3 |
| Brief description of drawings | 4 |
| FIGURE 1*a* embodiment and screen of FIGURE 3 | 6 |
| FIG. 1*a* embodiment using screen of FIG. 3 | 6 |
| General description of FIG. 3 screen | 7 |
| Beam energy absorption graphs of FIG. 4 and general discussion of the invention | 9 |
| FIG. 1*a* embodiment further described | 12 |
| Use of converters | 13 |
| Further details of FIG. 3 screen | 14 |
| Description referring to graphs of FIGS. 4 to 7 | 15 |
| Chromaticity diagram for FIG. 3 screen | 17 |
| General design procedure for FIG. 3 screen | 18 |
| Layer thickness calculations of FIG. 3 screen | 20 |
| Color gamut calculations for FIG. 3 screen | 24 |
| Discussion of color gamut of FIG. 3 screen | 25 |
| Forming phosphor layers and separator layers | 26 |
| FIG. 2*a* embodiment and screen of FIG. 10 | 26 |
| FIG. 2*a* embodiment and switching with 2nd harmonic distorted wave | 26 |
| Description of FIG. 10 screen | 27 |
| Laying down layers to specified thicknesses | 29 |
| Checking relative conversion efficiencies | 31 |
| Operation of FIG. 2*a* embodiment further described | 31 |
| Two-color screens | 33 |
| Examples including screen of FIG. 18 | 33 |
| Evaporated layer screen of FIG. 24 | 35 |
| Simultaneous beam operation | 38 |
| A screen designed for simultaneous beam operation | 38 |
| Screen calculations (modifying FIG. 3 screen) | 39 |
| A graphical design procedure | 40 |
| The three-color screen of FIG. 31 | 42 |
| Description of FIG. 31 screen | 42 |
| Discussion of mass thickness variations | 43 |
| Definition of quality as to uniformity of mass thickness | 46 |
| Use of guide screen to lay down layers | 46 |
| Chromaticity diagram of FIG. 31 screen | 52 |
| A procedure for measuring mass thicknesses | 53 |
| Details of putting down layers by Kell's process | 54 |
| Operation using screen of FIG. 31 | 56 |
| Multiple-coated-particle screens | 59 |
| Simultaneous beam operation with a three-gun tube | 61 |
| Single-color-emitting-particle screens | 63 |
| Conclusion | 64 |
| Claims | 65 |

*Introduction*

This invention relates to the production of color pictures or images, and particularly to improved screens of the type comprising phosphor layers or elements each of which emits light of a particular color as a function of the velocity of electrons penetrating the screen, and to improved methods and apparatus utilizing in a cathode ray tube a screen of this type. Such screens may be referred to as electron penetration type screens.

It has been proposed by others that a color picture may be obtained by use of a screen having different phosphors in layers and by velocity modulating an electron beam which scans the screen. These earlier proposals have resulted in apparatus that requires a large variation or difference in beam velocity to effect the desired color change, or in apparatus that does not produce a color picture having a satisfactory color gamut, or in apparatus that has both of these objectionable features.

*Three considerations for television*

In color television receivers utilizing electron penetration techniques, there are three considerations, one or two of which may be relaxed somewhat where the invention is to be employed for other than television use. The three considerations are:

(1) The apparatus should not require a large voltage change or voltage difference in electron beam velocity to effect the desired color changes. In terms of voltage, the percentage modulation of the beam voltage should be low. This, as stated in percentage modulation, is on the assumption that the cathode ray tube has a single electron gun, and that the electron beam is sequentially switched to different beam voltages. For a multiple gun tube with simultaneous multiple beam operation the consideration is the same, but it is expressed in the difference in the beam voltages rather then in percentage modulation. The consideration as to beam voltage difference applies to both three-color and two-color screens.

(2) The colors obtained from a three-color screen should add to give substantially while light when there is no chrominance signal applied to the apparatus. This is also generally true as to a two-color screen, although an off-white such as yellow may be acceptable in some cases.

(3) The apparatus must produce a picture having an acceptable color gamut. In the case of a three-color screen the gamut preferably should include most of the portions of the color gamut found in nature to which the eye is subjectively most critical. In the case of a two-color screen such a color gamut cannot be obtained, and a comprise must be accepted.

*Objects of the invention*

An object of the invention is to provide improved color picture reproducing apparatus of the type employing electron penetration type screens which recognizes the above three considerations.

A further object of the invention is to provide an improved method of and means for producing color images on a cathode ray tube screen.

A still further object of the invention is to provide an improved cathode ray tube for producing color images.

A still further object of the invention is to provide an improved phosphor screen of the electron penetration type for producing color images.

*A specific example*

One specific example of the invention, as applied to the production of a three-color picture, utilizes a multilayer screen which comprises three phosphor layers separated by inert layers (i.e., non-luminescent layers). A red color producing phosphor is on the electron gun side of the screen. On the inside surface of the glass face of the tube there is a blue color producing phosphor. The middle phosphor layer is a green color producing phosphor. All these layers, including the intervening inert separator layers, are translucent to light.

The two phosphor layers on the gun side of the screen should have a particular thickness depending upon the mass of the phosphor and depending upon the complete design, including grading of the conversion efficiencies of the phosphors, as will be described hereinafter. These two layers should be substantialy free from holes or cavities through which electrons can pass without striking energy absorbing material. They may take the form of evaporated phosphor layers, for example, or preferably of fine phosphor powder layers which will be described hereinafter. The inert separator layers likewise should be substantially free from holes or cavities through which electrons can pass without striking energy absorbing material.

While the thickness of the phosphor layer on the face plate is relatively less critical, it should have at least a minimum thickness as determined by the complete design. Also, it need not be as dense or free from holes as the other layers.

This is one example of a screen structure that can be so designed that it can be operated to meet the above-specified three considerations. As to the percentage modulation of the electron beam voltage, in this example it is only of the order of twenty or twenty-five percent. For example, a voltage of 16,000 volts (16 kv.) may be employed with a 20 percent sine wave modulation to give a peak-to-peak variation of from 12.8 kv. to 19.2 kv. A good black and white picture will be reproduced when the luminance signal only (no chrominance signal) is applied to the cathode ray tube. With both luminance and chrominance signals applied, a color picture is reproduced that has an acceptable color gamut.

*General discussion of the invention*

It might apear that in an electron penetration tube most of the electron beam energy should be absorbed in the phosphor layer from which light of the desired color is emitted. Contrary to this one of the features of the present invention is that this is true only of the layer on the gun side of the screen. When the beam is switched (assuming a single-gun tube, for example) to the middle layer, more of the beam energy is absorbed in the layers lying between the middle phosphor layer and the gun surface of the screen than in the middle phosphor layer. The same is true for the phosphor layer on the face plate. When the beam is switched to the face plate layer, more of the beam energy is absorbed in the layers lying between the face plate phosphor layer and the gun surface of the screen than in the face plate phosphor layer. The same principle of beam energy distribution and absorption in the screen layers prevails in both the embodiment of the invention using a single-gun tube and the embodiment using a plurality of simultaneously operated electron guns.

This feature of the invention accounts in large part for the low percentage beam voltage modulation that may be employed and it is made possible by the screen structure, including the grading of the conversion efficiencies of the phosphors as discussed hereinafter. The screen structure and the percent beam modulation or beam voltage difference depend one upon the other.

As will be discussed in the detailed description, the relative conversion efficiencies of the phosphor layers and the use of separator layers should be properly selected, and also the proper mass thickness relative to the conversion efficiency grading. The "mass thickness" is the thickness multiplied by the density $\rho$ of the material. A higher relative conversion efficiency for a phosphor permits less mass thickness for that phosphor with a resulting reduction in the percentage modulation of the electron beam required for a given color gamut. The color order of the phosphor layers is important. Also, the wave form of the beam switching wave should be considered, in the case of the single gun tube, with respect to the phosphor layers.

In the foregoing part of the description referring to beam switching or percentage modulation, it has been assumed that a single gun cathode ray tube is used, and that the velocity of the electron beam is changed at a rate sufficiently rapid to obtain the desired colors from the several phosphor layers without color flicker. As previously indicated, instead of velocity modulating the electron beam in a single gun tube, a two or three gun may be used in which the separate beams are each operated at different fixed velocities. Two guns would be used to provide two beams, if a two-color system is desired, and three guns would be used to provide three beams if a three-color system is desired, for example. When simultaneous beam operation is employed, there need be no modulation of the beam velocities. However, it is still desirable that there be no requirement for an unusually high beam voltage such as a 40 kv. or 50 kv. For one specific example described hereinafter, the three beams in a three-gun tube may have, respectively, velocities of 12.8 kv., 16.0 kv. and 19.2 kv.

In the foregoing specific example of a screen structure, it is assumed that the screen is formed by laying down each layer across the entire face plate. As will be described hereinafter, a screen may be made by suitably coating particles, and then settling or otherwise depositing the particles on the face plate to form the color screen. For example, blue phosphor particles may be coated with a first separator layer, a green phosphor layer, a second separator layer, and a red phosphor layer, the layers being one on top of the other in the order named. The coated phosphor particles may then be deposited on the cathode ray tube face plate to form the screen.

Three-color television picture tubes made in accordance with the present invention provide a satisfactory color gamut when operated at commercially acceptable voltages, while making possible the attainment of important economies in the manufacture of three-color tubes.

*Brief description of drawings*

The invention will be described in detail with reference to the accompanying drawing in which:

FIG. 9*b* is a group of graphs based on electdon beam penetration that may be used in determining the thickness of the screen during the process of building up a multilayer screen layer by layer;

*FIG. 1a embodiment and screen of FIG. 3*

FIG. 1*a* EMBODIMENT USING SCREEN OF FIG. 3

In FIG. 1*a* an embodiment of the invention is illustrated as applied to a television receiver. However, the invention is not limited to television. It may be applied to other displays where a color image display is desired. As applied to television, for example, the apparatus of FIG. 1*a* comprises a cathode ray tube 10 which has on its viewing face a translucent multilayer phosphor screen 11. On the electron gun side of the screen 11 there is an electron-transparent light-opaque aluminum coating 12 referred to as a backing layer. Adjacent to the phosphor screen 11 there is a fine mesh metal screen 13. The remaining tube structure may be that found in conventional cathode ray tubes used in black and white television receivers.

Figures 1A, 1B:
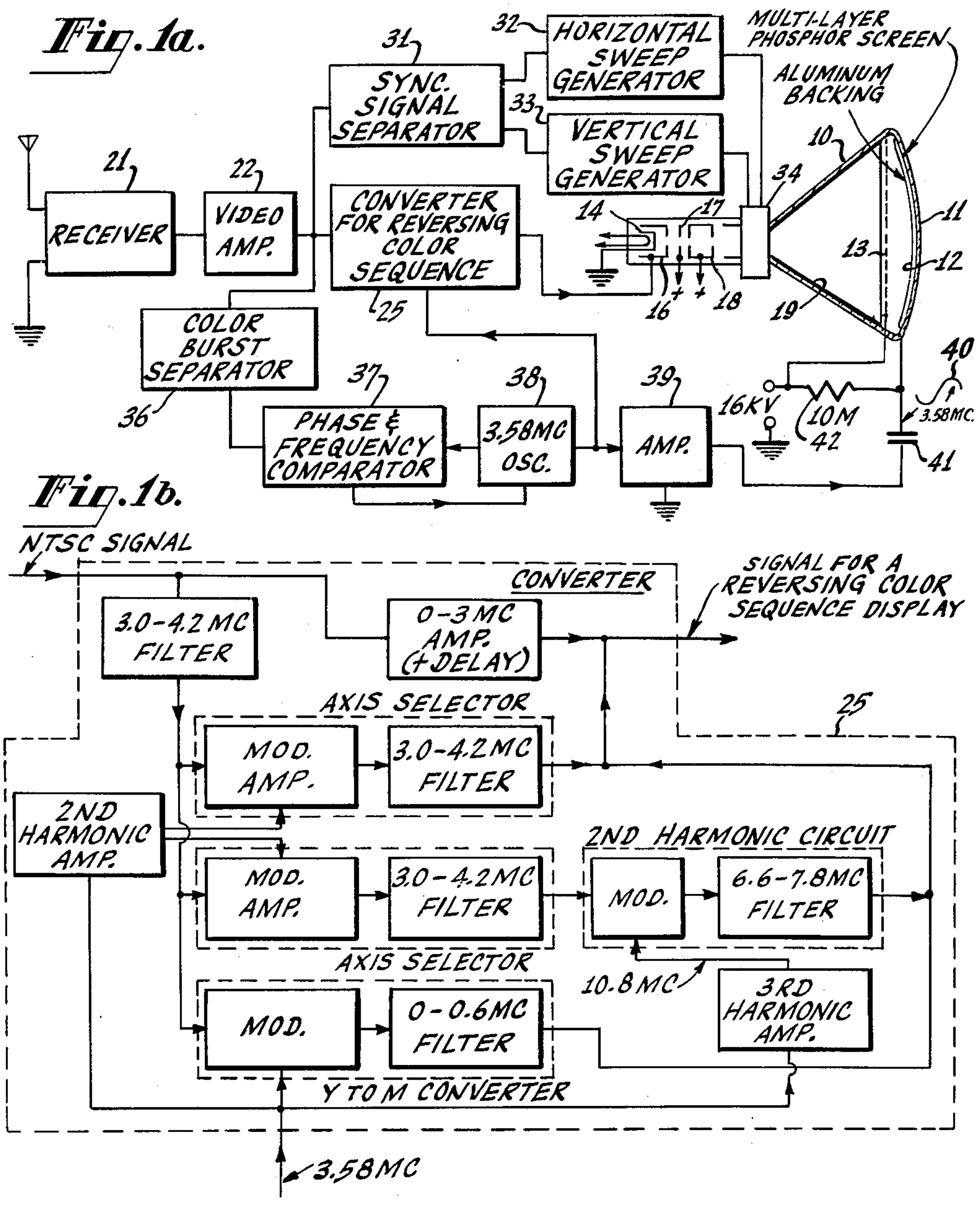
FIG. 1*a* is a block diagram of a television receiver embodying the invention.
FIG. 1*b* is a block diagram of a signal converter that is included in the diagram of FIG. 1*a*.

In the example illustrated, the cathode ray tube includes an indirectly heated cathode 14, a control grid 16, a screen grid 17, a first anode 18, and a second anode 19 in the form of an aquadag coating. The anode 19 is electrically connected to the mesh screen 13. The assembly of electrodes 14, 16, 17 and 18 is referred to as the electron gun.

Figure 3:
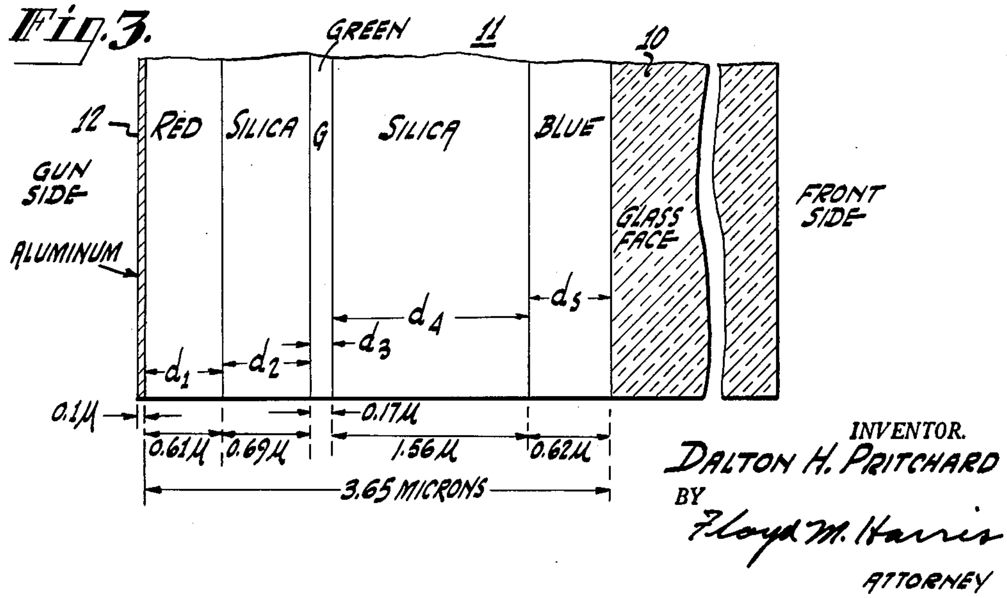
FIG. 3 is a view in cross section, greatly enlarged, of a multilayer screen embodying the invention.

In the following description, several examples of the invention will be given. These examples will include examples of satisfactory multilayer phosphor screens. In the first example, it will be assumed that the screen of FIG. 3 is the multilayer phosphor screen 11 in FIG. 1*a*. This screen is designed for use with an electron beam having a center voltage of 16 kv. which is sine wave modulated 20 percent. Thus, the beam voltage varies from a minimum peak voltage of 12.8 kv. to a maximum peak voltage of 19.2 kv. In the embodiment of FIG. 1*a*, the frequency of the modulating sine wave is the frequency of the color sub-carrier specified in present color television signal standards, that is 3.579545 megacycles per second (generally referred to as 3.58 megacycles) which is an odd multiple of ½ line frequency although it may be a whole number multiple of 3.58 megacycles per second. Also, if preferred, one of the other well known sequential operations may be employed, such as switching at the horizontal line rate or at the field rate.

GENERAL DESCRIPTION OF FIG. 3 SCREEN

The screen of FIG. 3, and the screen of FIG. 10 described later, have their phosphor and separator layer thicknesses calculated on the basis that these layers have substantially the same characteristics with respect to electron beam penetration and electron beam energy distribution as a metal foil or an evaporated phosphor layer. This is a reasonable and practical basis for calculation that permits use of information available in the art regarding beam penetration and beam energy distribution.

As a practical matter, in building the screen of FIG. 3 (and the screen of FIG. 10) it is presently preferred to make the phosphor layers of fine phosphor powders because they have high efficiency and can be laid down expeditiously.

Figure 10:
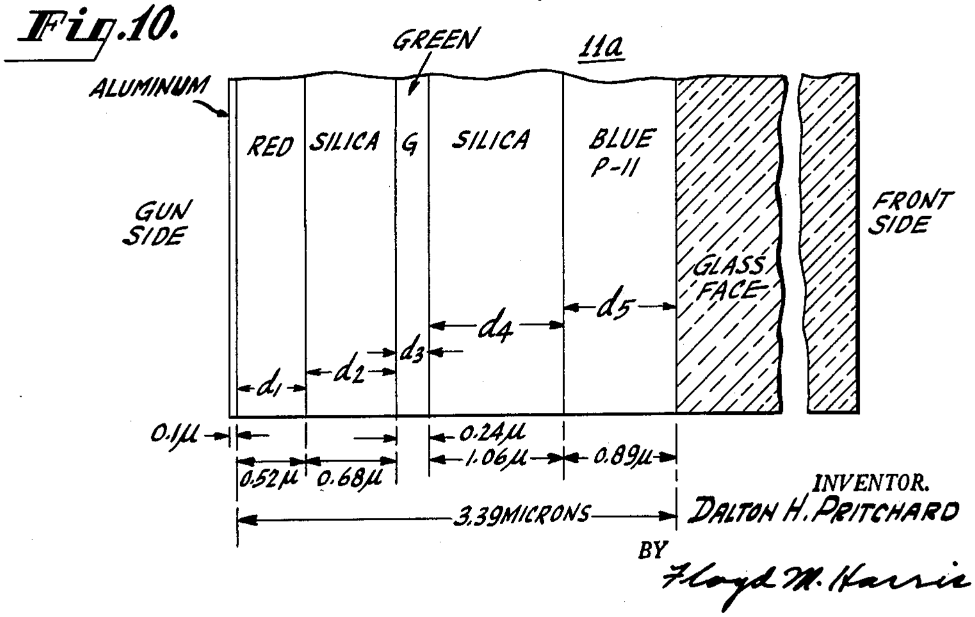
FIG. 10 is a view in cross section, greatly enlarged, of another multilayer screen embodying the invention.

When screens are built based on FIGS. 3 and 10 using layers of fine powder phosphors, the mass thicknesses of the fine powder phosphor layers may be different from the calculated thicknesses because of departures from layers characteristics taken as a basis for the calculations.

Thus, with respect to such fine phosphor powder layer screens, the screens of FIGS. 3 and 10 serve as pattern screens. For example, as described in detail hereinafter, the screen of FIG. 31 was built up with fine phosphor powder layers by using the screen of FIG. 10 as a pattern screen.

In the following description of FIG. 3 (and of FIG. 10) the use of fine powder layers is specified, but, as previously indicated, for the purpose of calculation (and for the purpose of simplifying the explanation of the invention) these layers are assumed to have substantially the same characteristics as a metal foil or an evaporated phosphor layer so far as beam penetration and beam energy distribution are concerned. Therefore, the layer thicknesses that will be given for the screens of FIG. 3 and FIG. 10 are the thicknesses calculated on that basis.

The particular screen structure shown in FIG. 3 consists of three layers of phosphors which emit red, green and blue light, respectively, when energized. In this structure the three phosphors are similar to the P22 phosphors used in the RCA shadow-mask color tube types 21AXP22 and 21CYP22A; the red, green and blue have the same spectral distribution as the P22 phosphors, but the structure of the red and green layers particularly is substantially different in that, as described hereinafter, the phosphor particles are very fine and densely packed. The phosphor layers are separated by layers of inert material. By inert material is meant material that does not emit any substantial amount of light when bombarded by the electron beam. In the specific example illustrated, the separator material is considered to be colloidal silica such as that sold by Du Pont under the trade name of Ludox and identified as "Technical Grade, HS, 150 Angstrom Size." However, in similar alternative arrangements the separator material may be some other inert material such as fine powder mica. It is not necessary that all separator layers of a screen be of the same material. For example, one layer may be of colloidal silica and another layer of fine powder mica.

In making the screen of FIG. 3 the blue phosphor layer may be formed or deposited on the face of the cathode ray tube envelope. This phosphor layer is the front or base phosphor. This may be done by a settling process, a slurry process or by the Kell absorption process, for example, as will be described later. The phosphor particles for the front layer (in this case the blue layer) may be smaller than in the usual settled screen, but should be large enough to retain the desired efficiency for the phosphor. For the front phosphor layer, considerable latitude as to the particle size is permissible since the electrons do not pass through it and on to other phosphor layers. Therefore, since the front layer can be made rather thick it does not matter that the front layer contains some cavities free from phosphor material. The front layer (blue) should have sufficient thickness so that no appreciable number of electrons penetrate through it, while, at the same time, it should have the degree of translucence desired. For example, it may be approximately eighty to ninety percent translucent to diffused light.

On the top of the blue phosphor there is formed a separator layer of silica or other inert material. This is a layer formed so that it is substantially uniform and free from holes or cavities through which beam electrons can pass without striking the layer material.

Next a layer of green phosphor is formed on the inert layer. This phosphor layer is formed of very fine phosphor powder, much finer than phosphors used for settled screens. This middle phosphor layer is substantially free from holes or cavities through which beam electrons can pass without striking energy absorbing material.

Next an inert separator layer is formed on the green layer. This second separator layer is the same as the first separator layer except for its mass thickness.

Next the red phosphor layer is formed on the second separator layer. The red phosphor layer, like the green layer, is formed of very fine phosphor particles. Like the green layer, it is substantially free from holes or cavities through which electrons can pass without striking energy absorbing material.

Except for the front layer (the blue layer) it is important that all the layers have good large area uniformity in the sense that a layer should not have thin spots and thick spots that would result in lack of uniform electron energy absorption as the electron beam scans the screen. Also, they should have good small area uniformity in the sense that each electron in an electron beam, for example, should encounter approximately the same amount of material as it passes through the layer.

Finally, on top of the red phosphor layer there is formed thin electrically conducting backing layer such as a layer of aluminum about 0.1 micron thick. This may be a standard backing layer commonly used to provide an opaque light reflecting background. The thickness of the aluminum may be that for a normal aluminum backing as anywhere from 0.05 to 0.15 micron, for example.

The calculated thicknesses of the several screen layers are shown in microns in FIG. 3. One micron=0.001 millimeter. These thicknesses are, in the order from front to back:

| | Microns |
|---|---|
| Blue phosphor | 0.62 |
| Separator | 1.56 |
| Green phosphor | 0.17 |
| Separator | 0.69 |
| Red phosphor | 0.61 |

It should be noted that for the purpose of making the screen, the thicknesses preferably are specified either in terms of grams or milligrams of material per square centimeter, or in terms of the beam voltage required to penetrate the layer. The required material in grams per square centimeter is the thickness of a layer in microns times $10^{-4}$ multiplied by its density $\rho$, where $\rho$ is given in grams per cubic centimeter as it is throughout the specification.

In addition to the character of the two separator layers and of the two phosphor layers on the gun side of the screen, and in addition to the particular mass thicknesses of the several layers, there are certain other screen design characteristics to be noted. In the screen of FIG. 3 the phosphor layers are laid down on the face plate in the order of their conversion efficiency, i.e., their efficiency in converting beam energy to the desired light. In the phosphors referred to above, the blue phosphor is the most efficient, the red phosphor the least efficient, and the green phosphor has an efficiency intermediate those of the blue and red phosphors. This order is advantageous in some screen designs. However, in some screens the front (blue) phosphor layer may be of about the same efficiency as the middle layer or be less efficient than the middle layer. In any case, the least efficient of the phosphors used, or the phosphor having the lowest effective conversion efficiency as explained hereinafter, should be placed on the back or gun-side of the screen in order to operate with minimum beam voltage change or voltage difference in electron beam velocity and obtain an optimum color gamut.

Another characteristic to be noted is the color order of the phosphors. As will be explained later, the best color gamut with present day commercial phosphors is obtained by the order shown in FIG. 3, namely red, green, and blue reading from the gun side to the front of the screen. One advantage in using this color order is that colors such as flesh tones, which are important in providing a satisfactory subjective impression of a good color reproduction in television, can be accurately reproduced by including these colors within the available color gamut.

It may be noted that, if desired, a screen made in accordance with the invention may have a substantial amount of inert material between the electron source and the phosphor that is to be excited by the comparatively low velocity electrons. For example, in a screen similar to that just described, a layer of inert material (similar to a layer of separator material) might be put on top of the red phosphor layer before the screen is aluminized. Such an inert layer has substantially the same effect, as that of reducing the efficiency of the red phosphor. Also, it increases the electron beam voltage at which the red appears. This increase in beam voltage might be advantageous if at a lower beam voltage blooming would result from increasing the beam current sufficiently to obtain the desired screen brightness. In the screen examples that will be described, such an inert layer on top of the red layer is unnecessary, and its use would reduce the amount of light available from the screen. It will be understood that in these screen examples the aluminum backing layer, which is assumed to have a commonly used thickness of about 0.1 micron, is a layer of inert material. However, its mass thickness value is small enough so that it has only a small effect on the beam voltage required. For example, its presence may increase the minimum beam voltage by 600 or 700 volts and increase the maximum beam voltage by 200 or 300 volts over what would be required if the backing layer were omitted and a conductive coating on the face plate were used instead. These voltage increases have substantially no effect on the color gamut. In the example of the invention employing multiple coated particles described hereinafter, it is stated that after the final phosphor layer (red) has been put down the particles may be coated with a protective layer of hardened gelatin. Such a protective coating is so thin that it has almost no beam energy absorbing property, and, furthermore, it is baked out in processing the tube.

BEAM ENERGY ABSORPTION GRAPHS OF FIG. 4 AND GENERAL DISCUSSION OF THE INVENTION

Figure 4:
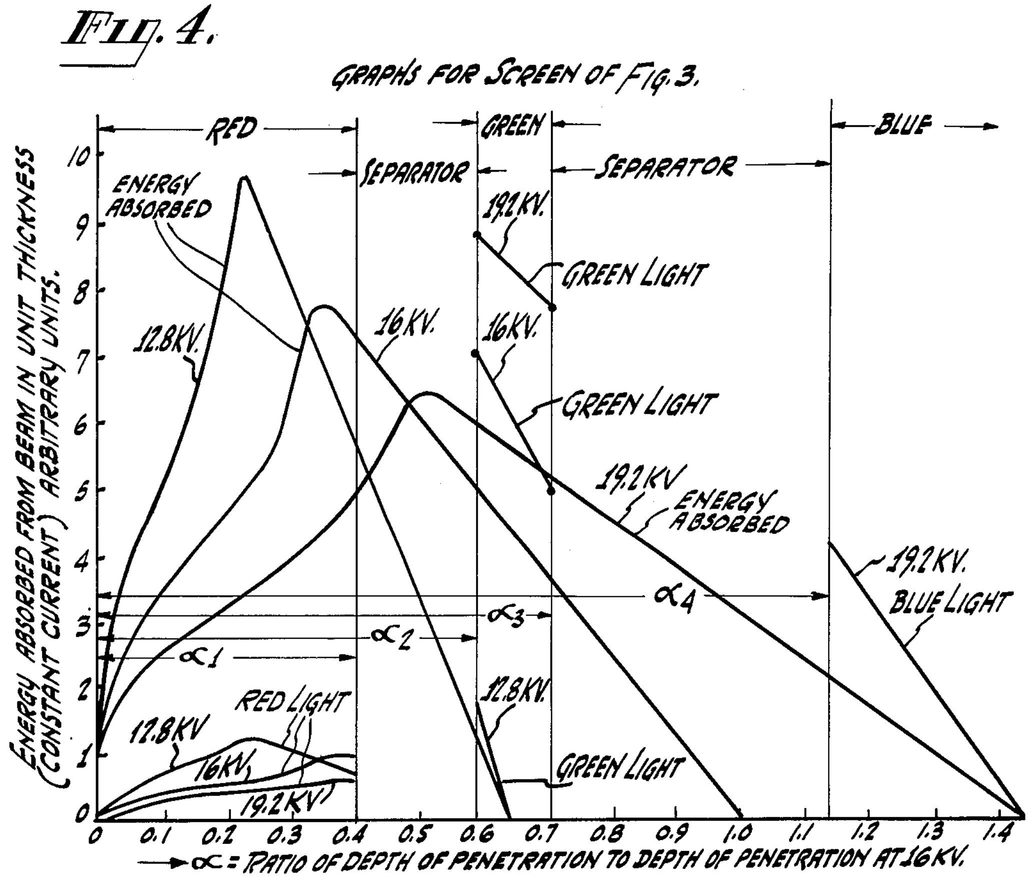
FIG. 4 is a group of graphs showing electron beam energy absorption and light output at three beam voltages for the screen of FIG. 3.

FIG. 4 shows one of the important characteristics of the present invention. This graph shows the energy that the screen of FIG. 3 absorbs from the electron beam at different depths in the screen for three different beam voltages. The three assumed voltages are the center voltage of 16 kv., and the minimum and maximum peak voltages of 12.8 kv. and 19.2 kv., respectively, for the case of 20 percent modulation. Constant beam current is assumed. Graphs for intermediate voltages of the sine wave modulated 16 kv. beam are not shown. The abscissa of the graphs is the ratio of the depth of beam penetration (i.e., the depth below the surface of beam incidence) to the depth of penetration for the electron beam at 16 kv. The depth of penetration is measured in units of mass thickness. The "mass thickness" is the thickness multiplied by the density $\rho$ of the material. For the purpose of drawing the beam energy absorption graphs it is assumed that the phosphor and inert materials of the screen have uniform density from front to back. It will be noted that for the 16 kv. graph the abscissa for maximum penetration is necessarily 1.0, i.e., substantially no beam electrons penetrate the screen beyond this point. It will also be noted that since the abscissa figures are for a ratio of mass thicknesses, they are not the same as the thickness figures given in microns in FIG. 3. In FIG. 4, the abscissa values for the screen at different interfaces are represented by $\alpha_1$,$\alpha_2$, $\alpha_3$ and $\alpha_4$. These values of $\alpha$ are measured, respectively, from the beam inpact surface to the viewing side of the red phosphor layer, to the gun and viewing sides of the green phosphor layer, and to the gun side of the blue phosphor layer.

FIG. 4 shows that at the low beam voltage of 12.8 kv. most of the beam energy is absorbed in the red phosphor layer to produce red light. (The amount of energy absorbed is measured by the area under the graph.) It will be noted that in this instance some beam electrons just penetrate the green phosphor layer, but not enough to degrade the red color.

At the center beam voltage of 16 kv. which is to produce subjectively green light, there is enough beam energy absorbed in the green phosphor layer to produce the necessary amount of green light. The total amount of green light contributed to the total light emitted by the screen is that averaged over the complete voltage modulation cycle. This total amount should be such that (for the condition of no chrominance modulation of the beam) when mixed with the other two colors, there will be produced a white light. If this switching voltage of 16 kv. more of the beam energy is absorbed in the multilayer screen on the gun side of the green phosphor layer than in the green layer. Specifically, in this example the area under the 16 kv. graph in the red layer and the separator layer is much greater than the area under the graph in the green phosphor layer. The green color produced by the green phosphor will be degraded somewhat by red light but with the beam at 16 kv. the resulting light subjectively is green. The amount of degradation of the green color is much less than would appear from the beam energy absorption graph because the conversion efficiency of the green phosphor is greater than that of the red phosphor. In this example the conversion efficiency of the green phosphor is 11.7 times that of the red phosphor. The result is that at a beam voltage of 16 kv. much more green light is obtained than red light. This is shown by the light output graphs in FIG. 4 where the area under these graphs represents the light output.

At the high beam voltage of 19.2 kv. which is to produce subjectively blue light, enough of the beam energy is absorbed in the blue phosphor to produce the necessary amount of blue light from the blue phosphor which, when mixed with the red light from the red phosphor and the green light from the green phosphor, during a modulation cycle, will produce a white light. As in the case of switching to the green phosphor, more of the beam energy is absorbed in the screen layers on the gun side of the blue layer than in the blue phosphor layer itself. A large part of the beam energy is absorbed in the inert separator layers which, of course, do not emit any light. The blue light emitted by the blue phosphor is degraded somewhat both by the green light and by the red light. However, subjectively, the resulting light is blue.

It should be remembered that the multilayer screen of FIG. 3 is designed for operation with a 16 kv. beam that is 20 percent modulated by a voltage having a sine wave form. It follows that the graphs of FIG. 4, while correct, do not give the complete story. Specifically, graphs are shown for only three beam voltages, the center voltage and the minimum and maximum voltages. Actually the beam voltage varies sinusoidally from the minimum peak voltage of 12.8 kv. to the maximum peak voltage of 19.2 kv. Therefore, the graphs for the light output show only in approximate fashion the relative amounts of red, green and blue light.

Preferably by mathematical calculation, example of which will be given, the layer thicknesses for specified materials and operating conditions are determined so that the total red light produced during a complete modulation cycle, the total green light produced during a complete modulation cycle, and the total blue light produced during a complete-modulation cycle will add to produce a white light, assuming there is no color modulation of the electron beam i.e., no chrominance signal is being applied. It will be understood that this color addition is done by the eye because of persistence of vision as well as by the persistence of emission of the phosphor materials. If large beam voltage differences were used in switching into the middle layer (green) and into the front layer (blue) the beam energy absorption graphs (FIG. 4) would be shifted greatly with respect to each other, as, for example, they would be shifted enough so that their peaks are widely separated or even centered in the various phosphor layers. Such shifting of the absorption graphs would reduce color cross talk but it would require impractical beam voltage differences. Therefore, the requirement for a low switching voltage or small beam voltage difference establishes the prerequisite that the beam energy absorption graphs for the beam at the different voltages will be shifted only slightly with respect to each other, leaving considerable overlap, their peaks not being widely separated. This prerequisite is illustrated by the three graphs in FIG. 4 labeled "Energy Absorbed."

For a color screen to be satisfactory, it must comply with certain requirements. One of these is that the screen must be able to produce a picture having satisfactory color gamut. In the case of a three-color screen built for television purposes, such as for home receivers, a further requirement is that the three colors should add to produce white light when there is no color information on the signal modulating the electron beam or beams.

The problem is how to meet the requirements of a satisfactory color gamut, and (in the case of the three-color television screen) the requirement of a white light mix of the three colors, when the low switching voltage and the above-described resulting overlap of the energy absorption graphs are specified as prerequisites. In the present invention these requirements are met in part by the use of comparatively high efficiency phosphors for the middle phosphor (green) and for the viewing-side phosphor (blue), which have the proper mass thickness relationships, and which are so positioned (by the use of separator layers) on the back slopes of their respective beam energy absorption curves that less beam energy is absorbed in the phosphor layer switched into than in the layers between it and the gun-side surface of the screen. This energy absorption distribution is illustrated in FIG. 4 where the 16 kv. graph shows that the greater part of the 16 kv. beam energy is absorbed in the screen on the gun side of the middle (green) phosphor layer and where the 19.2 kv. graph shows that the greater part of the 19.2 kv. beam energy is absorbed in the screen on the gun side of the viewing-side (blue) phosphor layer.

Here it may be noted that light output from a given phosphor is a function of the beam energy absorbed by it and is at least approximately directly proportional to the energy absorbed. The light output of a given phosphor is also a function of its conversion efficiency.

To explain further how the requirements for a satisfactory color screen are met, it will be noted, referring to FIG. 4 that, particularly in a three-color screen, the phosphor layer (blue) farthest from the gun side has only a small part of the beam energy absorbed in it when using a low switching voltage. Therefore, the conversion efficiency of this layer is to be high enough so that, even with this small percentage absorption of the beam energy, the desired amount of light from this layer (relative to light from other layers) can be produced. This means that the conversion efficiency of this layer is to be greater than that of the phosphor layer (red) on the gun side of the screen.

The middle phosphor layer (in the case of the three-color screen) is to have a small mass thickness to contribute toward keeping the switching voltage low. Therefore it can absorb only a small part of the beam energy. Furthermore, the amount of beam energy that can be absorbed by the middle phosphor layer (green) is further limited by the fact that the peak of the beam energy absorption graph is (in FIG. 4, the 16 kv. graph) on the gun side of this layer. Because of the small amount of the beam energy that is to be absorbed in the middle phosphor layer, for this layer to produce enough light relative to light from other layers the conversion efficiency of this layer also should be greater than that of the phosphor layer (red) on the gun side.

Since a beam energy absorption curve has front and back sloping portions of substantial extent, there will be some color cross-talk. In general, the less the color cross-talk, the better the color gamut. This cross-talk is minimized (and the maximum color gamut obtained) by the overall design including the conversion efficiency grading and including the use of the inert separators to properly position the phosphor layers with respect to the beam energy absorption distribution. As to the separators, for example, referring to FIG. 4, the presence of a separator layer between the red and green layers positions the green layer almost entirely out of the absorption curve for 12.8 kv. when the beam is switched into red. Also, the presence of this separator layer minimizes the amount of red that is present when the beam is switched into green.

It is evident that a screen constructed in accordance with the foregoing principles will still give some color cross-talk. However, it has been discovered that an optimum combination of the foregoing principles can provide screens having a good color gamut, particularly if care is taken in selecting the color order of the phosphor layers.

For television purposes the order of red, green, blue (reading from the gun side) is preferred because, as previously mentioned, colors to which the eye is subjectively most critical, such as flesh tones, can be accurately reproduced. This order is also preferred because subjectively the color acuity of the eye is less sensitive to chromaticity differences in green than to chromaticity differences in other colors. Therefore, when the beam is switched into green, the fact that there is also a small amount of red light present is not particularly noticeable, that is, subjectively the light produced is green. It should be understood, however, that the invention is not limited to the use of the phosphor layers in this preferred color order.

In constructing a screen in accordance with the foregoing principles, the phosphor and separator layers that are completely penetrated by the electron beam should be homogeneous in the sense that they contain substantially no cavities free from electron energy absorbing material. Also, the layers should be substantially uniform. Otherwise, the desired color saturation cannot be obtained at the same low switching voltage.

FIG. 1*a* EMBODIMENT FURTHER DESCRIBED

The multilayer screens will be discussed in more detail together with an explanation of how they are calculated. First, however, reference is again made to FIG. 1*a*. Television signals are received and demodulated in a conventional receiver 21 which supplies video signal to a video amplifier 22. The amplified video signal is applied to the cathode ray tube to current modulate the electron beam. In this example, it is applied to the control grid 16. The cathode 14 may be connected directly to ground. It should be understood that the control grid input circuit and the cathode input circuit may be conventional, and that either one may include direct-current reinsertion circuits or clamping circuits, for example.

As will be explained hereinafter, in this embodiment of the invention the television signal preferably is passed through a signal converter 25 (later to be described) before being applied to the cathode ray tube.

The video signal is also supplied to a synchronizing signal separation circuit 31 which supplies horizontal and vertical synchronizing pulses to the horizontal sweep generator 32 and the vertical sweep generator 33, respectively. The sweep generator outputs are supplied to a deflection yoke 34 comprising horizontal and vertical deflection coils whereby the electron beam scans the multilayer screen with the usual television type rectilinear scan.

The television apparatus of FIG. 1*a* is designed to operate with television signals transmitted in accordance with present television color signal standards adopted by the FCC. These standards include the transmission of a 3.58 megacycle color burst signal for synchronizing the colors. Accordingly, the video signals are also supplied to a color burst separator 36, which may be of any suitable type such as those presently employed in RCA color television receivers using the shadow mask color tube.

The separator 36 supplies the bursts of 3.58 megacycle signal to a phase and frequency comparator 37 for synchronizing a 3.58 megacycle oscillator 38. The comparator 37 and the oscillator 38, like the separator 36, may be the same as those used in present color receivers, and are well known in the art.

Since oscillator 38 is locked in with the color bursts, it is synchronized with the color sub-carrier of the video signal, and may be used to switch the electron beam voltage in the proper phase with the transmitted color signal to obtain the red, green and blue colors from the screen 11. To effect this switching, the 3.58 megacycle sine wave output of oscillator 38 is amplified to a suitable high voltage by an amplifier 39. In the example being described, 16 kv. is modulated 20 percent. Thus the peak-to-peak voltage of the sine wave output of amplifier 39 is 6.4 kilovolts. This 6.4 kv. sine wave switching voltage 40 is applied through a coupling capacitor 41 to the aluminum backing 12 of the screen 11.

A 16 kv. D.-C. voltage is applied from a suitable source directly to the mesh screen 13 and through a 10 megohm resistor 42 to the aluminum backing 12. In this example the mesh screen is at the same voltage as the backing layer 12, in the absence of the switching voltage, but it may be at a lower voltage if desired.

The switching voltage 40 appears across the resistor 42 and varies the potential of the aluminum backing 12 with respect to the mesh screen 13. This voltage variation controls the electron beam velocity in the region between the mesh 13 and the aluminum backing 12 for controlling the penetration of the beam electrons into the multilayer screen 11. The presence of the mesh screen 13 connected to the second anode 19 prevents the variations in beam velocity at the screen 11 from affecting the beam deflection and the size of the scanning raster.

The switching voltage 40 should be properly phased with respect to the chrominance signal. The phase of the switching voltage may be adjusted in various ways as, for example, by a phase adjustment in the comparator 37, or by use of an additional phase shifter provided for this purpose at the input of the amplifier 39.

USE OF CONVERTERS

With sine wave switching, the beam is switched into the green layer as the beam voltage increases, and again as the beam voltage decreases. This is illustrated schematically in FIG. 1*c*. Thus there is a reversing color sequence of RGBGR. The signal may be converted for use with this color sequence, by means of the converter 25.

The converter 25 is shown in block diagram in FIG. 1*b*. Explanation of the converter is unnecessary because it is the same converter as that shown in FIG. 15, page 307, of the article by B. D. Loughlin, Proceedings of the I.R.E., January 1954, and described in that article. It is also described in Loughlin Patent 2,734,940 issued February 14, 1956, FIG. 2 of which illustrates substantially the same converter in more detail.

The Loughlin article and patent refer to a line screen structure as an example of a device that employs a reversing color sequence display. As to the reversing color sequence, the operation of the multilayer screen 11 of FIG. 1*a* is similar to the function of the line screen referred to by Loughlin. An inspection of FIG. 1*c* shows this similarity.

Figure 1C:
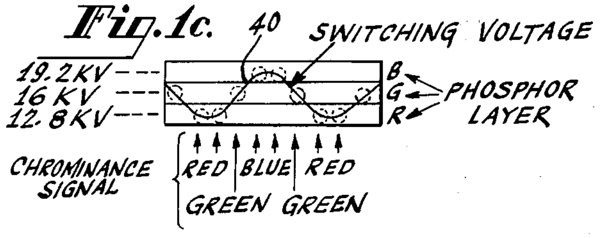
FIG. 1*c* is a schematic diagram that is referred to in explaining the operation of the television receiver shown in FIG. 1*a*.

The result obtained by the signal conversion is also illustrated by FIG. 1*c*. In effect, the signal is sampled twice on red, once on green, twice on blue, and again once on green, as indicated by the dotted circles.

When employing the converter 25 it may be desirable to boost the chrominance signal to, in effect, narrow the sampling and thereby increase the color gamut.

Even though the particular screen example of FIG. 3 is calculated assuming a reversing color sequence it may be operated without using this sequence. For example, the converter 25 may be replaced by the Schroeder converter and pulse sampling technique described hereinafter in connection with FIG. 2*a*. In this operation, the electron beam is normally biased to cut-off, and is pulsed "on" at the proper intervals to obtain the correct red, green and blue colors. The beam is not pulsed on as the beam returns through green. The pulse durations may be such as to provide about a 20% or 25% duty cycle, for example.

As will be apparent from the discussion later of the calculations of the multilayer screen 11 (the screen of FIG. 3), these particular calculations assume that to obtain a color mixture for white light, the green light is utilized both when produced during an increasing switching voltage and when produced during a decreasing switching voltage. Therefore, when this particular screen is operated using the Schroeder converter referred to above, the light from the screen will be somewhat deficient in green. This deficiency may be minimized or avoided by pulsing the beam to a greater current intensity on green. Or the D.-C. level of the switching signal may be adjusted to obtain a better white in the absence of chrominance signal.

If in FIG. 1*a* the Schroeder converter is to be used in place of the Loughlin converter a slight change in the design of screen of FIG. 3 (as by making the green phosphor layer thicker) may readily be made to provide a screen that supplies sufficient green light when the color sequence is the Schroeder converter sequence of RGBRGB.

FURTHER DETAILS OF FIG. 3 SCREEN

Reference is now again made to the structure and characteristics of the multilayer screen shown in FIG. 3. In this example the composition and the density $\rho$ of each phosphor are as follows, where $\rho$ is given in grams per cubic centimeter:

Red phosphor—(0.7 Mg, 0.2 Cd, 0.1 Zn).$SiO_3$:Mn $$\rho=3.83$$

Green phosphor—$Zn_2SiO_4$:Mn $$\rho=3.9$$

Blue phosphor—ZnS:Ag $$\rho=4.1$$

The spectral distribution for each of these phosphors is the same as for the P22 phosphors used in the well known shadowmask color tube types 21AXP22 and 21CYP22A.

The inert separator layers are layers of colloidal silica, for example, that known by the trade name Ludox. The density $\rho=1.64$.

The relative conversion efficiencies of these phosphors as used in this screen are:

| | |
|---|---|
| Red phosphor | 1 |
| Green phosphor | 11.7 |
| Blue phosphor | 13.2 |

The relative conversion efficiencies given above are the ratios in lumens after the values in lumens have been normalized, giving a value of 1 to the lumens output of red phosphor. These relative conversion efficiences mean that if for a given amount of electron beam energy absorbed in the red phosphor the light output in lumens from the red phosphor is 1 (normalized), then for the same amount of beam energy absorbed in the green phosphor the light output in lumens from the green phosphor will be 11.7 (normalized). Similarly, for the same energy absorption in the blue phosphor as in the red phosphor, the blue phosphor will emit 13.2 times as much light in lumens as the red phosphor. It should be understood that the relative conversion efficiences may be relative *effective* conversion efficiencies of the phosphors that are the full equivalent of the relative conversion efficiencies of the phosphors as here defined. For example, any of the phosphors may be diluted by effectively mixing it with fine powder inert material to reduce their conversion efficiency. Dilution may be accomplished, for example, by making alternate dispositions of a phosphor and an inert material (which may be discrete layers) to the mass thickness specified for that phosphor on the assumption it has a specified conversion efficiency, this mass thickness of alternate depositions having the specified conversion efficiency. The phosphor itself, as thus diluted, is said to have an effective conversion efficiency that is the same as or equal to the specified conversion efficiency. In this example of dilution by alternate depositions, it is assumed that the depositions are put down by a process, such as the Kell process described later, wherein several depositions of a phosphor (assuming the phosphor itself has the specified conversion efficiency) are put down to obtain a phosphor layer of the desired mass thickness.

It has previously been stated that with no chrominance signal modulating the electron beam, the light emitted from the three phosphor layers should add in the period of a switching cycle to give substantially white light. In the screen of FIG. 3 with the beam voltages and beam modulation specified (20 percent sine wave modulation), taking the total beam energy absorbed in the screen as 1, the fraction of the energy which is absorbed in each layer to give white light is as follows, reading in order from the gun side:

| | |
|---|---|
| Red layer | 0.502 |
| Inert layer | 0.25 |
| Green layer | 0.084 |
| Inert layer | 0.15 |
| Blue layer | 0.014 |
| Total beam energy | 1.00 |

The way in which these energy absorption values are calculated will be explained later.

DESCRIPTION REFERRING TO GRAPHS OF FIGS. 4 TO 7

With respect to each of the energy absorption graphs of FIG. 4, the energy absorption distribution of electrons penetrating a solid material is assumed to be according to K. Gentner as described in Annalen der Physik, vol. 31, pages 407–424, 1938, and as represented by his graph E on page 414. The depth of penetration of the electron beam at a particular voltage corresponds to the Thomson Whiddington penetration law referred to later.

Figure 5:
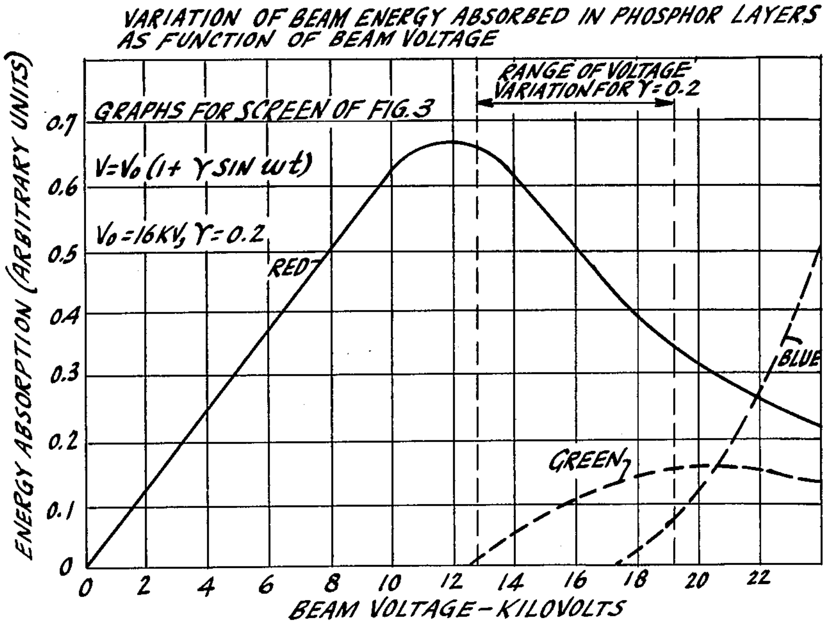
FIG. 5 is a group of graphs showing electron beam energy absorption in the different phosphor layers of the screen of FIG. 3 as a function of electron beam voltage.

FIG. 5 shows beam energy absorption plotted against beam voltage (beam current being constant) to show the beam energy absorbed in each of the three phosphor layers as the beam voltage is increased. A characteristic to be noted from the graphs of FIGS. 4 and 5 is that as the beam voltage is increased beyond a certain value, the energy absorbed in the red layer (and its light output) begins to decrease. In FIG. 4, comparing the energy absorption graphs for 12.8 kv. and 16 kv., it is evident that in the red layer the area under the 16 kv. graph is less than the area under the 12.8 kv. graph. Thus the amount of red light is decreased when the beam voltage is increased to produce green light.

This effect is still better illustrated in FIG. 5 by the graph labeled "red." This graph shows that if the electron beam were increased in velocity from a low voltage, in the red layer the energy absorbed from the beam would increase to a maximum at about 12 kv. and would then decrease with increase in voltage.

The graphs of FIG. 5, like the graphs of FIGS. 6 and 7 to be described later, are drawn for the screen of FIG. 3 and illustrate particularly the results when the screen is operated as previously specified, namely, with a 16 kv. center voltage which is 20 percent modulated as by a sine wave voltage. The limits in beam voltage with this modulation are indicated in FIG. 5 as "range of voltage," the limits being 12.8 kv. and 19.2 kv.

At the lower part of the voltage range, energy absorption in the red layer is close to maximum. It drops rapidly as the switching voltage (beam voltage) increases toward 16 kv. Meanwhile the beam energy absorption in the green layer is increasing as shown by the graph labeled "green."

As the switching voltage is increased toward its maximum value, the beam penetrates the blue layer so that this layer begins to absorb beam energy as shown by the graph labeled "blue." It will be noted that while beam energy absorption in the red layer continues to decrease, the energy absorption in the green layer tends to level off as the beam is switched into the blue layer. The blue light will be degraded, but subjectively it is still a blue light.

It will be evident from the foregoing that with respect to the phosphor layer on the gun side (the red layer) advantage is taken of the fact that the energy absorbed in that layer will decrease when the beam velocity is increased beyond a certain value.

Figure 6:
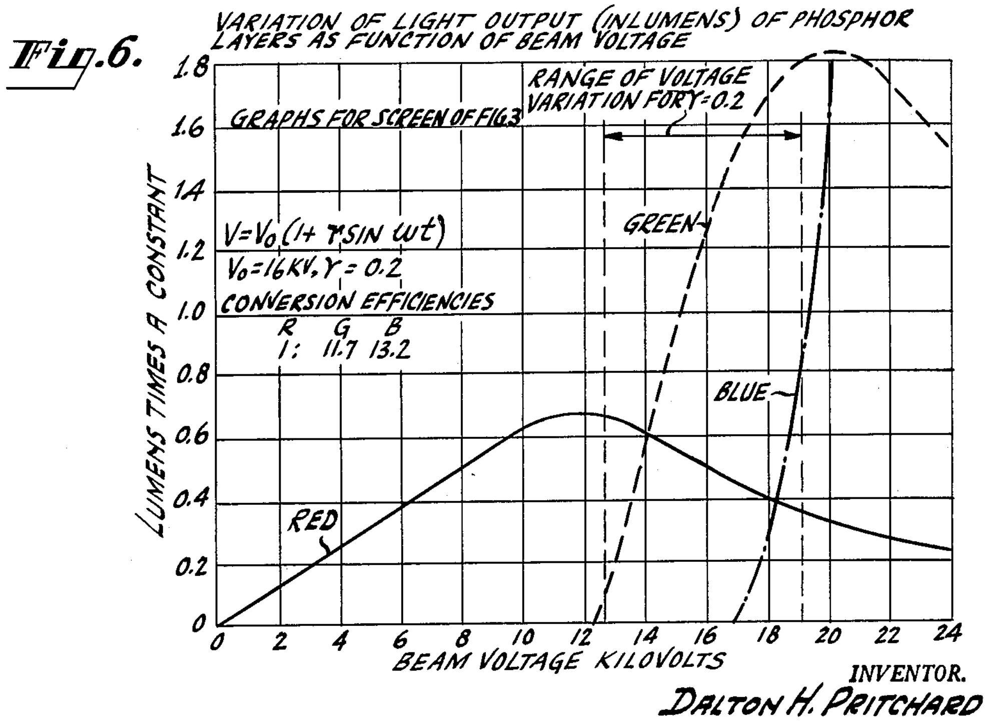
FIG. 6 is a group of graphs showing in arbitrary units the light output (lumens) from the different phosphor layers of the screen of FIG. 3 as a function of electron beam voltage.
Figure 7:
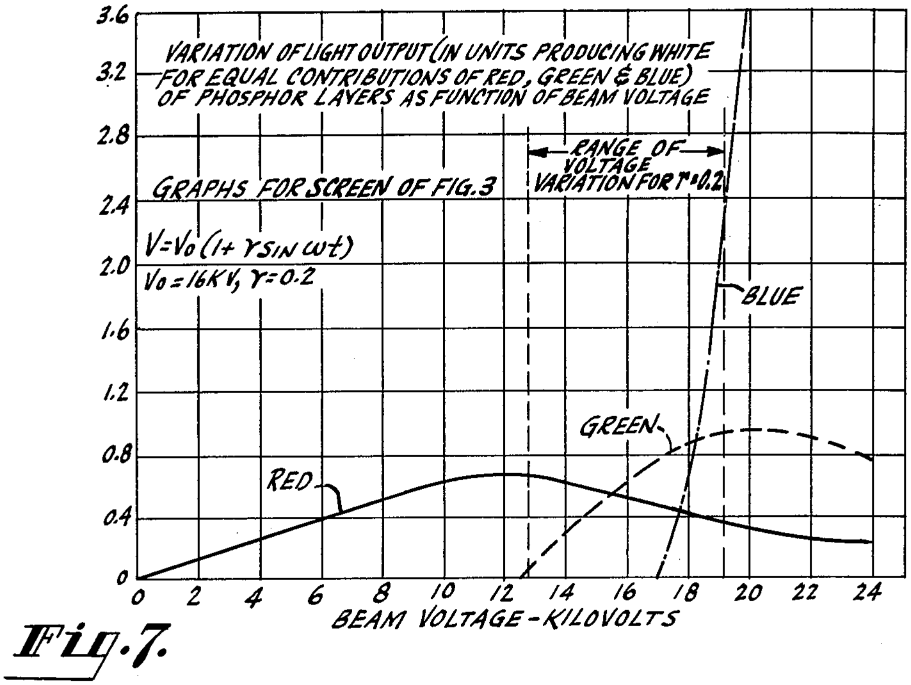
FIG. 7 is a group of graphs corresponding to those in FIG. 6 but showing the light output in units producing white light for equal contributions of red, green and blue light.

FIGS. 6 and 7 show the light output of the phosphor layers as a function of beam voltage. In FIG. 6 the ordinates are lumens times an arbitrary constant. They are derived from the graphs of FIG. 5 by multiplying those graphs by the relative conversion efficiencies of the phosphors. For example, the "green" graph of FIG. 5 is multiplied by 11.7 to obtain the "green" graph of FIG. 6.

FIG. 6 illustrates the effect of making the phosphor layer (green layer) that is next to the layer on the gun side (red layer) have the greater conversion efficiency as between these two layers. Even though when the beam is switched into green there is more energy being absorbed in the red layer than in the green layer, there is still more green light than red light being produced; subjectively, the resulting light is green. The same thing is true for the front layer (blue layer) with respect to the layer on the gun side (red layer).

Inspection of FIG. 6 might give a misleading impression as to the quality of the blue light that may be obtained since in terms of lumens there is more green light than blue light when switched into the blue layer. Actually when switched into the blue layer, subjectively, the resulting light is blue. FIG. 7 gives a more informative presentation of the color quality of the blue. Here the ordinates are in units producing white for equal contributions of red, green and blue light. For example, if in these units the red light were 0.6, the green and blue each 0.6 units also, the mixture of the three colors would give white light. FIG. 7 indicates that a fairly good blue light is obtained. This is understandable when it is remembered that to obtain white light a comparatively large amount of green light and a comparatively small amount of blue light is required. To state this specifically, for the three particular phosphors used in the screen of FIG. 3, these phosphors having P22 spectral distribution, the requirement for a mixture giving white light (C-illuminant) is that the relative amount of light from each phosphor layer in lumens should be:

| | |
|---|---|
| Red phosphor | 0.30 |
| Green phosphor | 0.59 |
| Blue phosphor | 0.11 |
| Total | 1.00 |

It is because of the characteristics of the eye that these proportions are required. It is evident that in lumens the amount of green light required is about twice that of the red light required, and that the amount of blue light required is only about one-third that of the red light required.

Therefore the graphs of FIG. 7 may be derived from those of FIG. 6 as follows:

To obtain the "green" graph of FIG. 7 divide the ordinates of the "green" graph of FIG. 6 by the ratio 0.59/0.3, or approximately by 2.

To obtain the "blue" graph of FIG. 7, divide the ordinates of the "blue" graph of FIG. 6 by the ratio 0.11/0.3, or approximately by one-third.

It is apparent that the graphs of FIG. 7 give a better presentation of the subjective effects of the produced colors (red, green and blue) on the human eye than do the graphs of FIG. 6, particularly as to the relative values of green and blue.

CHROMATICITY DIAGRAM FOR FIG. 3 SCREEN

Figure 8:
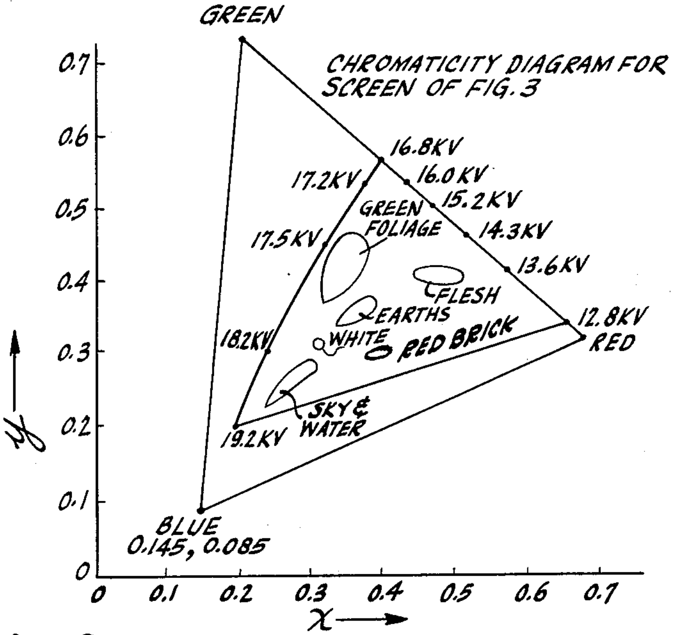
FIG. 8 is a chromaticity diagram for the screen of FIG. 3.

Refer now to FIG. 8 which is a chromaticity diagram for the screen of FIG. 3. This diagram is in accordance with the 1931 ICI *x, y* Standard Observer and Coordinate System where *x* and *y* are the chromaticity coordinates. White (C-illuminant) has *x* and *y* coordinates of 0.31 and 0.316, respectively. The corners of the triangle marked red, green and blue are located at the chromaticity coordinates for the red, green and blue phosphors used in the screen of FIG. 3.

The chromaticity diagram inside the triangle shows the maximum color gamut that it is theoretically possible to obtain with the screen and beam voltages specified. It will be seen that at 12.8 kv. a good red is obtained. As the beam voltage is increased so that the beam penetrates the green phosphor layer more, the green increases until the beam voltage reaches 16.8 kv. As the beam voltage is still further increased, the blue phosphor begins to emit blue light so that, as shown by the diagram, maximum blue is obtained at the maximum voltage employed, 19.2 kv.

One thing to be noted in particular from the chromaticity diagram is that due to the phosphor layers being in the order red, green, blue, counting from the gun side, the yellows and flesh tones are good. Also, those colors, such as greens, which are not accurately reproduced, are those which have low color acuity to the human eye. It will be seen from the "islands" and legends on the diagram, that, in general, the colors occurring in nature are included in the color gamut represented by this chromaticity diagram.

The chromaticity diagram of FIG. 8 shows the maximum color gamut theoretically possible, assuming that very narrow pulsing is applied to the electron beam so that, for example, when the chrominance signal calls for saturated red the electron beam is pulsed on at this instant. In practice, less narrow pulsing is preferred, with a corresponding reduction in the color gamut. For example, in the system illustrated in FIG. 1*a* using the converter 25, there is no actual pulsing. In effect, however, there is pulsing or sampling corresponding to about 50% duty cycle pulsing. With the use of chrominance boost, the effective duty cycle is reduced to a percentage below 50% so that a better color gamut results.

When employing the Schroeder converter previously referred to, the pulsing may be done by pulses narrow enough to provide a satisfactory color gamut and having sufficient amplitude to provide sufficient light from the screen. As an example, the pulse width may be such that the duty cycle is about twenty or twenty-five percent.

GENERAL DESIGN PROCEDURE FOR FIG. 3 SCREEN

The principles of the invention and a specific example of a screen (FIG. 3) embodying the invention have been described. This specific example was arrived at by determining the general physical structure of the screen in accordance with the principles of the invention, and then calculating the mass thickness of the screen layers. It is possible to make a screen with the layers of the correct mass-thickness by employing a process such as explained hereinafter in connection with a two-color screen. It is generally desirable, however, to calculate the mass thicknesses, at least approximately, and thereby reduce the time required to determine the correct layer thicknesses. An example of these calculations will be given for the screen of FIG. 3.

Before making any thickness calculations, the general physical structure of the screen is determined from the principles previously discussed. The example here considered is a three-color screen. It is to be operated at a specified low switching voltage. In this specific case the switching voltage is a 20 percent sine wave modulation of a 16 kv. center voltage.

The three phosphors selected for the three-color screen are to provide three colors in quantities that add to give a white light during each switching cycle, assuming no modulation of the electron beam by the chrominance signal. Phosphors having the same spectral distribution as the P22 phosphors used in the RCA shadow-mask color tube types 21AXP22A and 21CYP22A are satisfactory and are the ones selected.

The order of the phosphor layers will be red, green, blue, reading from the gun side. Separator layers will be used between phosphor layers.

The phosphor layers (green and blue) away from the gun side are to have a greater conversion efficiency than that of the phosphor layer (red) on the gun side. The three phosphors selected are those specified for the screen of FIG. 3 with relative conversion efficiencies of red=1; green=11.7; blue=13.2. Thus, the phosphor layers are strongly graded in relative conversion efficiencies in this screen example.

With respect to the grading of the conversion efficiencies of the phosphors, it has been explained that it is the grading of the *effective* conversion efficiencies of the phosphors that is important. This may be better appreciated if it is assumed, by way of example, that a red phosphor is available which has a conversion efficiency many times that of the green and blue phosphors (actually this is not true of present day commercial red phosphors) and that it is decided to use this red phosphor and, for reasons previously mentioned, locate the red phosphor layer on the gun side of the screen. The high efficiency red phosphor that is being assumed must be diluted to reduce its effective conversion efficiency as, otherwise, there will be much color cross-talk with a resulting poor color gamut. As stated earlier, this dilution may be accomplished by laying down alternate layers of red phosphor and inert material such as colloidal silica. A simpler way to effect the dilution is to increase the thickness of the separator layer that is laid down on the green phosphor layer, and then lay down a comparatively thin layer of the assumed high efficiency red phosphor.

This simpler way to effect dilution can be visualized better by referring to FIG. 4. The assumed highly efficient red phosphor will be only a thin layer at the surface of electron beam incidence, and, in the example being assumed, to the left of the peak of the 12.8 kv. energy absorption graph. Between this thin red phosphor layer and the green phosphor layer there will be a comparatively thick separator layer, such as a thick layer of colloidal silica. Stated in one way, as compared with the example illustrated in FIG. 4, the red phosphor layer is made thinner, and the separator layer between red and green is made thicker.

After the general physical structure has been determined, it remains to be determined what the layer thicknesses should be.

It is known that to obtain white light (C-illuminant) energy is to be absorbed in the inert separators. By total beam energy is meant the total beam energy absorbed in the screen during one switching cycle. This figure is arrived at as one that is reasonable since if more than 50 percent of the beam energy is absorbed in the inert layers the light output of the screen will go down more than the color purity will increase.

The remaining beam energy, i.e. 60 percent of the total, will be absorbed in the phosphor layers.

It is known that to obtain white light (C-illuminant) from the particular red, green and blue phosphors chosen for the screen of FIG. 3, the relative amounts of light from them should be 0.3 lumen of red, 0.59 lumen of green, and 0.11 lumen of blue.

Then the relative amounts of electron beam energy that must be absorbed (dissipated) in the phosphor layers to produce white light are, taking the energy absorbed in the red layer as 1:

$$\text{Red}= \quad 1.000$$

$$\text{Green}=\frac{1}{11.7}\times\frac{0.59}{0.3}=0.168$$

$$\text{Blue}=\frac{1}{13.2}\times\frac{0.11}{0.3}=0.028$$

$$\text{Total } \overline{1.196}$$

Since only 60 percent of the total beam energy is absorbed in the three phosphor layers, the fraction of the total beam energy to be absorbed in each phosphor layer to produce white light is:

$$\text{Red}=\frac{.60}{1.196}=0.502$$

$$\text{Green}=\frac{.60\times.168}{1.196}=0.084$$

$$\text{Blue}=\frac{.60\times.028}{1.196}=0.014$$

Assuming that 40 percent of the total beam energy is to be absorbed in the two inert separation layers, the next question is how this 40 percent of the energy should be divided between the two separation layers. Since it is particularly important that the green should not degrade the important color red when the beam is switched on red, the greater part of the 40 percent energy absorption should be in the separation layer between the red and green phosphors. This part is taken as about two-thirds of the 40 percent, leaving about one-third of the 40 percent to be absorbed in the separation layer between the green and the blue phosphor layers.

The specific fractions of the total beam energy selected to be absorbed in the two separation layers are:

Layer between red and green=0.25
Layer between green and blue=0.15

Summarizing, for the constant beam current (zero chrominance signal), the fractions of the total beam energy selected to be absorbed in the phosphor and the inert layers to produce white light are:

$$\text{Red}=0.502=E_r^w$$

$$\text{Inert layer}=0.250=E_{\text{inert } r,g}^w$$

$$\text{Green}=0.084=E_g^w$$

$$\text{Inert layer}=0.15=E_{\text{inert } g,b}^w$$

$$\text{Blue}=0.014=E_b^w$$

$$\text{Total}=\overline{1.000}$$

In the above symbols, the superscript "*w*" represents "white" and the subscripts represent the particular layers. For example "*r*" represents the red layer and "inert *r, g*" represents the inert or separator layer between the red and green phosphor layers.

LAYER THICKNESS CALCULATIONS OF FIG. 3 SCREEN

The layer thicknesses can now be calculated by use of an equation derived below.

The maximum penetration P of an electron beam into a layer of solid substance, according to the Thomson-Whiddington law, measured in units of mass thickness such as grams/cm.² is $P=bV^2$ where V is the beam voltage, and $b$ is a constant. The constant $b=2.3\times10^{-12}$ when V is in volts. The mass thickness is given in milligrams per square centimeter where V is in kilovolts and where the constant $b=2.3\times10^{-3}$.

It will be noted that in the Thomson-Whiddington law the voltage term is $V^2$. This appears to be substantially correct for voltages of about 25 kv. However, some investigations indicate that the power exponent "2" approaches "1" as the voltage is reduced to a low value. These investigations indicate, for example, that the exponent for V may decrease in value to about "1.7" for a beam voltage of about 12 kv.

As a matter of convenience, throughout this patent specification, and for calculations and measurements of all screens, the exponent for V in the Thomson-Whiddington penetration equation is assumed to be "2," that is, the equation $P=bV^2$ is used. Even if the equation may be somewhat in error, there is no error introduced in the screen so long as the same equation is used in making the screen calculations and in determining the layer thickness by electron beam penetration. More specifically, where a layer thickness is given in mg./cm.², this thickness has been measured by use of the same equation used in calculating it, namely $P=bV^2$. When the layer thickness is to be duplicated in the course of laying down another screen where the thickness is to be checked by beam penetration, the penetration equation $P=bV^2$ should again be used.

It will be appreciated that the important thing is that once a screen has been designed it can be substantially duplicated, and that this duplication can be done whether the absolute thickness of a layer as given in mg./cm.² is correct or not. If a corrected penetration equation were used to determine the absolute thicknesses of the several layers of a three-color screen, it probably would be found that the layers on the gun-side of the screen have an absolute thickness greater than is stated and tabulated in this specification. It should be noted that in all the examples of three-color screens described in this patent specification the mass thickness of the gun-side phosphor layer (red) is greater than the mass thickness of the middle phosphor layer (green), that this is so stated in terms of mg./cm.² for each layer, and that this is still true and will so appear in terms of mg./cm.² for each layer after any corrected calculations of absolute thicknesses are made.

Now consider the screen of FIG. 3. The aluminum layer will be ignored in the calculations since including it would have only a minor effect on the results. The first interface is at the depth $d_1$, i.e. $d_1$ is the thickness of the red phosphor layer. Then $$d_1=\alpha_1\frac{P(V_0)}{\rho_1}=\alpha_1 bV_0^2/\rho_1$$

where $\alpha_1$ (see FIG. 4) is the ratio of the mass thickness of the red phosphor layer to the depth of penetration (in mass thickness) for the beam at the voltage $V_0$, and $\rho_1$ is the density of the red phosphor layer. $V_0$ is the center voltage referred to the cathode potential as zero voltage.

Figure 9A:
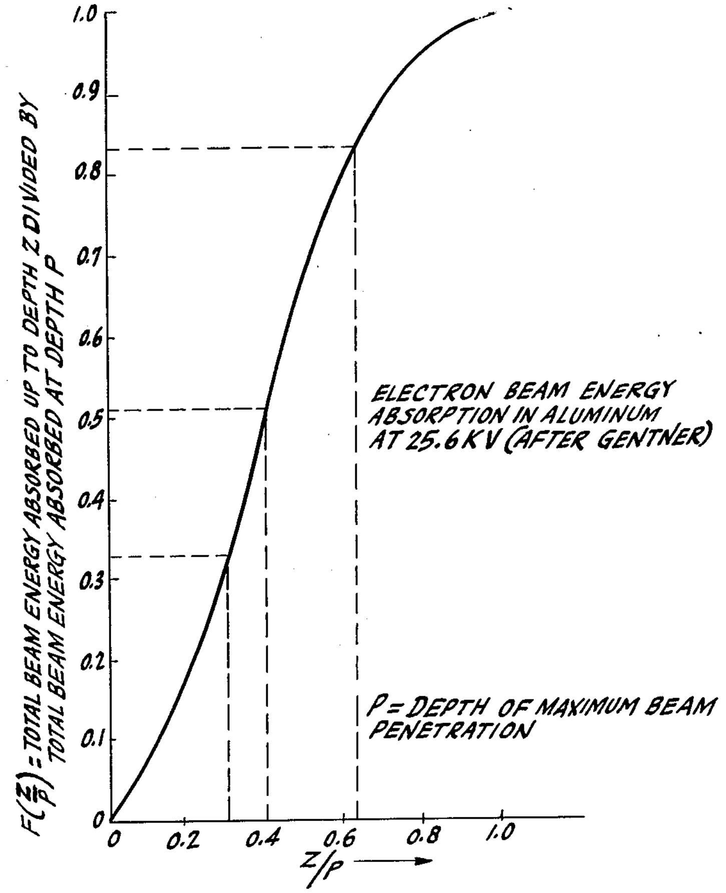
FIG. 9*b* is a group of graphs based on electron beam sorption in a layer of aluminum, this being approximately the same as for a layer of phosphor material.
FIG. 9*c* is a pair of graphs showing the amount of material in milligrams per square centimeter that is penetrated by an electron beam at different beam voltages.

The ratio $E_r^w$ of the beam energy absorbed in the red phosphor layer to the total beam energy absorbed in the multilayer screen in one switching cycle to produce white light is $$E_r^w=\frac{\frac{T}{2\pi}\int_{-\pi}^{+\pi}VIF\left(\frac{z_1}{P(V)}\right)d(\omega t)}{\frac{T}{2\pi}\int_{-\pi}^{+\pi}VId(\omega t)}$$

where I is the beam current which is a constant, V is the beam voltage at any given time, T is the period of the switching voltage, and $$\omega=\frac{2\pi}{T}=\text{angular velocity of the switching voltage}$$

$$F\left(\frac{z_1}{P(V)}\right)$$

is taken from the graph of FIG. 9*a* which is plotted from measurements made by K. Gentner as explained later. It gives the fraction of the total beam energy that is absorbed up to a depth $z_1$ where $z_1$ is the mass thickness of the red phosphor layer. Since $z_1$ is in units of mass thickness, $z_1=d_1\rho_1$.

Since I is constant, $$\frac{T}{2\pi}\int_{-\pi}^{+\pi}VId(\omega t)$$

becomes $$\frac{T}{2\pi}I\int_{-\pi}^{+\pi}Vd(\omega t)$$

which equals $ITV_0$ where $V_0$ is the center voltage.

The energy absorption ratio may now be written $$E_r^w\frac{1}{2\pi}\int_{-\pi}^{+\pi}\frac{V}{V_0}F\left(\frac{z_1}{P(V)}\right)d(\omega t)$$

Since $$\alpha_1\frac{V_0^2}{V^2}=\frac{d_1\rho_1}{P(V_0)}\cdot\frac{P(V_0)}{P(V)}=\frac{z_1}{P(V)}$$

a substitution may be made to include $\alpha_1$ in the equation. Thus $$E_r^w=\frac{1}{2\pi}\int_{-\pi}^{+\pi}\frac{V}{V_0}F\left(\alpha_1\frac{V_0^2}{V^2}\right)d(\omega t)$$

It is apparent that for a given value of $E_r^w$ the value of $\alpha_1$ may be determined from this equation. Knowing $\alpha_1$, the thickness $d_1$ of the red phosphor layer may be found from the equation $$d_1=\alpha_1\frac{P(V_0)}{\rho_1}$$

The thicknesses of the other layers of the screen of FIG. 3 are:

$$\text{Inert layer between red and green}=d_2=(\alpha_2-\alpha_1)\frac{P(V_0)}{\rho_2}$$

$$\text{Green layer}=d_3=(\alpha_3-\alpha_2)\frac{P(V_0)}{\rho_3}$$

$$\text{Insert layer between green and blue}=d_4=(\alpha_4-\alpha_3)\frac{P(V_0)}{\rho_4}$$

$$\text{Blue layer } d_5=\frac{\{P(V_0[1+\gamma])-\alpha_4P(V_0)\}}{\rho_5}$$

The values $\alpha_1$, $\alpha_2$, $\alpha_3$ and $\alpha_4$ are the abscissa values in FIG. 4 for the several phosphor layer interfaces as indicated in FIG. 4. The values $\alpha_1$ and $\alpha_2$, for example, are respectively the ratio of the mass thickness of the red phosphor layer to the depth of penetration (in mass thickness) for the beam voltage $V_0$, and the ratio of the mass thickness of the red phosphor layer plus the mass thickness of the first separator layer to the depth of penetration for the beam at voltage $V_0$.

In these equations, $\rho$ is the density of the layer, the subscript indicating the particular layer. As in earlier equations, $P(V_0)$ is the beam penetration at the voltage $V_0$. In the equation for the blue layer $\gamma$ is the percentage modulation. The blue layer thickness $d_5$ is the minimum thickness; it may be more since the beam does not need to pass through this layer.

The equation for determining the red layer thickness in terms of $\alpha$ has been given. However it is now again given, together with the equations for determining the other layer thickness in terms of $\alpha$.

$$E_r^w=\frac{1}{2\pi}\int_{-\pi}^{+\pi}\frac{V}{V_0}F\left(\alpha_1\frac{V_0^2}{V^2}\right)d(\omega t)$$

$$E_{\substack{\text{inert}\\ \text{r, g}}}=\frac{1}{2\pi}\int_{-\pi}^{+\pi}\frac{V}{V_0}\left\{F\left(\alpha_2\frac{V_0^2}{V^2}\right)-F\left(\alpha_1\frac{V_0^2}{V^2}\right)\right\}d(\omega t)$$

$$E_g^w=\frac{1}{2\pi}\int_{-\pi}^{+\pi}\frac{V}{V_0}\left\{F\left(\alpha_3\frac{V_0^2}{V^2}\right)-F\left(\alpha_2\frac{V_0^2}{V^2}\right)\right\}d(\omega t)$$

$$E_{\substack{\text{inert}\\ \text{g, b}}}=\frac{1}{2\pi}\int_{-\pi}^{+\pi}\frac{V}{V_0}\left\{F\left(\alpha_4\frac{V_0^2}{V^2}\right)-F\left(\alpha_3\frac{V_0^2}{V^2}\right)\right\}d(\omega t)$$

$$E_b^w=\frac{1}{2\pi}\int_{-\pi}^{+\pi}\frac{V}{V_0}\left\{1-F\left(\alpha_4\frac{V_0^2}{V^2}\right)\right\}d(\omega t)$$

The way in which the layer thicknesses may be calculated from the equations will be understood from the following explanation of the calculation of the thickness of the red phosphor layer.

First, reference is made to the graph of FIG. 9*a* which is used in the calculations. This graph shows the electron beam energy absorption in aluminum up to successive depths $z$ plotted against $z/P$ where P is the depth of the beam penetration. More specifically, an ordinate of the graph is the beam energy absorbed from the surface of beam incidence up to a depth $z$, divided by the total beam energy, that is, the energy absorbed up to the depth P. The depth $z$ is in grams per square centimeter. The depth in units such as microns depends upon the density of the material.

With respect to the graph of FIG. 9*a*, the energy absorption distribution of electrons penetrating a solid material is assumed to be according to K. Gentner as described in Annalen der Physik, vol. 31, pages 407–424, 1938, for the energy distribution of a 25.6 kv. electron beam in aluminum, and as represented by his graph E on page 414. The graph of FIG. 9*a* is an integration of this graph E. This graph for energy dissipation in aluminum may be used since various observations indicate that it does not differ greatly from the corresponding graph for phosphors or for inert separator material.

Also, it has been determined by experimental evidence that the graph of FIG. 9*a* for energy absorption approximately describes energy conversion to light in luminescent material.

What the graph of FIG. 9*a* represents can also be seen by referring to the graphs of FIG. 4. Refer to the energy absorption graph for the center voltage of 16 kv., for example. All of the area under this graph represents the total beam energy absorbed up to the depth P which is at the abscissa 1. The beam energy absorbed up to a depth $z$ corresponding to $\alpha_1$, for example, is in this instance the energy absorbed in the red layer and is the area under the 16 kv. energy absorption graph falling within the red layer. The relation between the energy absorption graphs and the graph of FIG. 9*a* should now be apparent.

The calculation for the layer thicknesses of the screen of FIG. 3 is on the basis of a sine wave switching voltage providing 20 percent modulation of the beam voltage. Thus, $V=V_0(1+\gamma \sin \omega t)$ where $\gamma$ is 0.20. The calculation for the thickness of the red phosphor layer may now be made as follows:

$$E_r^w=0.502=\frac{1}{2\pi}\int_{-\pi}^{+\pi}\frac{V}{V_0}F\left(\alpha_1\frac{V_0^2}{V^2}\right)d(\omega t)$$

The value of $\alpha_1$ is determined empirically to satisfy the equation. Thus, some reasonable appearing value for $\alpha_1$ is selected. The function F of the argument $$\left(\alpha_1\frac{V_0^2}{V^2}\right)$$

is found from the graph of FIG. 9*a*, remembering that $$\alpha\frac{V_0^2}{V^2}=\frac{z}{P(V)}$$

For instance, if at the step being calculated, $$\alpha_1\frac{V_0^2}{V^2}$$

has the value 0.3, then from FIG. 9*a* the function $$F\left(\alpha_1\frac{V_0^2}{V^2}\right)$$

is 0.33, and this value is inserted in the equation.

The equation may then be solved. For example, calculations can be made for 15 degree intervals or steps through the 360° switching cycle, calculating for the twenty-four corresponding values of V, adding the resulting twenty-four values, and then dividing by twenty-four.

When the value of $\alpha_1$ that gives a beam energy absorption of 0.502 in the red layer has been found, it is found to be 0.4. The red phosphor layer thickness may then be found from the equation $$d_1=\alpha_1\frac{P(V_0)}{\rho_1}=\alpha_1\frac{P(V_0)}{3.83}$$

$P(V_0)$, which is the beam penetration at 16,000 volts in the present example, is found from the Thomson-Whiddington equation $P=bV^2$, where $V=V_0$ and where $b$ is a constant$=2.3\times10^{-12}$.

Thus, $P(V_0)=2.3\times10^{-12}\times16{,}000^2$ grams/cm.$^2$=5.87 $\times10^{-4}$ grams/cm.$^2$.

Inserting the value 0.4 for $\alpha_1$ in the equation for $d_1$, the value of $d_1$ is found. Since $P(V_0)$ is in grams/cm.$^2$ and since $\rho$ is in grams/cm.$^3$, $d_1$ is given in centimeters. Converting to microns, the thickness of $d_1$ is 0.61$\mu$ as shown in FIG. 3.

In making a multilayer screen it is preferred not to deal with layer thicknesses in terms of thickness in microns since the thickness is difficult to measure. Rather, it is preferred to work in terms of grams/cm.$^2$, and deposit the specified weight of phosphor or inert material per square centimeter. The equation for grams/cm.$^2$ is the same as for $d_1$ except that there is no division by $\rho$, that is, the required grams/cm.$^2=\alpha_1 P(V_0)$. In the above example it is $2.4\times10^{-4}$ grams/cm.$^2$ for the red phosphor layer.

The layer thickness for every other layer of the screen of FIG. 3 is calculated in the same way, using the equation for that particular layer. For example, to calculate the thickness of the separator layer between the red and green layers, $$E_{\text{inert r, g}}=0.25=\frac{1}{2\pi}\int_{-\pi}^{+\pi}\frac{V}{V_0}\left\{F\left(\alpha_2\frac{V_0^2}{V^2}\right)-F\left(\alpha_1\frac{V_0^2}{V^2}\right)\right\}d(\omega t)$$

The prior calculation has determined the value of 0.4 for $\alpha_1$. Different values of $\alpha_2$ are tried until the equation is satisfied. As before, the function F of the argument $$\left(\alpha_2\frac{V_0^2}{V^2}\right)$$

is found from the graph of FIG. 9*a*. For instance, if at the step being calculated, $$\left(\alpha_2\frac{V_0^2}{V^2}\right)$$

has the value 0.4, then from FIG. 9*a* the function $$F\left(\alpha_2\frac{V_0^2}{V^2}\right)$$

is 0.51, and this value is inserted in the equation.

In a similar way, the thicknesses of the other layers of the screen may be calculated. The thicknesses of the several screen layers are shown in microns in FIG. 3. These thicknesses in both microns and mg./cm.$^2$ are, in the order from front to back:

| | Thickness, $\mu$ | Mg./cm.$^2$ |
|---|---|---|
| Blue phosphor | 0.62 | 0.25 |
| Separator | 1.56 | 0.256 |
| Green phosphor | 0.17 | 0.066 |
| Separator | 0.69 | 0.113 |
| Red phosphor | 0.61 | 0.24 |

The thickness specified for the blue phosphor layer is the minimum thickness. In practice it may be a thicker layer, such as one that is 80% to 90% transparent to diffused light, since electrons need not pass through it to penetrate other layers.

COLOR GAMUT CALCULATIONS FOR FIG. 3 SCREEN

The possible color gamut that may be obtained from the screen is now determined by calculating a chromaticity diagram. Such a diagram for the screen of FIG. 3 is shown in FIG. 8. The diagram is obtained, by finding color points corresponding to successive beam voltages V, respectively, which color points establish the boundary of the color gamut. The calculations are made assuming a constant beam current. The $x$ and $y$ coordinates for the color points are $$x=\left(Y_r\frac{x_r}{y_r}+Y_g\frac{x_g}{y_g}+Y_b\frac{x_b}{y_b}\right)\div\left(\frac{Y_r}{y_r}+\frac{Y_g}{y_g}+\frac{Y_b}{y_b}\right)$$

$$y=(Y_r+Y_g+Y_b)\div\left(\frac{Y_r}{y_r}+\frac{Y_g}{y_g}+\frac{Y_b}{y_b}\right)$$

$Y_r$ is the amount of light in lumens obtained from the red phosphor layer at the beam voltage assumed. Similarly, $Y_g$ and $Y_b$ are the amounts of light in lumens obtained from the green and blue phosphor layers, respectively, at the beam voltage assumed. The values $x_r$, $y_r$ are the color coordinates for the light from the particular red phosphor layer used in the screen. Similarly, $x_g$, $y_g$ and $x_b$, $y_b$ are the color coordinates for the light from the particular green and blue phosphor layers, respectively, used in the screen.

While it is possible to determine the color points from the equations for $x$ and $y$ given above, it is preferable to put them in a different form and make use of the energy absorption graph of FIG. 9*a* and the relative conversion efficiency values for the red, green and blue phosphors. Therefore, the amount of beam energy absorbed in a particular phosphor layer at the beam voltage assumed, is included in the equations as follows:

$$x=\left(\frac{Y_r x_r}{E_r y_r}E_r+\frac{Y_g x_g}{E_g y_g}E_g+\frac{Y_b x_b}{E_b y_b}E_b\right)\div\left(\frac{Y_r}{E_r}\frac{E_r}{y_r}+\frac{Y_g}{E_g}\frac{E_g}{y_g}+\frac{Y_b}{E_b}\frac{E_b}{y_b}\right)$$

$$y=\left(\frac{Y_r}{E_r}E_r+\frac{Y_g}{E_g}E_g+\frac{Y_b}{E_b}E_b\right)\div\left(\frac{Y_r}{E_r}\frac{E_r}{y_r}+\frac{Y_g}{E_g}\frac{E_g}{y_g}+\frac{Y_b}{E_b}\frac{E_b}{y_b}\right)$$

In the above equations $E_r$ is the amount of electron beam energy absorbed in the red phosphor layer at a beam voltage assumed. $E_g$ and $E_b$ are the amounts of electron beam energy absorbed in the green and blue phosphor layers, respectively, at the beam voltage assumed.

$$\frac{Y_r}{E_r}, \frac{Y_g}{E_g} \text{ and } \frac{Y_b}{E_b}$$

are the relative conversion efficiencies of the red, green and blue phosphor layers, respectively. These conversion efficiencies, as previously given, are in the ratio of 1, 11.7 and 13.2 for the red, green and blue layers, respectively.

The color coordinates $x$ and $y$ can now be calculated by obtaining the values of $E_r$, $E_g$ and $E_b$ from the energy absorption graph of FIG. 9*a*. This is done as follows:

$$E_r(V)=F\left(\alpha_1\frac{V_0^2}{V^2}\right)$$

$$E_g(V)=F\left(\alpha_3\frac{V_0^2}{V^2}\right)-F\left(\alpha_2\frac{V_0^2}{V^2}\right)$$

$$E_b(V)=1-F\left(\alpha_4\frac{V_0^2}{V^2}\right)$$

It was pointed out in connection with the equations used in solving for $\alpha$ that $$\alpha\frac{V_0^2}{V^2}=\frac{z}{\rho(V)}$$

Therefore, the value for $E_r$ at a voltage V taken as 12.8 kv., for example, and with the center voltage $V_0$ taken as 16 kv., is:

$$E_r=F\left(0.4\frac{16{,}000^2}{12{,}800^2}\right)=F(.63)=0.83$$

The values for $E_g$ and $E_b$ are similarly determined.

The color coordinates $x$ and $y$ for the color at the beam voltage 12.8 kv. are now calculated. They are found to be: $x=0.655$, $y=0.345$. This color point is marked 12.8 kv. on the diagram of FIG. 8.

To complete the chromaticity diagram of FIG. 8, it is assumed that the electron beam voltage is increased somewhat, for example, to 13.6 kv. The color point at this voltage is determined. It is marked 13.6 kv. on the chromaticity diagram. The color points are calculated for successively greater beam voltages up to the maximum beam voltage of 19.2 kv. In FIG. 8 these color points have marked next to them the beam voltage in kilovolts at which the color point was obtained.

The color point for white (C-illuminant) is also shown on the diagram.

DISCUSSION OF COLOR GAMUT OF FIG. 3 SCREEN

FIG. 8 shows the theoretical color gamut that can be obtained using the screen of FIG. 3 with 20 percent sine wave modulation of a center voltage of 16 kv.

Inspection of the chromaticity diagram shows that at 12.8 kv. the color from the screen is almost entirely red. As the voltage is increased, green mixes with the red, the red decreases and the green increases. This mixture of red and green includes the important flesh tones. As the beam voltage increases beyond 16.8 kv., the blue layer is penetrated so that blue mixes with the other colors until there is maximum blue at 19.2 kv.

It will be understood that the possible colors obtainable lie inside the smaller triangle on the chromaticity diagram in FIG. 8. The effect of the current modulation of the electron beam by an incoming chrominance signal is to produce a color having a color point somewhere inside the smaller triangle. For example, assume that there is no chrominance signal whereby the beam is of constant intensity throughout the switching cycle, and the light from the screen is white, having a color point indicated in FIG. 8. Next assume a chrominance signal is applied to the receiver, and that it calls for no change in green and blue light but calls for a reduction in the red light. This means that the beam current will be reduced while the beam is switched on red. The result will be that the color point will move from the white position to the left, away from the red corner of the triangle, but it will remain within the triangle.

FORMING PHOSPHOR LAYERS AND SEPARATOR LAYERS

Phosphor layers and separator layers may be deposited by several methods. For example, fine powder phosphor layers of the multilayer screen may be made by using a slurry type process. A suspension of fine phosphor particles in polyvinyl alcohol and water may be prepared. It is poured on the faceplate, and the faceplate is spun at a high speed, such as a speed of about 500 revolutions per minute, for example. This lays down a thin phosphor layer of the desired thickness, assuming the speed of spin and the viscosity of the fine powder suspension are correct. The viscosity may be adjusted by adjusting the concentration of polyvinyl alcohol. Materials other than polyvinyl alcohol may be used, for example, gelatin.

Each separator layer may be laid down in the same way after the phosphor layer has been dried.

It may be preferred to lay down the fine powder phosphor and inert layers by the Kell process as taught in Kell application Serial No. 108,535 filed May 8, 1961, and entitled "Luminescent Screens." For example, to give a brief general description of one way of practicing the process, a solution of approximately one perecent gelatin in water is poured on the faceplate of the cathode ray tube, sloshed over the faceplate, and then poured off. Next the faceplate is washed by pouring water over it. The faceplate may then be spun to throw off all excess water. Next a dispersion of the desired fine phosphor particles in water is poured on the faceplate and sloshed over it. The fine particles adhere to the gelatin film by absorption. The excess dispersion is poured off the faceplate. The phosphor layer adhering to the gelatin film is spray washed, and the faceplate is then spun to throw off excess water.

The phosphor layer may be built up to the desired thickness by repeating the steps of bathing with gelatin solution, water, phosphor dispersion, and water as many times as necessary.

Instead of alternating gelatin solution and phosphor dispersion baths, a series of alternate phosphor dispersion and acid baths may be used after each gelatin solution bath. For the acid wash an acetic acid solution having a pH of about 3.5 is suitable.

The separator layers may be applied by the same process as the phosphor layers.

Figures 2A, 2B:
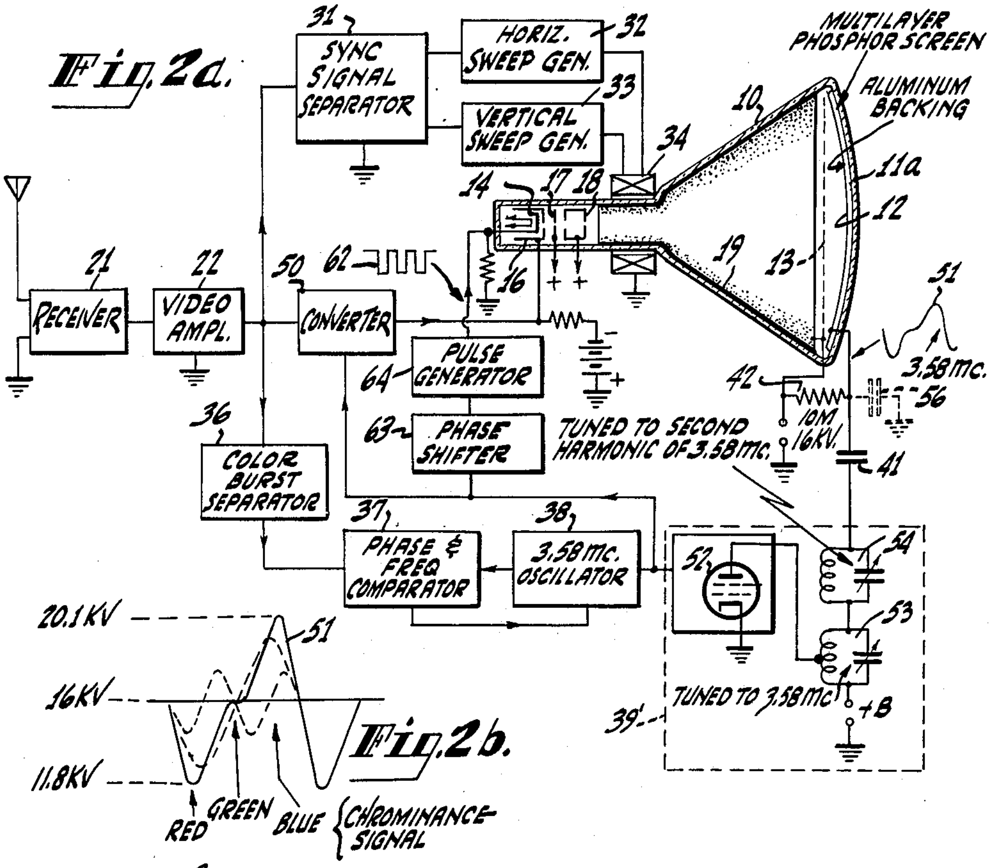
FIG. 2*a* is a block diagram of a television receiver embodying the invention wherein the electron beam switching voltage is a sine wave distorted in a prescribed manner by its second harmonic.
FIG. 2*b* is a diagram showing the switching voltage wave form employed in the television receiver of FIG. 2*a*.

*FIG. 2a embodiment and screen of FIG. 10*

FIG. 2*a* EMBODIMENT AND SWITCHING WITH 2nd HARMONIC DISTORTED WAVE

Another example of the invention will now be described with reference to FIG. 2*a*. In this example the three-color multilayer screen 11*a* shown in FIG. 10 is used in the cathode ray tube 10 in place of the screen of FIG. 3. If it is assumed that a signal of "symmetrical" form is being received, the television receiver is similar to that previously described (without the converter 25) except that the center voltage is 26 percent modulated by a voltage wave consisting of a sine wave and its second harmonic. Also, a gating or pulsing circuit has been added to the circuit illustrated in FIG. 2*a*.

By a signal of "symmetrical" form it is meant that for the three primary colors, red, green, and blue, the phases of the color subcarrier are 120 degrees apart, that the ratios of the sinusoidal and direct current terms contributed by each primary color are fixed and equal, and that these terms are equal to one another when white light is reproduced.

The switching voltage wave form resulting from the addition of the second harmonic, properly phased with respect to the fundamental, is as shown at 51 in FIG. 2*b* where the peak-to-peak amplitude of the second harmonic is one half the peak-to-peak amplitude of the fundamental. In this example, the second harmonic is added to the fundamental wave that modulates the center voltage 20 percent, the result being a 26 percent modulation. The center voltage is 16 kv., and the minimum and maximum voltages are 11.8 kv. and 20.1 kv. respectively.

It will be apparent that in the region of the center voltage the wave form is flat so that in switching the beam from red to green, the beam velocity is arrested or held momentarily at the green switching voltage. In going from blue back to red, on the other hand, the beam is switched rapidly through the green whereby a minimum amount of green light is produced at this time. The electron beam may be cut off by appropriate blanking during this time, if desired, and still have the system operate with a fairly large duty cycle as will be explained hereinafter.

The switching voltage 51 is obtained from the amplifier 39' which includes an output tube 52, such as a beam power tube, that is operated class C to amplify the output of oscillator 38. The plate circuit of the output tube includes a high "Q" tank circuit 53 that is tuned to the fundamental frequency of the signal being amplified, in this case 3.58 mc. per second. In series with the tuned circuit 53 there is a high "Q" tank circuit 54 that is tuned to the second harmonic of the fundamental. Plate voltage is applied at the lower side of the tuned circuit 53.

The sum of the fundamental and second harmonic appears across the two tuned circuits as the modulating wave 51. It is applied through the coupling capacitor 41 to the aluminum backing of the screen of FIG. 10.

As indicated by the dotted capacity 56, the capacitance of the cathode ray tube to ground is included as part of the capacitance of the tuned circuits 53 and 54.

The second harmonic must be properly phased with respect to the fundamental as indicated in FIG. 2*b* to obtain the wave form shown at 51. This phasing may be accomplished by making a slight adjustment of the tuning of the tank circuit 54. The amplitude of the second harmonic with respect to the fundamental is adjusted by adjusting the LC ratios of the two tank circuits and thereby adjusting the relative load impedances that the two tank circuits present to the output tube.

Since the received signal, under the present signal standards is not in the symmetrical form it may be converted to that form by a converter 50 into which the video signals are fed. In the example shown in FIG. 2*a* it is assumed that the incoming signals are asymmetrical and that a converter 50 is used.

Figure 2C:
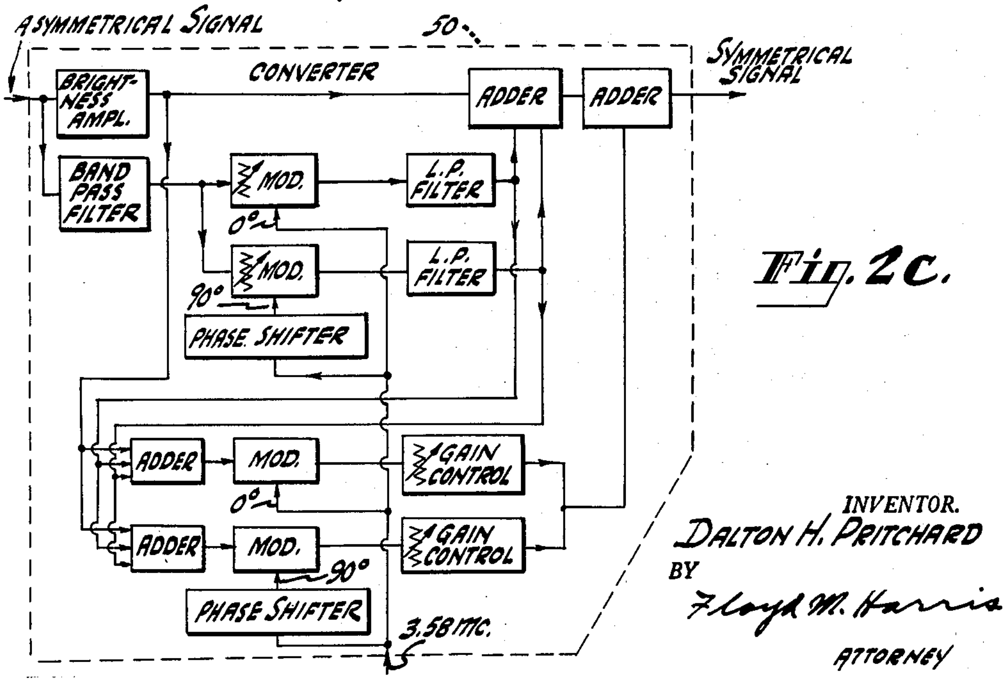
FIG. 2*c* is a block diagram of a signal converter that is included in the diagram of FIG. 2*a* for converting an asymmetrical signal to a symmetrical signal.

A suitable converter 50 is shown in block diagram in FIG. 2*c*. It can be the converter shown in FIG. 2 of Patent 2,858,366 issued October 28, 1958, to A. C. Schroeder, and described in that patent.

DESCRIPTION OF SCREEN OF FIG. 10

Refer now to the screen 11*a* of FIG. 10. This screen is substantially the same as that shown in FIG. 3 except that the layer thicknesses are different and except that the blue phosphor is a P11 phosphor which has a conversion efficiency less than that of the green phosphor. Also, the spectral distribution of the P11 phosphor is different from that of a P22 blue phosphor.

The layer thicknesses are different in the FIG. 3 and FIG. 10 screens for several reasons. One reason is that the blue phosphor is different in the two screens. Another reason is that the ratio of the conversion efficiencies of the green and red phosphors is less. Still another reason is that the screen of FIG. 10 has been calculated for operation with an electron beam having a 16 kv. center voltage that is 26% modulated by a voltage having the second harmonic distorted wave form described in connection with FIGS. 2*a* and 2*b*. A fourth reason is that the calculation is based on a 61 percent duty cycle as illustrated in graphs (*f*) and (*g*) of FIG. 16. As in the case of the screen of FIG. 3, the layers may be made by several methods as, for example, by either the slurry process or the Kell process.

The calculated thicknesses of the several screen layers are shown in microns in FIG. 10. These thicknesses are, in the order from front to back:

| | Thickness, micron | Mg./cm.$^2$ |
|---|---|---|
| Blue phosphor | 0.89 | [1] 0.364 |
| Separator | 1.06 | 0.175 |
| Green phosphor | 0.24 | 0.093 |
| Separator | 0.68 | 0.113 |
| Red phosphor | 0.52 | 0.202 |

[1] Minimum.

The red and green phosphor materials and the separator material and their densities are the same as for the screen of FIG. 3.

The blue P11 phosphor is of the same material and has the same density as the blue phosphor used in the screen of FIG. 3. However, the P11 phosphor contains more silver, has a different spectral distribution, and has a different conversion efficiency than the blue phosphor in the screen of FIG. 3.

The relative conversion efficiencies of the phosphors in the screen of FIG. 10 are:

| | |
|---|---|
| Red phosphor | 1 |
| Green phosphor | 5 |
| Blue phosphor | 3.8 |

To obtain white light (C-illuminant) from the particular red, green and blue phosphors used in the screen of FIG. 10, the relative amounts of light from them should be 0.31 lumen of red, 0.52 lumen of green and 0.17 lumen of blue, where the sum of the three colors for producing white light is taken as 1.

The relative amounts of electron beam energy to be absorbed in the phosphor and separator layers are determined in the same way as for the screen of FIG. 3. For the screen represented in FIGURE 10, these amounts are:

$$\text{Red}=0.408=E_r^w$$
$$\text{Inert layer}=0.250=E_{\text{inert r, g}}^w$$
$$\text{Green}=0.146=E_g^w$$
$$\text{Inert layer}=0.150=E_{\text{inert g, b}}^w$$
$$\text{Blue}=0.046=E_b^w$$
$$\text{Total}=1.000$$

The layer thicknesses for the screen of FIG. 10 may be calculated as explained in connection with the screen of FIG. 3. The chromaticity diagram may then be calculated as previously explained.

The graphs shown in FIGURES 11, 12, 13 and 14 for the screen of FIGURE 10 correspond to the graphs shown in FIGURES 4, 5, 6 and 7, respectively, for the screen of FIGURE 3. In view of the discussion of the graphs for FIGURE 3, these graphs for FIGURE 10 require no further explanation. It will be noted that the graphs for the two screens show that the two screens have the same general characteristics. It should be noted that in both screens, when the beam is switched into either the middle phosphor layer (green) or the front phosphor layer (blue), more of the beam energy is absorbed in the layers between the layer switched into and the back or gun-side surface of the screen than in the layer switched into.

Figure 15:
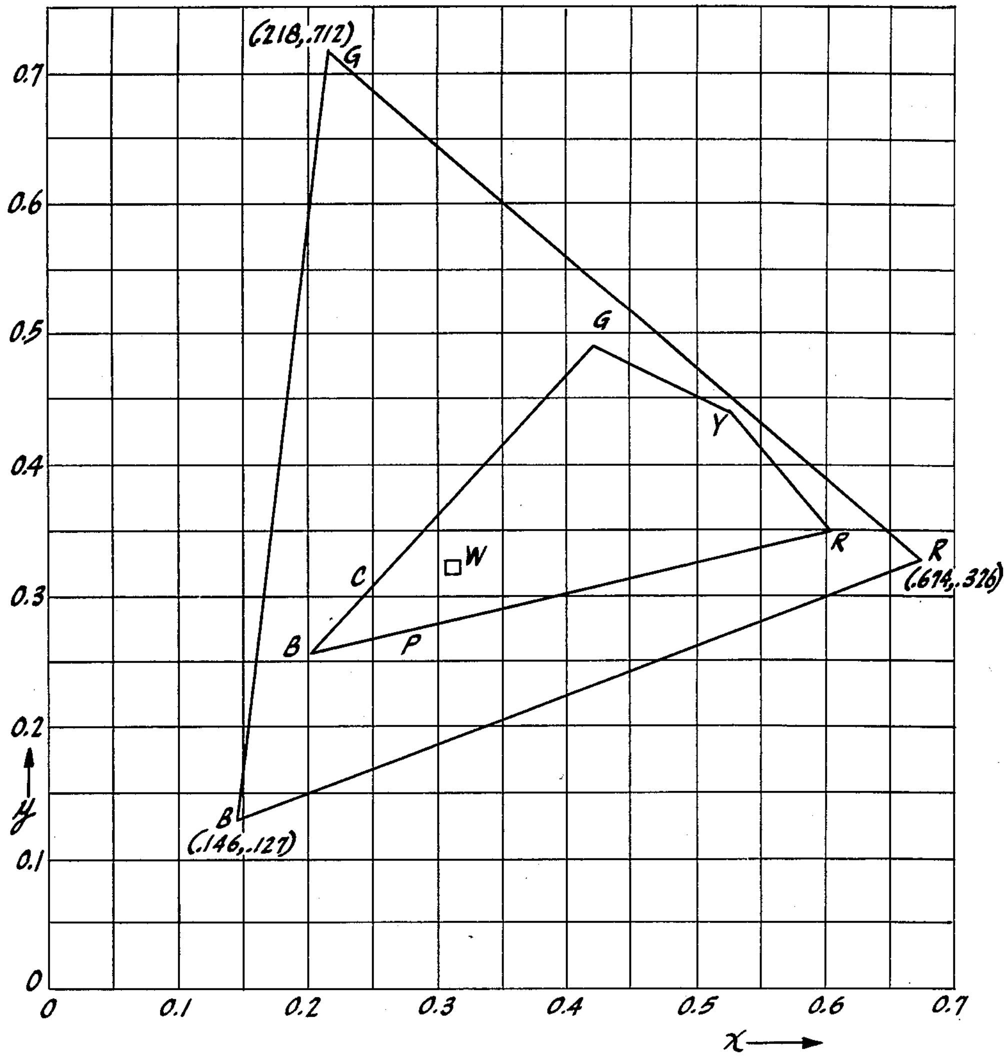
FIG. 15 is a chromaticity diagram for the screen of FIG. 10 when incorporated in apparatus that is operated as specified.

In FIG. 15 the diagram inside the large triangle is a chromaticity diagram showing the color gamut that may be obtained from the screen of FIG. 10 when the electron beam is velocity modulated by the second harmonic distorted wave form as above specified, when the received chrominance signal is in the "symmetrical" form or is converted at the receiver to the "symmetrical" form, when the operation is with a 61% duty cycle as will be discussed hereinafter, and when the gamma of the electron gun equals two.

The corners of the large triangles are located at the chromaticity coordinates (ICI *x*, *y* coordinates) for the red, green and blue phosphors used in the screen of FIG. 10.

LAYING DOWN LAYERS TO SPECIFIED THICKNESSES

Before further discussion of the operation of a receiver utilizing the screen of FIG. 10, one way of laying down a multilayer screen with the phosphor and separator layers having the thickness that have been calculated will now be described. It will be assumed that some process, such as the above-described Kell process, will be used which permits building up a layer thickness in successive steps.

In determining the layer thicknesses, use is made of the set of graphs shown in FIG. *9b* and one of the graphs shown in FIG. *9c*.

The graphs of FIG. *9b* show electron beam energy absorption in the blue phosphor layer plotted against the electron beam voltage (beam current being constant). These graphs have been calculated theoretically for the screen of FIG. 10. They are calculated by using the Thomson-Whiddington penetration law and the Gentner curve, both previously referred to. Specifically, the beginning of the toe of a graph is determined by the equation $P=2.3\times 10^{-3}V^2=\text{mg./cm.}^2$, where V is in kilovolts. From this starting point of the graph, the graph is plotted by use of the graph (after Gentner) of FIG. *9a*. The way in which this may be done will be understood by referring to the "blue layer plus separator" graph of FIG. *9b*, for example, which starts at 8.7 kv. Successive increases in the beam voltage (with beam current held constant) are assumed, these voltages to be ones at which all the beam energy is absorbed in the separator layer and the blue layer. For example, assume 13 kv. as one of these beam voltages. At a beam voltage of 13 kv. part of the beam energy is absorbed in the separator layer and the remainder is absorbed in the blue layer. It is to be determined what proportion of the total beam energy is absorbed in the blue layer. This can be found from the FIG. *9a* graph by noting that, in the example assumed, $$z/P=\frac{K(8.7\text{kv.})^2}{K(13\text{ kv.})^2}=\frac{8.7^2}{13^2}=0.45$$

where K is a constant. Reading from the graph of FIG. *9a*, the ordinate corresponding to the abscissa 0.45 is 0.58. This is the portion of the total beam energy absorbed in the separator layer. The remainder of the beam energy, or $1-0.58=0.42$, is absorbed in the blue layer. On the scale used in FIG. *9b*, one unit of beam energy is absorbed for each kilovolt of beam voltage as indicated by the graph for "blue layer only." Therefore at 13 kv. the total beam energy is represented by 13 units, and the beam energy absorbed in the blue layer at 13 kv. is $0.42\times 13=5.46$ units. This is the ordinate for the "blue layer plus separator" graph at the abscissa of 13 kv. The plot of the graph is completed by assuming several other beam voltages and calculating the corresponding ordinates of the graph.

Since the blue layer emits light in proportion to the beam energy absorbed in it, the energy absorption graphs of FIG. *9b* also represent blue light (in arbitrary units) that is emitted. In using the graphs of FIG. *9b* for laying down the screen of FIG. 10, the light output from the screen is measured by a light meter provided with a blue filter. The graph labeled "blue layer only" is obtained by depositing the blue phosphor layer only on the face plate, putting it in a demountable tube, and measuring the blue light as the beam voltage is increased. This graph is used for check purposes only.

The face plate is then removed from the demountable tube and a separator layer laid down on the blue phosphor layer. Care is taken not to make this separator layer too thick as material can be added to the layer more readily than it can be removed. The face plate is again put on the demountable tube, and the blue light is plotted against the beam voltage. The graph that it is desired to obtain is that labeled "blue layer plus separator." If the separator layer is too thin, the graph will be to the left of the one that is desired. However, it will be a similar graph and the layer thickness can be determined as will now be described referring to the "blue layer plus separator" graph shown. It will be noted that this graph, as well as the other graphs for multiple layers, has a curvetd portion or toe at the bottom. In this example the threshold, or point at which blue light first appears, is at 8.7 kv. This is the point at which some electrons of the electron beam have just passed through the separation layer and reached the blue layer. It may be noted that there is a curve or toe on these graphs for the same reason that there is one on the graph (after Gentner) of FIG. *9a*. Theret is no toe on the "blue layer only" graph since no penetration of a preceding layer is required before blue light is emitted.

Associated with the 'blue layer plus separator" graph is a straight line extension of the straight portion of the graph. This extension intercepts the abscissa at 10.2 kv.

Layer thickness in terms of milligrams per square centimeter can now be determined by the aid of one of the graphs of FIG. *9c*. The graph labeled "threshold" shows mg./cm.$^2$ plotted against the beam penetration in kilovolts where "threshold" penetration is used. In the example being described, this beam voltage is 8.7 kv. Referring to the "threshold" graph of FIG. *9c*, it is found that the layer thickness is 0.175 mg./cm.$^2$. The same result is obtained by using the voltage of 10.2 kv. at the straight line intercept (FIG. *9b*) and the "intercept" graph of FIG. *9c*. As explained later, it is preferred to make use of the intercept. It will be noted that the "threshold" graph is constructed from the same equation as that referred to earlier in the calculation for layer thicknesses. This equation represents the Thomson-Whiddington law for electron penetration. The "intercept" graph is the same as the "threshold" graph except that it starts at a 15% higher voltage than does the "threshold" graph.

As previously noted, the first measurement will give a graph to the left on the "blue lever plus separator" graph shown because the separator layer was first laid down too thin, to avoid accidentally making it too thick. Its thickness is checked from the blue light vs. beam voltage graph obtained in the way described above. Now it is known how much more separation material is to be added to get the desired thickness. More separator material is laid down, and the thickness again checked. This is continued until a check shows that the separator layer has the calculated thickness.

Next a layer of green phosphor powder is laid down on the separator layer, and the checking procedure repeated. When the green phosphor layer is of the calculated thickness, the blue light vs. beam voltage graph will be on one labeled "Blue Layer Plus Separator Plus Green." For this graph the intercept point is 12.6 kv. Referring to the intercept graph of FIG. *9c*, at this beam voltage the milligrams of material per square centimeter is 0.268. Since this is the material of the green phosphor layer plus the material of the separator layer, the thickness of the green layer is 0.268 minus 0.175 equals 0.093 mg./cm.$^2$ of green phosphor. It will be noted that these thicknesses are those previously tabulated for the screen of FIG. 10.

The procedure is continued for the remaining layers, using the other blue light vs. beam voltage graphs of FIG. *9b*.

It was previously stated that it is preferred to make use of the voltages at the intercepts of the straight line extensions of the FIG. *9b* graphs, rather than the threshold voltages. The reason for this is that the curvature or toe of a light vs. beam voltage graph frequently is not the same as for the theoretical graph. Since the toes of the graphs shown in FIG. *9b* have the theoretical curvature, there may be a lack of correspondence with an actual screen being laid down on a face plate.

Figure 9B:
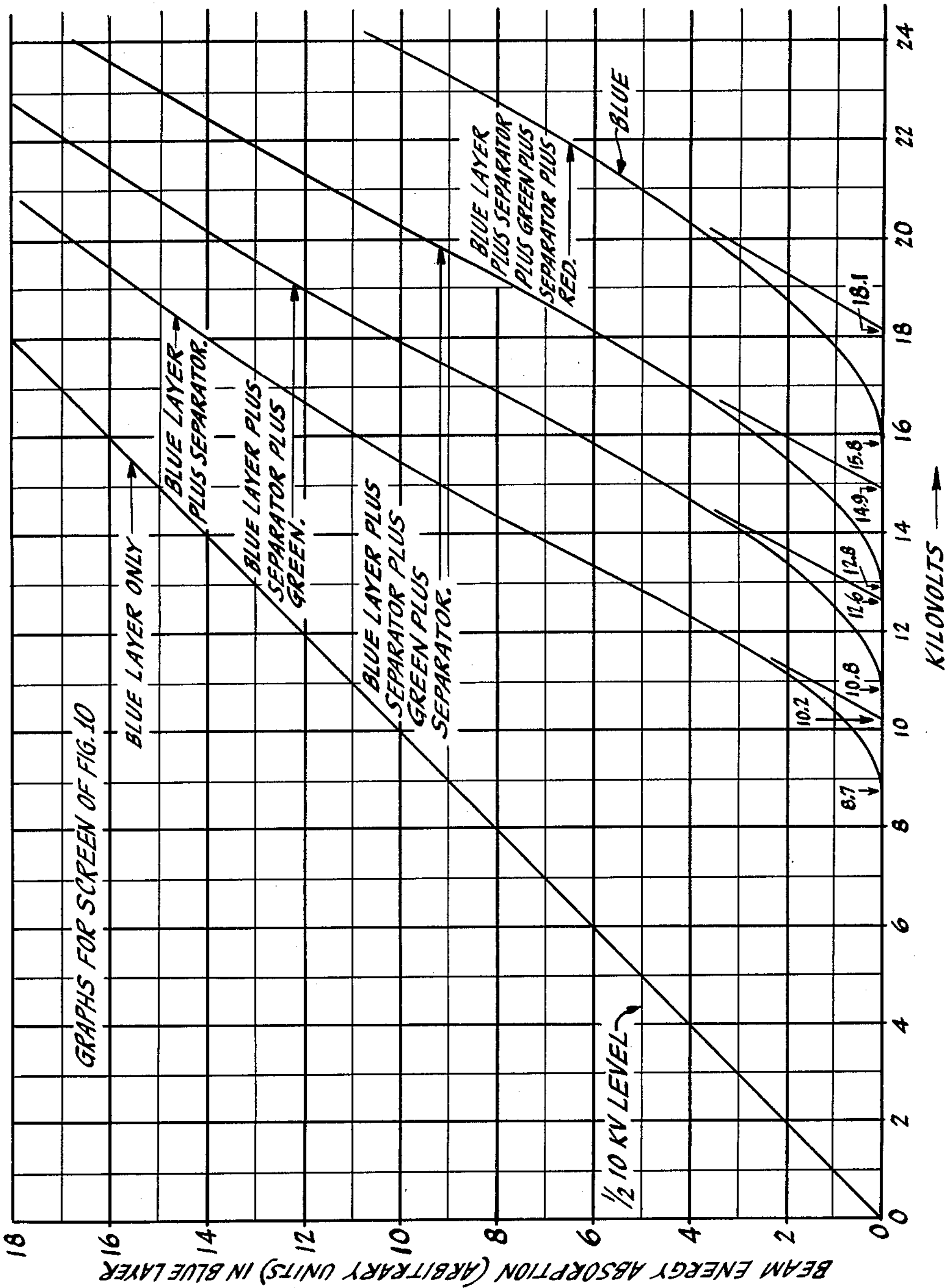

The theoretical curvature of the toe of a light vs. beam voltage graph as shown in FIG. 9*b* assumes uniform layers, such as evaporated layers or correspondingly uniform fine powder layers. Irregularities in a layer make the toe longer than in the case of a perfectly uniform layer, and raises the required switching voltage. Irregularities or non-uniformity in a layer may result from various causes such as the size of the phosphor particles, non-uniform deposition of the material, etc. Even very good nearly uniform, layers may have sufficient non-uniformity to lengthen the toe of the graph somewhat as compared with the theoretical toe.

It may be noted that the voltages at the intercepts of the straight line extensions of the graphs of FIG. 9*b* are a measure of the average mass thickness of the layers.

CHECKING RELATIVE CONVERSION EFFICIENCIES

Figure 14:
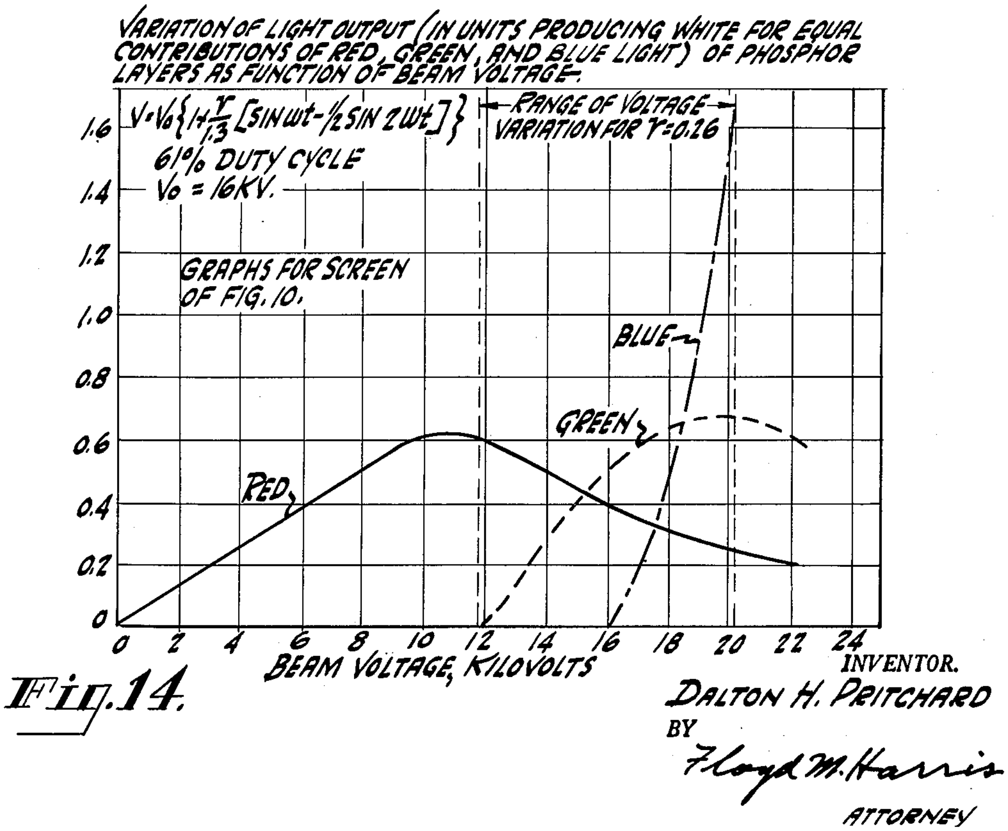
FIG. 14 is a group of graphs corresponding to those in FIG. 13 but showing the light output in units producing white light for equal contributions of red, green and blue light.

After the multilayer screen has been completed, a check can readily be made to see whether the several phosphor layers have the desired relative conversion efficiencies. Light output graphs, such as those of FIG. 14, are obtained. Actually, only the front sloping part of each graph is required. Then the slopes of these front portions are compared. Since the front slope of each graph is a measure of the conversion efficiency of the corresponding phosphor layer, the relative conversion efficiencies can be checked. To obtain the graphs, a light meter with the proper color filter is used. For example, to obtain the green color graph and the blue color graph, the light meter is used with green and blue color filters, respectively, that pass the peak of the spectral characteristics of the light being measured.

The front slope of each graph that is used as a measure of conversion efficiency is the steepest slope, i.e., the slope of the steepest portion of the rising part of the graph. The conversion efficiency of the middle phosphor layer (green) can be ascertained in more detail if a graph for green light is obtained during the screen construction before any layers are laid down over the green phosphor layer. A graph so obtained for light from the middle layer will have a steeper slope than when obtained after the screen is completed.

OPERATION OF FIG. 2*a* EMBODIMENT FURTHER DESCRIBED

The television receiver of FIG. 2*a* utilizing the screen of FIG. 10, will now be further described, particularly with reference to operation of the receiver in the manner assumed to obtain the chromaticity diagram of FIG. 15.

Figure 16:
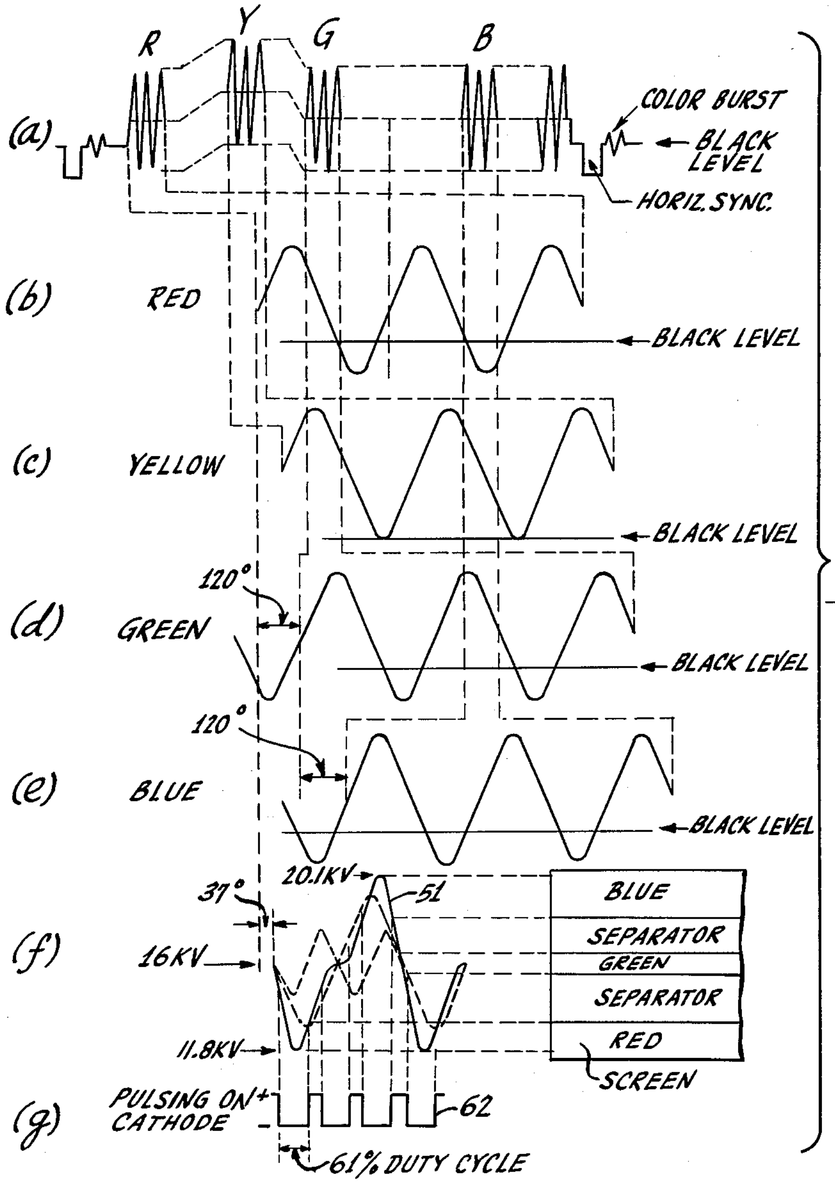
FIG. 16 is a group of graphs and a schematic showing of a multilayer screen that are referred to in describing an example of the invention utilizing the multilayer screen of FIG. 10 and utilizing a second harmonic distorted beam switching voltage.

Refer to FIG. 16. Graph (*a*) represents a color television signal either as received in the symmetrical form, or after it has been converted in the receiver to the symmetrical form. In the example illustrated, the chrominance signal (the color subcarrier) is for saturated red at R, saturated green at G, and saturated blue at B. At Y the chrominance signal is for yellow. The color subcarrier for red, yellow, green and blue is repeated on an enlarged scale by the graphs (*b*), (*c*), (*d*) and (*e*) to show the phase of the sub-carrier at the time it calls for these different colors.

Graph (*f*) of FIG. 16 shows the electron beam switching voltage 51 that was described in connection with FIGS. 2*a* and 2*b*.

Graph (*g*) of FIG. 16 shows voltage pulses 62 that may be applied to the cathode ray tube 10 for turning on the electron beam periodically so that it is on only 61 percent of the time. The pulses may be negative as shown, and may be applied to the cathode of the electron gun of the tube 10. The tube 10 is biased to or beyond beam cut-off between successive pulses 62.

The pulses 62 may be generated in any suitable manner. For example, the third harmonic of the 3.58 mc. output of oscillator 38 may be generated and then clipped to produce the pulses 62. Or, as illustrated in FIG. 2*a*, the 3.58 mc. output of oscillator 38 may be passed through a phase shifter 63 and applied to a pulse generator 64, such as a multivibrator, which produces the pulses 62. The phase shifter 63 is provided to facilitate the proper phasing of the pulses 62 with respect to the beam switching wave 51.

It has previously been explained that as the beam voltage is changed from 11.8 kv. to 20.1 kv. it penetrates first the red layer of the screen of FIG. 10, then the green layer, and finally the blue layer. This is indicated schematically in FIG. 16 by the representation of a three-color screen having the red, green and blue layers positioned opposite the low switching voltage value, the center switching voltage value, and the high switching voltage value, respectively.

Refer now to the phase of the switching voltage 51 relative to the color sub-carrier at the times it calls for red, yellow, green and blue for example. First note that the flat portion of wave 51 has been centered with respect to the peak of the color sub-carrier at the time it is phase modulated to call for green, as shown at graph (*d*). Thus the electron beam is at full current intensity at the time the beam is in the green layer of the screen. Note, referring to graph (*g*), that the beam is gated on during this time interval.

Likewise, comparing graph (*b*), the signal for red, and the graphs (*f*) and (*g*), it will be seen that the electron beam is at full current intensity when the beam is penetrating substantially only the red layer of the screen. Comparing graph (*e*), the signal calling for blue, and the graphs (*f*) and (*g*) it will be seen that the electron beam is at full current intensity when the beam is penetrating the blue layer of the screen.

It should be noted that when the beam voltage decreases in value (from 20.1 kv. to 11.8 kv.) so that the beam returns through the green layer, the phasing of the unblanking pulses 62 is such that the electron beam is cut off as it returns through the green. This is seen by comparing graphs (*f*) and (*g*). The screen of FIG. 10 is designed for this type of operation, that is, it is calculated for the 61 percent duty cycle operation above described.

FIG. 16 shows one example of the color sub-carrier phase modulated to call for a color other than a primary color. Graph (*c*) shows the color sub-carrier calling for yellow, that is, for equal amounts of red and green. Comparison of graphs (*c*), (*f*) and (*g*) shows that just prior to the peak of the carrier of graph (*c*), the beam is penetrating the red layer, and that just following the peak of the carrier, the beam is penetrating the green layer. Thus, red and green are produced successively to add in the eye to produce yellow. It will be noted that no blue is produced because at the high beam voltage in the region of 21.1 kv. the lower half cycle of the color sub-carrier is occurring, and has brought the television signal substantially to black level thereby cutting off the beam.

The television receiver of FIG. 2*a* may be simplified by omitting the use of the unblanking pulses 62 and, instead, boosting the amplitude of the chrominance signal with respect to the luminance signal. By boosting the chrominance signal to an amplitude about twice that of the normal value, for example, approximately the same pulsing or unblanking effect may be obtained as by the use of the pulses 62. The reason for this is that the negative half cycles of the color sub-carrier go well beyond the black level, cutting off the beam; whereas the positive half cycles are most effective at their narrow peaks for controlling the beam intensity.

The desired chrominance signal boost may be obtained by peaking the I.-F. amplifier, the video amplifier, or both, for the frequency band containing the modulated color sub-carrier components.

The televsion receiver of FIG. 2*a* may be further simplified, assuming reception of the present standard unsymmetrical signal, adopted by the FCC, by omitting the converter 50. For example, the unsymmetrical signal may be applied to the cathode ray tube, and the chrominance signal boosted. Because the signal is not symmetrical, there will be some error in the phasing of the switching voltage with respect to the chrominance signal, but with the switching voltage having a wave form similar to that shown at 51 in FIG. 2*b* this error may be minimized. Some errors in brightness and chromaticity values may be reproduced. By suitably adjusting the phase of the switching wave form and the relative amplitude of the chrominance signal, as mentioned above, certain colors can be reproduced with subjectively accurate results.

Figures 17, 18:
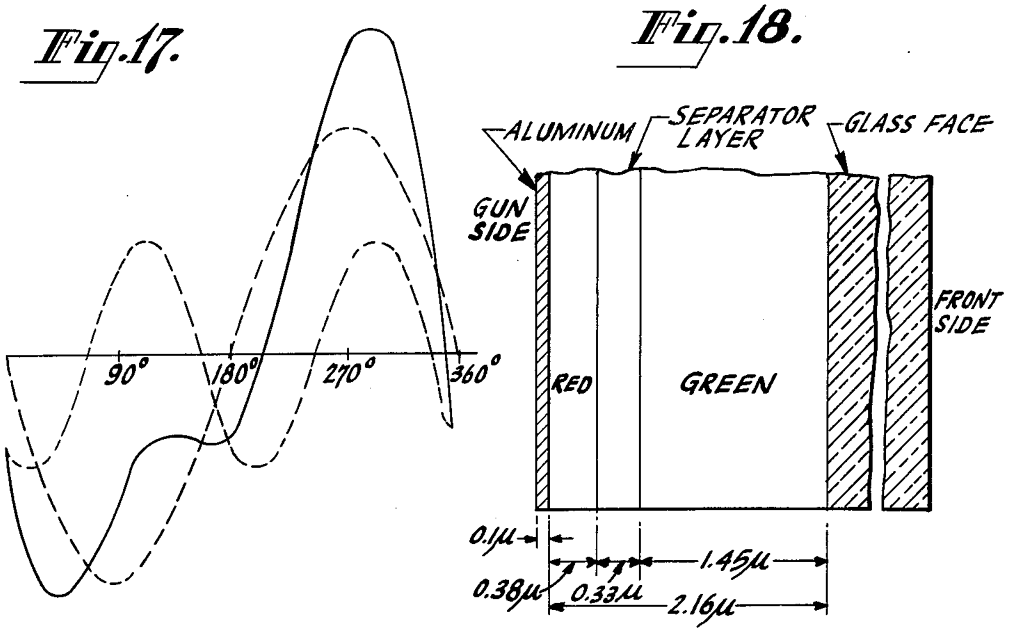
FIG. 17 is a group of graphs showing how the wave form of the second harmonic distorted beam switching voltage may be varied.
FIG. 18 is a view in cross section, greatly enlarged, of a two-color screen embodying the invention.

It may be found desirable to shift the position of the flat portion of the switching voltage wave form by changing the phasing of the second harmonic with respect to the fundamental as illustrated in FIG. 17. For example, if the phase of the second harmonic is advanced, with respect to the fundamental, the flat portion will be advanced and lowered below the A.-C. axis of the combined wave, thereby changing the relative switching times of the signal for the different color layers. In FIG. 17 the second harmonic is shown advanced by 45 degrees of the second harmonic wave.

It may also be desirable to increase the duration of the flat portion of wave 51 (FIG. 2*b*) whether a symmetrical or an unsymmetrical signal is being applied to the cathode ray tube. This may be done within the limits by increasing the amplitude of the second harmonic. For example, if the amplitude of the second harmonic is made three-fourths the amplitude of the fundamental, instead of one-half as in FIG. 2*b*, the duration of the effective flat portion is increased substantially. The "flat" portion now falls first slightly below and then slightly above the A.-C. axis of the wave, but it is still substantially a "flat" portion of the wave.

*Two-color screens*

EXAMPLES INCLUDING SCREEN OF FIG. 18

A two-color multilayer screen designed in accordance with certain features of the invention will now be described. An example of such a screen is shown in FIG. 18. The phosphor layer on the gun side is a red phosphor having the composition (0.1 Zn, 0.9 Cd).S:Cu. Its density $\rho$ is 4.76. The other phosphor layer is a green phosphor having the composition $Zn_2SiO_4$:Mn. Its density $\rho$ is 3.9.

The inert separator layer in this example is calcium tungstate ($CaWO_4$) which is unactivated, i.e., it does not emit light. Its density $\rho$ is 6.06.

The phosphor layers and the inert layer are the same type of dense layers as used in the three-color screens, and may be laid down by the same process. They may be evaporated layers, but preferably are layers of closely packed fine phosphor powders laid down for example, by the slurry process or Kell process. The use of fine powders is assumed in the calculations for the example shown in FIG. 18.

The relative conversion efficiencies of the red and green phosphors are made 1 and 5, respectively.

The screen of FIG. 18 is calculated for use with a 16 kv. electron beam that is 20 percent modulated by a sine wave voltage whereby the beam voltage swings from 12.8 kv. to 19.2 kv. peak to peak.

Figure 19:
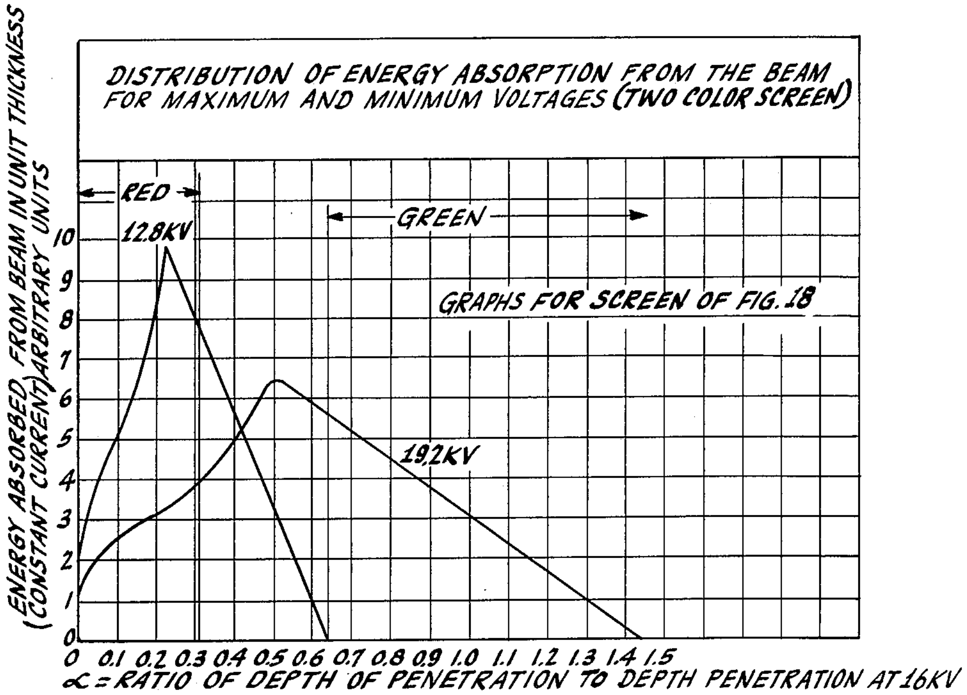
FIG. 19 is a group of graphs showing electron beam energy absorption at two beam voltages for the screen of FIG. 18.

FIG. 19 shows the energy absorption of the beam in the screen layers of the screen of FIG. 18 for the minimum and maximum beam voltages. At the maximum voltage of 19.2 kv. about 41 percent of the beam energy is absorbed in the green layer, the remaining beam energy being absorbed in the red layer and in the inert separator layer. Here, as in the case of the three-color screens, when the beam is switched into the phosphor layer that is not on the gun side, more of the beam energy is absorbed in the layers between the layer switched into and the surface on which the beam is incident than in the layer switched into. In this example, at 19.2 kv., 59 percent of the beam energy is absorbed in the red and inert layers. This ignores the comparatively small amount of energy absorbed in the aluminum backing layer.

Figure 20:
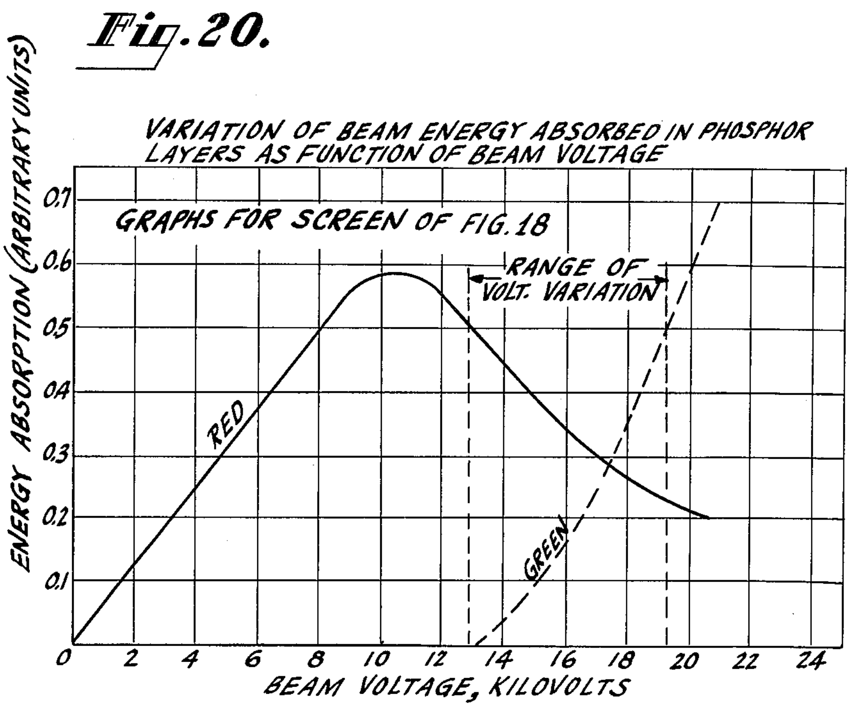
FIG. 20 is a group of graphs showing electron beam energy absorption in the different phosphor layers of the screen of FIG. 18 as a function of electron beam voltage.
Figure 21:
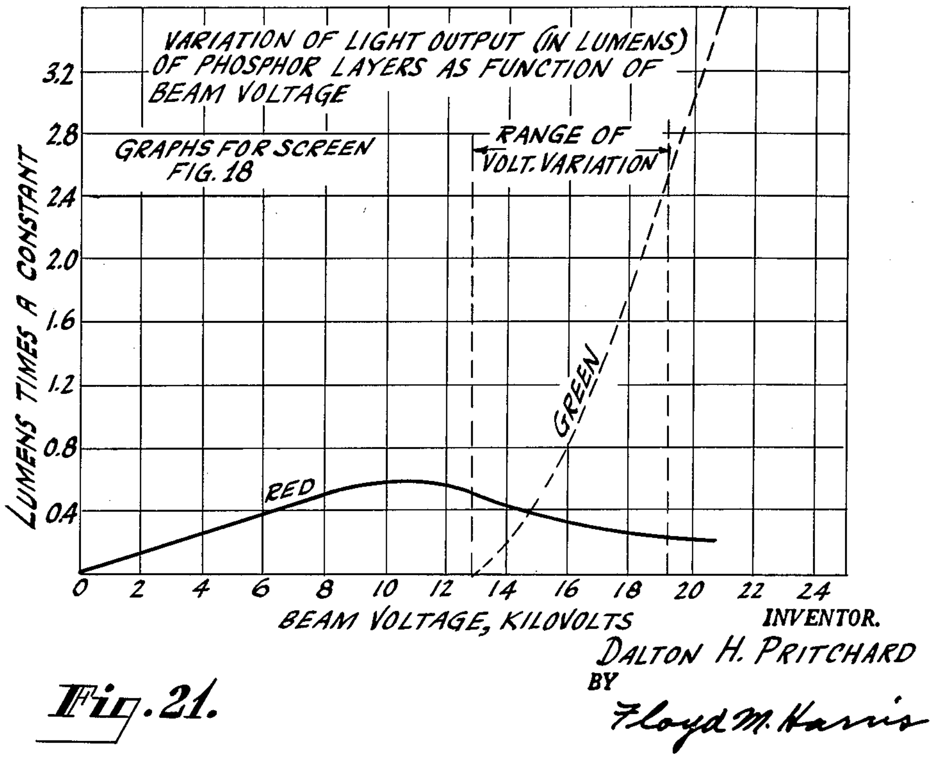
FIG. 21 is a group of graphs showing in arbitrary units the light output (lumens) from the different phosphor layers of the screen of FIG. 18 as a function of electron beam voltage.

FIG. 20 shows the beam energy absorbed in the phosphor layers of the screen of FIG. 18 as a function of the beam voltage (beam current being constant). FIG. 21 is a corresponding set of graphs showing the light output of the phosphor layers in lumens times an arbitrary constant as a function of beam voltage.

Figure 22:
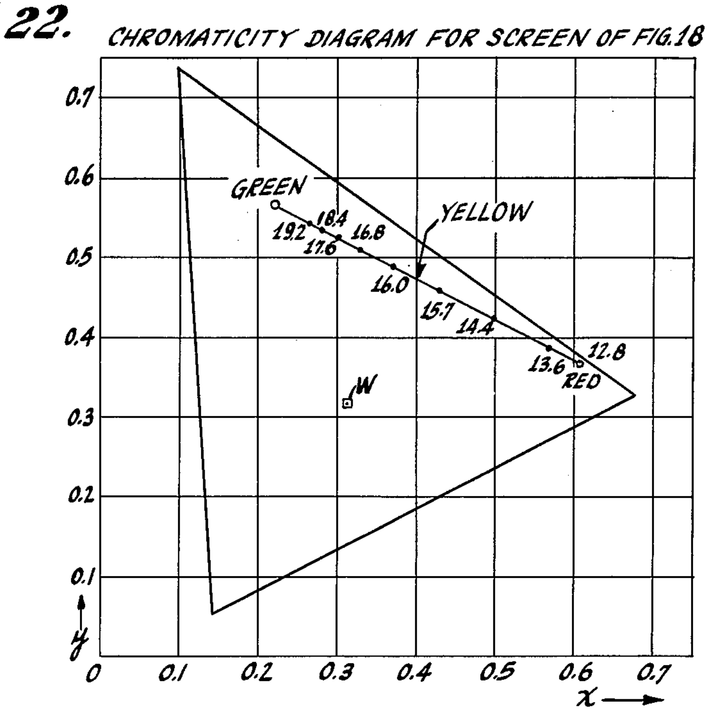
FIG. 22 is a chromaticity diagram for the screen FIG. 18.

FIG. 22 is a chromaticity diagram for the two-color screen of FIG. 18. The color point for the red phosphor is $x=0.606$, $y=0.365$. The color point for the green phosphor is $x=0.218$, $y=0.563$. It will be seen that as the beam voltage is increased from 12.8 kv. to 19.2 kv. the color goes from a red, through yellow at about the 16 kv. center voltage, to a green at 19.2 kv.

In the two-color screen example just described there is no true white, there being instead the yellow or yellowish white in the region of the center voltage.

For the three-color screens, the beam energy absorption in the different phosphor layers was given for the condition of no chrominance signal and the production of white light. The corresponding beam energy absorption in the layers of the two-color screen of FIG. 18 is for the condition of no chrominance signal and the production of yellow light. Thus, for constant beam current, and with the beam being velocity modulated as specified, 35.5 percent of the beam energy is absorbed in the red layer, 44.3% in the separator layer, and 20.2% in the green layer. The corresponding color point for the resulting yellow light is $x=0.4$, $y=0.47$. This corresponds approximately to a constant beam voltage of about 15.8 kv.

It may be preferred to design a two-color screen so that it will produce a true white light, particularly if the screen is to be used for reception of both color pictures and black and white pictures. One example of such design is a screen in which one prosphor layer produces an orange color and the other phosphor layer produces a cyan color. The orange phosphor is the least efficient of these two phosphors and is located on the gun side of the screen. Such a screen is designed and operated in the same way as the screen of FIG. 18. Since orange and cyan are on opposite sides of the white color point on a chromaticity diagram (on the I axis of the present color television signal standards), the color gamut runs through white. Similarly, the two phosphors may be red and cyan. Therefore, with only a luminance signal (or a black and white signal) being received, and with the electron beam being velocity modulated or switched as specified, the screen will give a good black and white picture.

For black and white pictures it may be preferable to operate the television receiver with the electron beam held at a fixed voltage which produces white.

The separator layer material used in a two-color screen may be the same as that used in a three-color screen. For example, it may be colloidal silica or fine powder mica.

The principles in the design of a two-color screen are similar in most respects to those for a three-color screen. More specifically, a low switching voltage is selected which is too low to shift the peak of the beam energy absorption curve into the phosphor layer that is away from the gun side of the screen. The phosphor layer that is away from the gun side is to have a conversion efficiency greater than that of the layer on the gun side. The phosphor layers are to have an inert separator layer between them to reduce color cross-talk. In the example of FIG. 18 red and green phosphors are to be used, with the red phosphor on the gun side. Thus the green phosphor is to have the higher conversion efficiency.

A two-color screen may be calculated by a procedure similar to that employed for a three-color screen. An example of a procedure not employing calculation for layer thicknesses will be described later in connection with the two-color screen of FIG. 24.

The two-color screens described above may be used in the television receiver shown in FIG. 1*a*, but with the converter 25 omitted. The two-color screen replaces the three-color screen 11.

Figure 23:
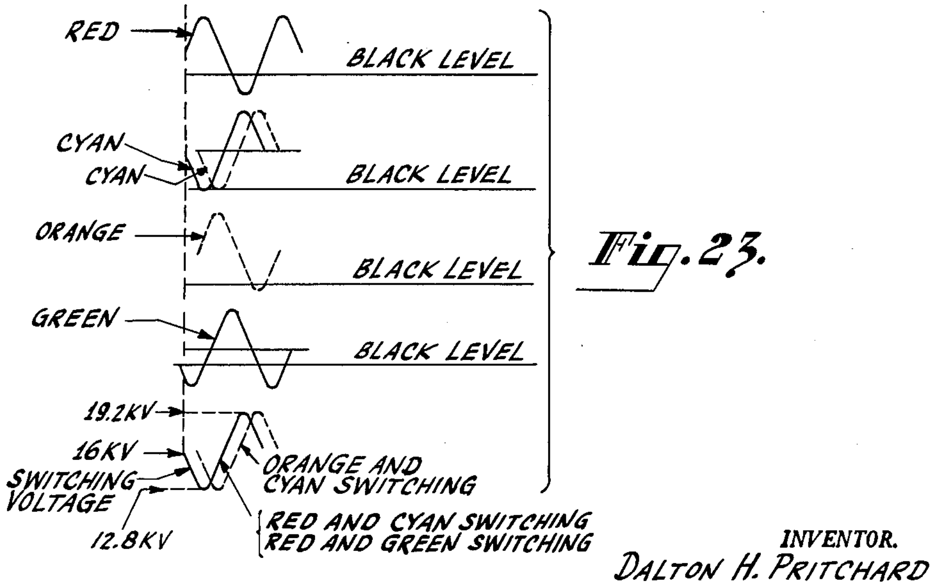
FIG. 23 is a group of graphs that are referred to in describing examples of the invention utilizing two-color screens.

Assume that the signal is in the symmetrical form as applied to the cathode ray tube. Then for the screen of FIG. 18 using red and green phosphor layers, the phase relation of the switching voltage and the chrominance signal may be as shown in FIG. 23 where the switching voltage is 180 degrees out of phase with the chrominance signal calling for saturated red. The peak of the switching voltage does not coincide with the peak of the signal calling for saturated green, as would be preferred, but it is fairly close to the peak value for green. Therefore, the switching operation is satisfactory. However, it might be desirable to advance the phase of the switching voltage a few degrees with respect to the red signal. The black levels indicated in FIG. 23 are for a signal of symmetrical form.

If the screen is made so that the colors from the two phosphor layers of the screen are red and cyan, respectively, the phasing of the switching voltage is correct as shown for the signal when calling for red and also when calling for cyan, as is apparent from an inspection of FIG. 23.

If the two-color screen is made with the phosphor layers giving orange light and cyan light, respectively, the switching voltage should be retarded about 30 degrees with respect to the signal calling for saturated red. The switching voltage so retarded is shown in dotted line. Comparing it with the orange and cyan signals, also shown in dotted line, it is seen that the switching voltage is at minimum voltage when orange signal is maximum, and at maximum voltage when cyan signal is maximum. Thus the beam is switched into the orange phosphor and into the cyan phosphor at the proper times.

If the signal applied to the cathode ray tube is in the symmetrical form, the 30 degrees retardation of the switching voltage mentioned above is exactly the correct amount. If the signal is in the asymmetrical form (the present standard signal), the switching voltage should be retarded 33 degrees to give exactly the correct phasing. However, such exact phasing is not necessary for satisfactory results.

In operating a two-color screen, the color may be improved by boosting the chrominance signal with respect to the luminance signal, as explained in connection with the three-color screens.

EVAPORATED LAYER SCREEN OF FIG. 24

Figures 24, 25:
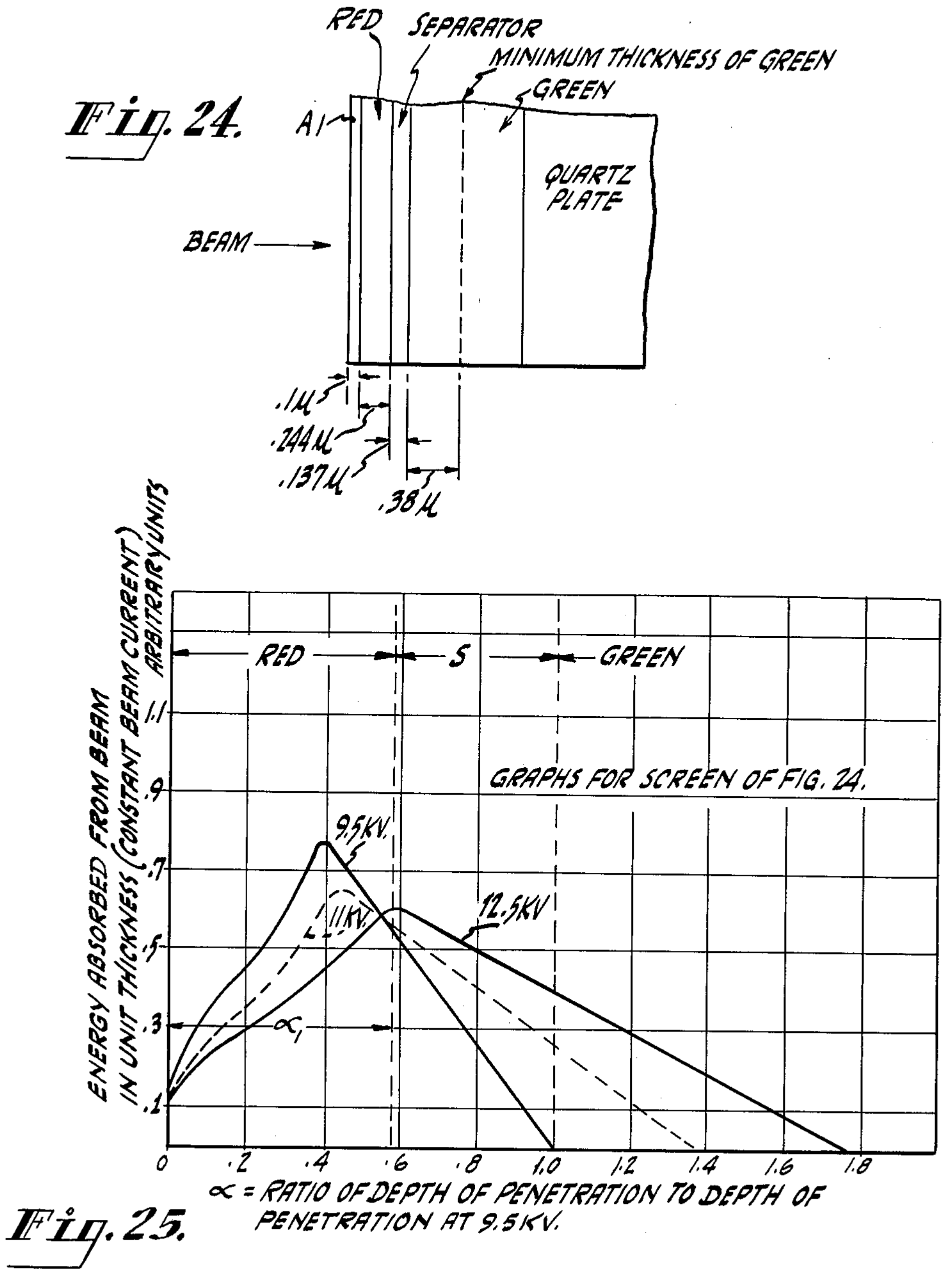
FIG. 24 is a view in cross section, greatly enlarged, of another two-color screen that is constructed in accordance with an embodiment of the invention.
FIG. 25 is a group of graphs showing electron beam energy absorption at different beam voltages for the screen of FIG. 24.

An example of a two-color multilayer screen comprising layers formed by evaporation will now be described. Its structure is shown in FIG. 24. It comprises a green phosphor layer on a quartz supporting plate, a separator layer on the green phosphor, and a red phosphor layer on the separated layer and on the gun side of the screen. All layers are evaporated on by a procedure that will be described.

The materials for the screen layers are:

Green phosphor (willemite) $Zn_2SiO_4$:Mn, $\rho=3.9$
Separator—unactivated $CaWO_4$, $\rho=6.06$
Red phosphor—ZnS-Cds(1:9):Cu, $\rho=4.8$ The layer thicknesses are as follows, given in both milligrams per square centimeter and in microns:

| | Mg./cm.² | Microns |
|---|---|---|
| Green (minimum thickness) | 0.15 | 0.384 |
| Separator | 0.083 | 0.137 |
| Red | 0.117 | 0.244 |

The approximate relative conversion efficiencies of the phosphors are:

Red=1, Green=4

This screen may be operated by a low switching voltage as, for example, by changing the beam voltage from 9.5 kilovolts, which gives a good red, to 12.5 kilovolts, which gives a good green. The energy absorption distribution graphs for these minimum and maximum voltages, and for the center voltage, are shown in FIG. 25. It will be noted that when the electron beam is switched into the phosphor layer away from the gun side (into the green layer) the peak of the 12.5 kv. energy absorption graph is outside the layer (green) switched into, and on the gun side of this layer. Also, more of the beam energy is absorbed in the screen layers that are on the gun side of the layer switched into than in the layer switched into.

The procedure for laying down the specific screen of FIG. 24 will now be described. This screen is laid down on a transparent quartz plate 2 inches by 2 inches. A six inch diameter bell jar which can be evacuated is employed in the evaporation process. An ionization gage is used to determine the degree of evacuation. The procedure is as follows:

The piece of flat quartz plate is cleaned by rinsing with a detergent, rinsing with water, then rinsing with chromic acid solution and finally rinsing with several distilled water rinses. It is then dried by means of brown paper towels; after which it is heated in a gas flame. Handling is done with a tungsten wire clip. The quartz glass is placed in the bell jar while still hot.

In the bell jar the quartz glass is clamped on the under side of a hot plate. This hot plate is a thin sheet of Pyrex glass with an electrically conducting coating on its top side, by means of which heat can be applied. A thermocouple of very thin iron constantine wire is connected to the bottom side of the hot plate. A Pyrex cylinder approximately 3 inches in diameter and 4 inches long is mounted between the quartz to be coated and the evaporating source. The Pyrex cylinder serves to partially isolate the evaporating region from the main volume of the bell jar. A tantalum mask with the desired geometry is mounted on the upper end of the Pyrex cylinder. At the lower end of the Pyrex cylinder is the evaporating source which consists of one or more quartz cups within which cone shaped coiled tantalum filaments are mounted. Phosphor materials to be evaporated are poured into the basket formed by the cone shaped filament. Thus, the material to be evaporated is about four inches from the quartz plate.

To form the green emitting willemite film ($Zn_2SiO_4$:Mn)

two quartz cups containing tantalum heaters in the form of cone shaped baskets are used, one cone shaped basket containing about 20 milligrams of $SiO_2$ and .5 to 1.0 milligrams of $In_2O_3$, and the second cone shaped basket containing 25 milligrams of $Zn_2SiO_4$:Mn. As previously indicated, the material to be evaporated is about four inches from the quartz plate.

The quartz plate is degassed by raising the hot plate temperature to about 450° C. At the same time the temperature of the two tantalum heaters in the quartz cups, containing the material to be evaporated, is set to about 300° C. After about 15 minutes at the above temperatures the quartz plate temperature is lowered to about 300° C. After an indicated pressure of $5\times10^{-6}$ millimeters of Hg from the ionization gage is reached, the heater containing the $SiO_2$ and $In_2O_3$ is slowly raised to 1500° C. It is left at that temperature for about 30 seconds, the tantalum heater and hot plate are then shut off. After the quartz plate reaches a temperature of about 30° C. the heater containing the $Zn_2SiO_4$:Mn is slowly raised to 1600° C. and left at that temperature for 18 minutes. The freshly evaporated film will have a metallic mirror surface. The evaporated film is then fired at 1000° C. in air for 3 to 5 minutes. This produces a green luminescent, transparent film.

The separator layer is formed as follows:

After the willemite film is fired at 1000° C. in air, it is again clamped on the hot plate and placed in the bell jar. The quartz plate is then degassed at 450° C. After it cools off to 30° C., the evaporator, a tungsten boat containing 120 milligrams of $CaWO_4$ (located about four inches from the quartz plate), is raised to 1950° C. and kept at that temperature for 6 minutes, for the proper thickness of the spacer film. It is again removed from the bell jar and fired in air at 600° C. for 2 minutes.

The red phosphor layer is formed as follows:

To a mixture of 155 milligrams ZnS-CdS (1 to 9 by wt.) five milligrams of hydrogen-reduced copper powder are added. The complete mixture is poured into the basket formed by a cone shaped tantalum heater in the quartz cup. As before, the material to be evaporated is about four inches from the quartz plate. The quartz plate is again clamped on to the hot plate and degassed at 400° C. After about 15 minutes at 400° C. the quartz plate temperature is lowered to 190° C. The tantalum heater of the evaporating source is slowly raised to 800° C. at about which temperature the film starts to form. The temperature of the heater is then raised 100° C. per minute up to 1400° C. When this heater temperature of 1400° C. is reached, the quartz plate temperature is is raised from 190° C. to 300° C. When the quartz plate reaches 300° C. the tantalum heater is raised to 1700° C. for 2 minutes and shut off. The quartz plate temperature is then raised to 450° C. for about 10 minutes. This final 10 minute bake (the post baking) can also be performed in a furnace using an inert atmosphere.

Figure 26:
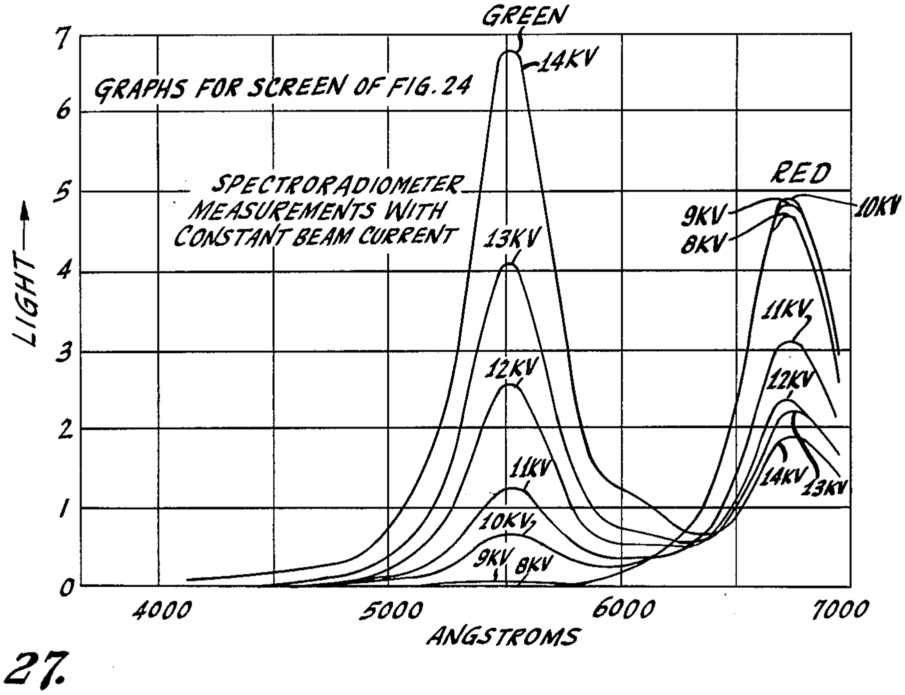
FIG. 26 is a group of graphs showing spectral characteristics of the screen of FIG. 24 for different beam voltages.

The light output characteristics of the screen of FIG. 24 are shown by the spectroradiometer graphs of FIG. 26. They were taken by a common type of spectroradiometer calibrated to produce a straight horizontal line over the frequency range when measuring an equal energy white light source (C-illuminant). The graphs are light output from the screen plotted against the wave length of the light in angstroms. The different graphs are taken at different electron beam voltages with the beam current the same for all beam voltages. The measurements were made at beam voltages of 8, 9, 10, 11, 12, 13 and 14 kilovolts as indicated on the graphs.

It will be seen that maximum red was obtained at 9 or 10 kv. with practically no green. As the beam voltage was increased, the red decreased, the green appeared and increased with increased beam voltage.

Figure 27:
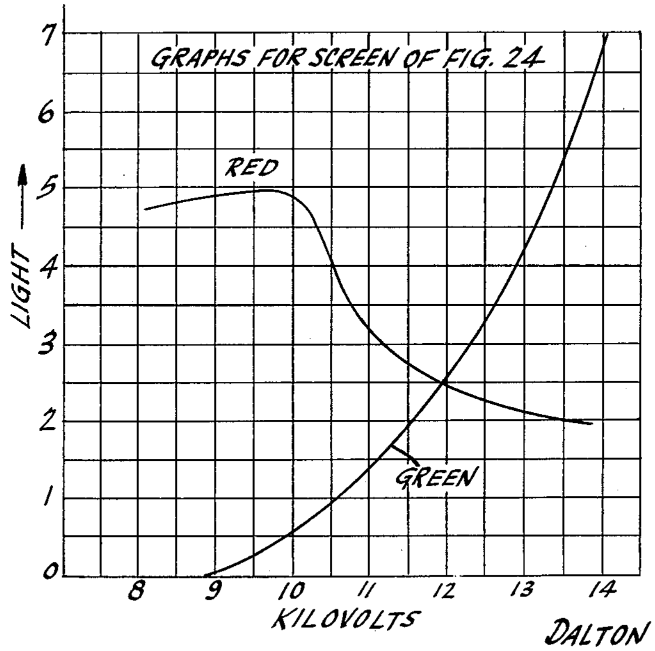
FIG. 27 is a graph showing light output versus relative beam voltage for the screen of FIG. 24.

FIG. 27 is a plot of the red and green peak values (taken from FIG. 26) against the beam voltage (beam current constant). At 9.5 kv., for example, the light from the screen is red. At 12.5 kv., for example, the light from the screen is green although there is some red light from the red layer mixed in with the green light from the green layer. At about the center voltage of 11 kv. the light from the screen is a yellow.

Figure 28:
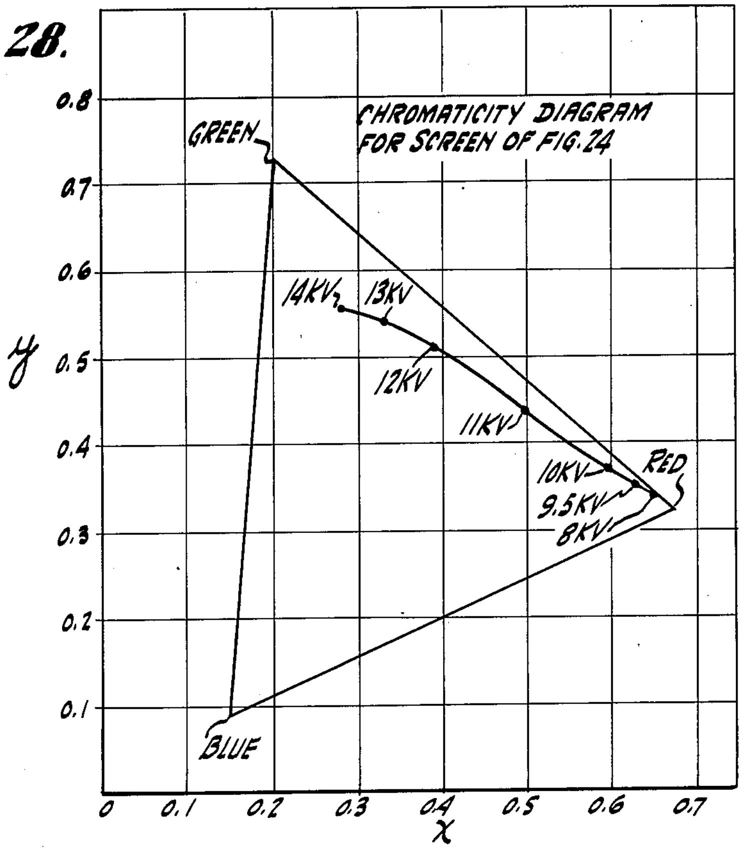
FIG. 28 is a chromaticity diagram for the screen of FIG. 24.

FIG. 28 shows a chromaticity diagram for the screen of FIG. 24. The large triangle is a chromaticity diagram of the phosphors used in a shadow mask color tube, such as types 21AXP22 or 21CYP22A and is included for reference. On the diagram for the FIG. 24 screen, the beam voltages are indicated in kilovolts. It will be noted that the screen is switched from a good red to a good green by switching from 9.5 kv. to 12.5 kv.

The screen of FIG. 24 was designed by following the principles of the invention which include the selection of a switching voltage difference that is so low that when switched into the phosphor layer that is away from the gun side of the screen (the green layer), the peak of the beam energy absorption curve is out of this layer, and is on the gun side thereof. More important, more of the beam energy is absorbed in the layers on the gun side of the green layer than in the green layer. This phosphor layer (green) is to have a higher conversion efficiency than that of the phosphor layer (red) on the gun side. The phosphor layers are to have an inert separator layer between them to reduce color cross-talk. The preferred color order is red, green, reading from the gun side. This order is preferred for television receivers because the important color red will be the most saturated color, and because the important flesh tones will be fairly accurately reproduced.

The aim of the procedure described below is to obtain the minimum switching voltage for a desired or predetermined color gamut.

First the green layer is evaporated to a thickness that is more than the minimum thickness that will be required. Then the separator layer is evaporated to a thickness that will be too thin according to estimates of the desired thickness. Next the red layer is evaporated, and an aluminum coating is evaporated on the screen.

The completed screen is then put in a demountable cathode ray tube, and a set of light vs. beam voltage graphs obtained by use of a spectroradiometer. These graphs are of the type shown in FIG. 26. If the separator layer is too thin, as has been assumed, when the predetermined color gamut is obtained the switching voltage will be too high.

Another screen is then made with increased separator thickness, the red layer thickness being kept the same as in the first screen. A second set of graphs are obtained by the spectroradiometer. The predetermined color gamut will now be obtained with a lower switching voltage since there is less red in the green when switched into the green layer.

The process is repeated with a third screen having a separator layer of still greater thickness. If by this time the separator layer is too thick it will be found that at the predetermined color gamut the switching voltage has not decreased. Now, from the data obtained from the three samples, three points of switching voltage vs. separator layer thickness are known and a graph can be drawn through these points. The optimum separator layer thickness can be picked off this graph.

The correct separator layer thickness having been found, the next step is to determine the correct thickness of the red phosphor layer. Different samples are now tested with different thicknesses of red phosphor. The red phosphor thickness determines the color of the light from the screen at an intermediate beam voltage, such as the center beam voltage. For television use it usually would be desired that at the center voltage the light output would be yellow which is the color most closely approximately white for this particular screen.

*Simultaneous beam operation*

Instead of employing a single-gun cathode ray tube with velocity or voltage switching of the electron beam, it may be preferred to employ a three-gun cathode ray tube (for a 3-color screen) or a two-gun cathode ray tube (for a 2-color screen), and thus avoid high voltage switching. The screen previously described, by way of example, may be used in a multiple-gun tube with simultaneous operation of the electron beams. If in such operation the colors do not mix in the proper relative amounts to give white in the absence of chrominance signal, the intensity of one or more beams may be adjusted until white is obtained.

A SCREEN DESIGNED FOR SIMULTANEOUS BEAM OPERATION

For multiple-gun simultaneous-beam operation it is preferred to design the multilayer screen specifically for such operation so as to obtain the best color gamut for the operating conditions. One example of a 3-color screen so designed will now be given. It will be referred to as a 3-gun screen.

Figure 29:
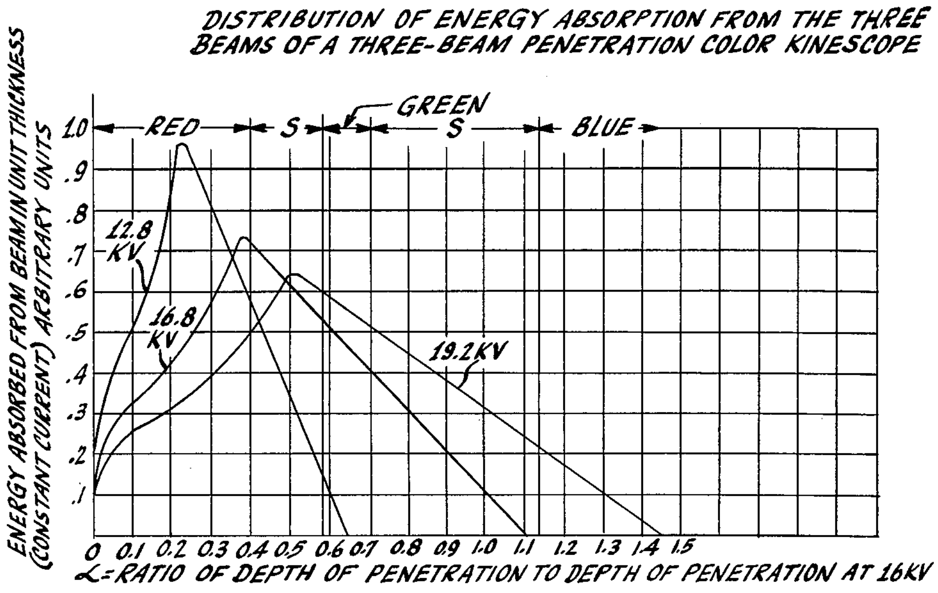
FIG. 29 is a group of graphs showing electron beam energy absorption from three electron beams of different voltages in a multilayer screen designed for simultaneous beam operation.

The graphs in FIG. 29 show the energy absorption distribution in the 3-gun screen from the three electron beams. The beam voltages in this example are 12.8 kv. for red, 16.8 kv. for green and 19.2 kv. for blue.

Figure 30:
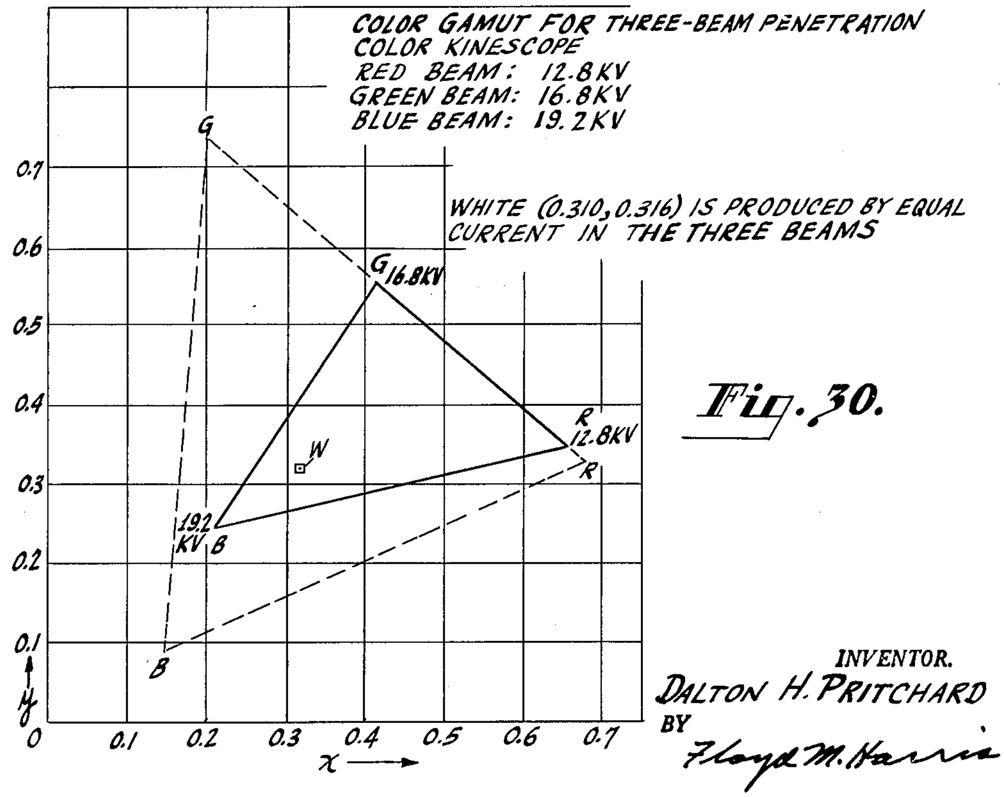
FIG. 30 is a chromaticity diagram for the simultaneous beam operated screen represented in FIG. 29.

In FIG. 30 the solid line triangle shows the chromaticity diagram for the 3-gun screen operated with the three beams at the beam voltages of 12.8 kv., 16.8 kv. and 19.2 kv., respectively, and with equal current in the three beams. The corners of the large dotted line triangle are located at the chromaticity coordinates (ICI *x*, *y* coordinates) for the red, green and blue phosphors used in the 3-gun screen.

The actual structure of the 3-gun screen is the same as that of the screen shown in FIG. 3, except that the relative conversion efficiencies of the phosphors are different. In the 3-gun screen being described, the relative conversion efficiencies for the red, green and blue layers are 1, 10.1 and 8.1 respectively. In the screen of FIG. 3 the relative conversion efficiencies for red, green and blue are 1, 11.7 and 13.2, respectively. Otherwise, the two screen structures are the same, the layer thicknesses being the same. The materials also are the same except that the processing (or dilution by inert material) of the green and blue phosphors is different to give the desired relative conversion efficiencies.

A feature to be noted in the operation of this 3-gun screen is that the beam for the green color is not at the center voltage of 16 kv. but, instead, is at 16.8 kv. The reason for this will become apparent from the following discussion of how the 3-gun screen was calculated.

A 3-gun or 2-gun screen for simultaneous beam operation may be calculated in the same way the screen of FIG. 3 was calculated. However, the specific 3-gun screen being described was calculated on the basis that the chromaticity diagram of FIG. 8 for the screen of FIG. 3 shows a suitable color gamut. Therefore, the three beam voltages at the points of the triangle were selected for the three guns. They are 12.8 kv., 16.8 kv. and 19.2 kv. The screen was assumed to be the same as that of FIG. 3, except for the necessary change in phosphor efficiencies to give white light with equal beam currents.

SCREEN CALCULATIONS (MODIFYING FIG. 3 SCREEN)

The energy absorbed in each phosphor layer for each beam voltage was computed. This was done from the following equations previously given in connection with color coordinate calculations.

$$E_r(V)=F\left(\alpha_1\frac{V_0^2}{V^2}\right)$$

$$E_g(V)=F\left(\alpha_3\frac{V_0^2}{V^2}\right)-F\left(\alpha_2\frac{V_0^2}{V^2}\right)$$

$$E_b(V)=1-F\left(\alpha_4\frac{V_0^2}{V^2}\right)$$

$E_r(V)$ is the fraction of the total beam energy that is absorbed in the red layer. Similarly $E_g(V)$ and $E_b(V)$ are the fractions of the total beam energy that are absorbed in the green and blue layers, respectively. The value for $V_0$ is 16 kv. V has the three values of $V_r=12.8$ kv., $V_g=16.8$ kv. and $V_b=19.2$ kv. It is assumed that the three beam currents are equal when white light is produced.

The calculations are made in the following manner, taking the calculation of $E_r$ as an example. $E_r(V_r)$ at voltage 12.8 kv. is calculated and then multiplied by $V_r/V_0$. $E_r(V)$ is also calculated for $V_g=16.8$ and $V_b=19.2$, the result of each calculation then being multiplied by $V/V_0$. Specifically, $E_r(V_g)$ is multiplied by $V/V_0$ and $E_r(V_b)$ is multiplied by $V/V_0$. The three resulting values are then added to obtain the sum $E_r^w$, this being the beam energy absorbed in the red layer in relative units when white light is produced. The same procedure is followed in obtaining $E_g^w$ and $E_b^w$. The reason for multiplying by $V/V_0$, as described above, is that with equal current in the three beams as here assumed, the beam energy of each beam is proportional to the beam voltage. Before multiplying by $V/V_0$, the value obtained is correct assuming the beam powers are equal, this meaning that the beam currents are different. Therefore, to correct for the use of equal beam currents the values are multiplied by $V/V_0$ as described.

The values for the beam energy absorbed in each of the three phosphor layers are ones that are fixed by the assumed screen structure.

Now the relative conversion efficiencies of the phosphor layers necessary to give white light with equal intensity beams are to be determined. The red phosphor is the least efficient of the three phosphors. Its relative conversion efficiency is taken as 1. The desired relative conversion efficiencies for the red, green and blue layers may be calculated from the following equation.

$$\left[\frac{V_r}{V_0}E_r(V_r)+\frac{V_g}{V_0}E_r(V_g)+\frac{V_b}{V_0}E_r(V_b)\right]:$$

$$\frac{Y_g/E_g}{Y_r/E_r}\left[\frac{V_r}{V_0}E_g(V_r)+\frac{V_g}{V_0}E_g(V_g)+\frac{V_b}{V_0}E_g(V_b)\right]:$$

$$\frac{Y_b/E_b}{Y_r/E_r}\left[\frac{V_r}{V_0}E_b(V_r)+\frac{V_g}{V_0}E_b(V_g)+\frac{V_b}{V_0}E_b(V_b)\right]$$

$$=0.30:0.59:0.11$$

In this equation $V_0=16$, $V_r=12.8$, $V_g=16.8$ and $V_b=19.2$. $Y_r$ is the amount of light in lumens obtained from the red phosphor layer when the beam power $E_r$ is absorbed in it. Similarly, $Y_g$ and $Y_b$ are the amounts of light in lumens obtained from the green and blue phosphor layers, respectively, when the beam powers $E_g$ and $E_b$, respectively, are absorbed in these layers. The values 0.3, 0.59 and 0.11 are the relative amounts of red, green and blue, respectively, in lumens required from the particular phosphors (having P22 spectral distributions) to give white light (C-illuminant).

Taking the relative conversion efficiency of the red layer as 1; the relative conversion efficiency of the green layer, appearing in the equation as $$\frac{Y_g/E_g}{Y_r/E_r}$$

is found to be 10.1; and the relative conversion efficiency of the blue layer, appearing in the equation as $$\frac{Y_b/E_b}{Y_r/E_r}$$

is found to be 8.1.

Screens may be designed without employing the particular calculation procedures that have been described. For example, keeping in mind the principles of the screen design, the graphical design procedure described below may be employed.

A GRAPHICAL DESIGN PROCEDURE

The general screen design procedure is well illustrated by taking as an example a graphical design procedure for the three-gun screen. First, three practical beam voltages are assumed. For the purpose of drawing the beam energy absorption graphs, it will be assumed that the screen has uniform density from front to back. With this assumption, the beam energy absorption graphs for the three beam voltages may be drawn. In FIG. 29 these are the graphs for assumed voltages 12.8 kv., 16.8 kv. and 19.2 kv. Actually, on a first design, a center voltage of 16 kv. rather than 16.8 kv. would probably be selected.

These energy absorption graphs are drawn in accordance with the Thomson-Whiddington penetration law and the Gentner energy distribution curve, both previously mentioned. Experimental evidence shows that these energy absorption graphs are substantially correct, and that the light output from a phosphor is substantially proportional to the energy absorbed in a phosphor.

Referring to FIG. 29, the total mass thickness of the screen is determined by the 19.2 kv. graph, that is, by the maximum penetration of the 19.2 kv. beam. This total mass thickness does not include the portion of the blue phosphor not penetrated by the electrons of the 19.2 kv. beam.

The preferred color order of the phosphor layers is selected, namely, red, green, blue, reading from the gun side. Three specific phosphors are selected which have spectral distributions, respectively, that can give a white light mix. Also, green and blue phosphors are selected which have a greater conversion efficiency than the phosphor layer (red) on the gun side. The phosphor layers are to be spaced apart by inert separator layers.

It is assumed that all the layers through which an electron beam must pass are substantially uniform, homogeneous, and closely packed in the sense that substantially all of the electrons of the beam will strike beam energy absorbing material as they pass through a layer, and will strike substantially the same amount of material in the layer regardless of where the electrons impinge on the layer area. In the present example this includes all layers except the blue phosphor layer.

The mass thicknesses of the screen layers can now be determined as follows:

The red layer is made thick enough so that a large part of the 12.8 kv. beam energy is absorbed in it. Thus, in FIG. 29 the front or viewing surface of the red layer is represented by a vertical line drawn through the back sloping portion of the 12.8 kv. graph, and positioned, in the example shown, at the abscissa 0.4. It will be understood that a different abscissa such as 0.45 might have been selected. Unity on the axis of abscissa represents the penetration in depth of the electrons for the mean voltage, 16 kv. The amount of red light that will be obtained from the red phosphor can be figured from the area of the red phosphor under the 12.8 kv. energy absorption graph. This, of course, is a calculation that assumes no color modulation. It will be remembered that the light output of the phosphor is substantially in direct proportion to the energy absorbed in the phosphor.

Now that the amount of red light is known, the amount of blue light required from the blue phosphor to give its proper contribution for a white light mix is readily calculated. This fixes the position of the vertical line representing the gun side surface of the blue phosphor. This line is drawn through the back sloping portion of the 19.2 kv. energy absorption graph at a point where the area in the blue phosphor layer under the 19.2 kv. graph will be the correct value to give the required blue light. In the example shown, this line is positioned at the abscissa 1.14. It is evident that, because of the relatively high conversion efficiency of the blue phosphor, only a small part of the energy of the 19.2 kv. beam is required to be absorbed in the blue phosphor.

The mass thickness of the green phosphor layer and its spacing with respect to the other two phosphor layers is now to be determined. The conversion efficiency of the green phosphor selected is high enough so that the green phosphor layer can be fairly thin to permit good spacing between the phosphor layers.

A line representing the gun side surface of the green layer is drawn through a selected point on the back slope of the 16.8 kv. energy absorption graph. The point selected is such as to give sufficient spacing between red and green layers to keep the green layer from being penetrated substantially by the 12.8 kv. beam, and still permit sufficient energy from the 16.8 kv. beam to be absorbed in the green phosphor. In the example shown, the gun side surface of the green layer is at the abscissa 0.59.

To complete the screen it now remains to determine the thickness of the green phosphor layer. This is done by drawing a line representing the front or viewing surface of the green layer through a point on the back slope of the 16.8 kv. graph where the area in the green layer under the 16.8 kv. graph will be the correct value to give the required amount of green light for a white light mix.

In the example shown, the viewing surface of the green phosphor layer is at the abscissa 0.7.

As to the separator layers, it will be evident that their mass thicknesses have now been determined since the spacings between phosphor layers have been determined. Thus, the design of the screen has been completed.

From the earlier example of thickness calculations it should be evident how, from the diagram of FIG. 29, the mass thickness of the layers may be found in terms of milligrams per square centimeter. To review, the abscissas of the graphs in FIG. 29 are the ratios of the depth of beam penetration (that is, the depth below the surface of beam incidence) to the depth of penetration for the electron beam at 16 kv. Thus, maximum penetration for a 16 kv. beam would be at 1.0 on the abscissa axis. The depth of penetration is measured in units of mass thickness.

The beam penetration at 16 kv. (according to the Thomson-Whiddington law) is $2.3\times10^{-3}V^2$=mg./cm.$^2$ where V is in kilovolts. Thus, the mass thickness of the screen from the surface of beam incidence (0 on the abscissa axis of FIG. 29) to 1.0 on the abscissa axis is $2.3\times10^{-3}\times16^2$=.59 mg./cm.$^2$. The mass thicknesses of the different layers are now readily determined. The mass thickness of the red layer, since its front surface falls at 0.4 on the abscissa, is $0.4\times0.59$ mg./cm.$^2$=0.24 mg./cm.$^2$. The mass thickness of the separator layer between the red and green layers, since its front surface is at 0.59 on the abscissa, is $0.59\times0.59$ mg./cm.$^2$ minus the mass thickness of the red layer. The mass thicknesses of the remaining layers are calculated similarly.

The color gamut that may be obtained from this screen should be found to be satisfactory if the ratios of the conversion efficiency of the green phosphor and of the blue phosphor to the conversion efficiency of the red phosphor are not too low. The conversion efficiency ratio of the green phosphor to the red phosphor may be either greater than or less than the conversion efficiency ratio of the blue phosphor to the red phosphor.

It will be apparent that while the foregoing procedure is particularly applicable to a screen for simultaneous beam operation, it may also be applied to a screen design for use with a single beam that is modulated by a sine wave, for example. The graphical process is more tedious in the case of beam switching since a succession of energy absorption graphs must be drawn for each single one in the example described. Also, the length of time that the beam is at a particular voltage must be taken into account. This involves the wave shape of the switching voltage. For these reasons, the mathematical procedure previously described for determining mass thickness of the layers is preferred for the case of beam switching.

Figure 31:
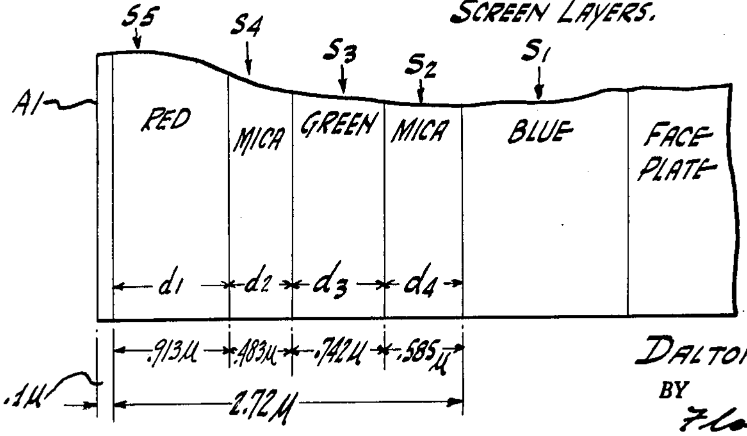
FIG. 31 is a view in cross section, greatly enlarged, of another multilayer screen that is constructed in accordance with an embodiment of the invention.

*The three-color screen of FIG. 31*

DESCRIPTION OF FIG. 31 SCREEN

Another example of a screen embodying the invention will now be described. It is a three-color screen, the structure of which is illustrated in FIG. 31. This screen was built up by the use of a calculated guide screen and by checking the thickness and/or light emission of each layer (in comparison with the guide screen) before the next layer was laid down. As explained hereinafter, the calculated guide screen, and therefore the FIG. 31 screen, was based on the calculated screen of FIG. 10 as a pattern screen.

The better the uniformity and the closer the packing of the layers (discussed hereinafter), the more nearly the screen may approach the calculated layer thicknesses of a pattern screen such as that of FIG. 10. The screen of FIG. 31 illustrates an embodiment similar to that of FIG. 10, modified to take into account the uniformity and packing actually obtained in the layers, and also to take into account other departures from the screen of FIG. 10 such as a difference in phosphors including different relative conversion efficiencies than those specified for the screen of FIG. 10.

The screen of FIG. 31 comprises a blue phosphor layer on a glass face plate, a first separator layer on the blue phosphor, a green phosphor layer on the first separator layer, a second separator layer on the green phosphor, and a red phosphor layer on the second separator layer. An aluminum coating is formed on the red layer by the usual evaporation procedure.

All layers are formed of powders, which can be laid down by Kell's process briefly described and referred to earlier and described more specifically, by way of example, hereinafter. All layers except the blue layer are of fine powders. The blue layer is not considered a "fine" powder although it is finer than phosphor powders commonly used when phosphors are put down by the settling process. As stated with reference to the screens of FIGS. 3 and 10, the layers may be laid down by several methods as, for example, by the slurry process or the Kell process.

The material for the screen layers are:

Blue phosphor—ZnS:Ag, $\rho=4.1$
First separator—Mica (powder), $\rho=2.9$
Green phosphor—$Zn_2SiO_4$:Mn, $\rho=3.9$
Second separator—Mica (powder), $\rho=2.9$
Red phosphor—$ZnMgCdSiO_3$:Mn, $\rho=3.8$ These blue, green and red phosphors have substantially the same spectral distributions as the corresponding P22 phosphors. The mica is a vermiculite that is processed to a fine powder.

The layer thicknesses are as follows, given in both milligrams per square centimeter, and in microns, the thickness in microns being average thickness:

Blue—A layer 80% to 90% transparent to diffused light
First separator—.17 mg./cm.$^2$—.585$\mu$
Green—.29 mg./cm.$^2$—.742$\mu$
Second separator—.14 mg./cm.$^2$—.483$\mu$
Red—.35 mg./cm.$^2$—.913$\mu$ The relative conversion efficiences of the phosphor are:

Red=1, Green=10 and Blue=4.86

Figure 37:
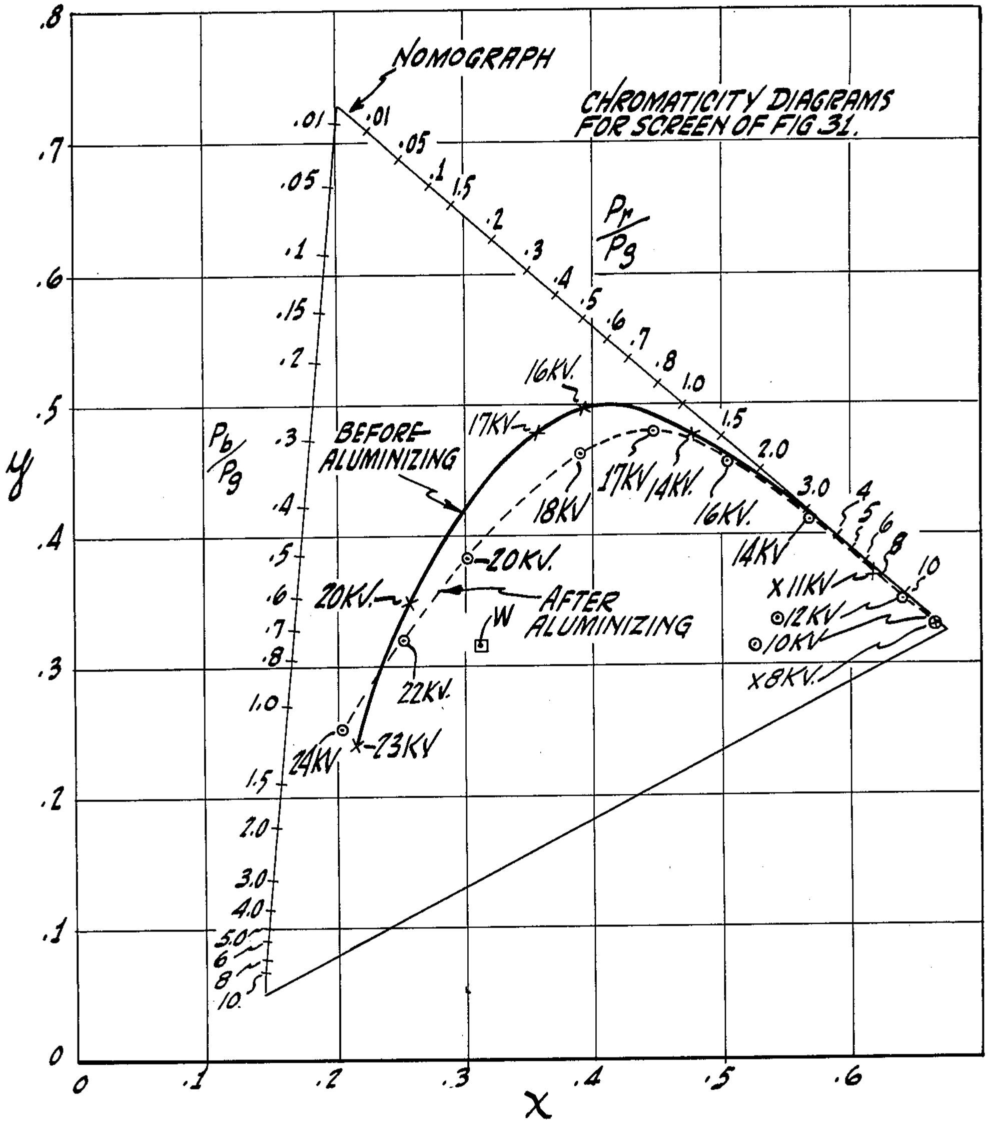
FIG. 37 shows a chromaticity diagram for the screen of FIG. 31, and also a nomograph that may be used in plotting the chromaticity diagram.

With this screen a good color gamut (as shown in FIG. 37) may be obtained by switching from 10 kv. to 22 kv. This is approximately a 37% modulation of the center voltage of 16 kv.

Figure 32:
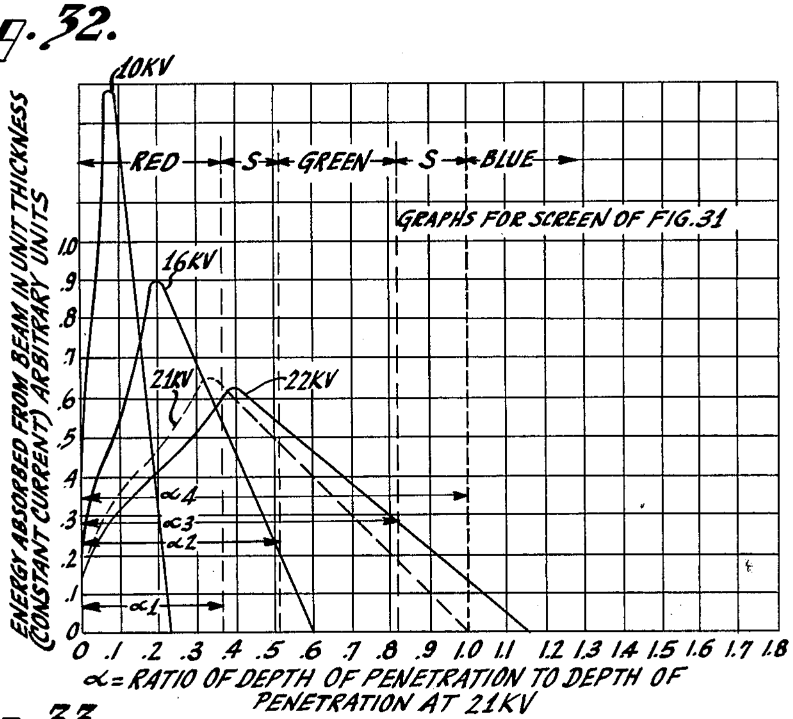
FIG. 32 is a group of graphs showing electron beam energy absorption at three different beam voltages for the screen of FIG. 31.

FIG. 32 shows the beam energy distribution (on the basis of average mass thickness) at the minimum beam voltage, the center beam voltage, and the maximum beam voltage; these being the voltages that switch into red, green and blue, respectively. Average mass thickness, discussed hereinafter, is used in determining these beam energy distributions. As in the other screen examples, when the beam is switched into a phosphor layer away from the gun side of the screen, there is more of the beam energy absorbed in the layers on the gun side of the layer switched into than is absorbed in that layer.

DISCUSSION OF MASS THICKNESS VARIATIONS

In building the screen of FIG. 31, the mass thicknesses of elemental areas of the screen layers will not be as uniform as was assumed for the guide screen. This departure from assumed uniformity will now be discussed, after which laying down the layers of the screen of FIG. 31 by the use of the guide screen will be described.

In the illustration of the screen in FIG. 31, the vertical lines representing layer surfaces represent irregular surfaces and represent the average mass thicknesses of the layers. This is indicated in FIG. 32 by dotted vertical lines representing the "average mass thickness."

The irregularities referred to above in the surface of a given layer may in some cases be the result of minute variations in the thickness of that layer, and in some cases may be the result of variations of the thickness of the preceding layer, and they may cause irregularities of the following layer. The results are variations in the mass thicknesses of elemental areas of the layer, where the dimensions of the elemental areas are of the order of the particle sizes or smaller. Such variations are the main cause of the light vs. beam voltage curves having longer toes than the theoretical ones (see FIGS. 34 and 35), as will be discussed later, with a resulting decrease in the color gamut for a given switching voltage. The longer toes are primarily the result of some electrons of the beam penetrating through portions of a layer which have less mass thickness than desired.

To better understand the nature of the layer irregularities and the variations in layer thickness, the relative dimensions of the elements involved should be kept in mind. In the particular screen being described, i.e., the screen of FIG. 31, the blue phosphor layer consists of phosphor particles ranging in size from about 0.4 micron to about 5 or 10 microns in diameter. Actually the particles are not necessarily true spheres, as the term diameter would indicate, but are in most cases irregular in shape. Referring to FIG. 31 it will be noted that the total average thickness of the four layers (mica, green, mica, red) formed on the blue layer is only 2.72 microns. This is only about one-half or one-third the thickness of one of the larger blue particles. It is evident that the layers successively laid down over the surface of blue phosphor particles should and do "wrap around" the exposed surface of individual blue particles. This results in an undulating multilayer surface. The undulations are not detrimental to any substantial degree providing the layer thicknesses are substantially uniform. In the screen of FIG. 31, some of the layer thicknesses apparently are a little thinner at the top of some of the undulations than at the sides and bottoms of the undulations. This causes a phosphor layer, such as the blue layer, to emit some light before the beam voltage has been increased to the correct value of switching voltage, that is, the switching voltage required by a screen with layers having uniform thickness. For example, at the top of an undulation of the first separator layer, the green phosphor layer may be formed a little thinner than the calculated uniform thickness. Assuming that all other layers are uniform, this means that at this thin spot in the screen the blue layer will be excited by the electrons at a beam voltage that is lower than the excitation voltage would be if there were no thin spot. Likewise, at a beam voltage such that electrons would penetrate into the blue layer assuming no thin spots, the electrons penetrate deeper into the blue layer at the point behind the thin spot than they otherwise would. Thus at a beam voltage of 22 kv., the electrons penetrate sufficiently into the blue layer partly, at least, because the four layers on the gun side of the blue layer have thin spots permitting this penetration, and enough of them so that sufficient blue light is obtained. The sufficient penetration into the blue phosphor is also the result of less than perfect packing of the material in the layers as discussed later.

The foregoing statements with regard to sufficient penetration into the blue phosphor also apply, in general, to the red and green phosphor layers. In FIG. 32, the energy distribution graph of the 10 kv. beam (drawn on the basis of average mass thickness) is shown. This particular 10 kv. graph does not show any electron penetration through the entire average mass thickness of the red layer. Many electrons penetrate through the actual red layer structure and into the adjacent separator layer because of the presence of what are effectively minute thin spots in the actual red phosphor layer. Some of the electrons of the 10 kv. beam strike these thin spots and penetrate further into the red layer than shown by the 10 kv. graph of FIG. 32.

If an energy distribution graph for the 10 kv. beam were drawn with respect to the actual layer structure for the electrons passing through certain thin spots, each having substantially the same thickness (and there are many such spots within the cross section of the electron beam), that graph would be a duplicate of the one illustrated in FIG. 32, but it would be set over to the right somewhat.

The foregoing comments regarding the positioning of energy distribution graphs for the 10 kv. beam apply also to energy distribution graphs for the 16 kv. and 22 kv. beams. It may be noted that, with respect to the average mass thickness, the screen layers also have thick spots, and that energy distribution graphs drawn for the electrons penetrating the thick spots would be set somewhat to the left of the graphs shown in FIG. 32.

The foregoing is a discussion of the energy distribution occurring within phosphor layers containing elemental variations of mass thickness. The average of the energy distribution within the cross section of an electron beam penetrating a fine powder layer provides information determining the average of the mass thickness of that layer, such as the average mass thickness of the red phosphor layer indicated by the dotted line at $\alpha=0.36$ of FIGURE 32 for the 10 kv. beam energy measurements.

The dimensions of the thin spots of the character described are the dimensions of the elemental areas previously defined, and are very small compared with the diameter of a sharply focused electron beam. As previously stated, the dimensions of the elemental areas are of the order of the particle sizes or less. Thus, there may be many thin spots or thickness irregularities within the cross section of an electron beam. Therefore, the average value of the thickness irregularities within the cross section of the beam (and, therefore, the average mass thickness) is a proper measure of the effective mass thickness, and may be used in determining the beam energy distribution and the resulting screen performance.

It should be noted that as the screen is scanned by the beam, the screen is uniform in the sense that it looks the same to the beam regardless of where the scanning beam strikes the screen.

In the foregoing example of a cause of thin spots in the screen, irregularities in the blue phosphor surface were discussed. Thin spots are also caused by irregularities in the surface of the green phosphor layer and by irregularities in the surface of the red phosphor layer, but to a less extent since the red and green phosphor particles are smaller than the blue phosphor particles. The red and green particles probably do not exceed about 0.5 micron in diameter. The reason for using larger particles in the blue layer is to insure a high enough conversion efficiency when using this particular blue phosphor. If the particles of this blue phosphor were made as small as the red and green phosphor particles, assuming this was done by prolonged ball milling, their conversion efficiency might be substantially reduced. The fact that the use of larger blue phosphor particles will result in some cavities in the blue phosphor layer is not objectionable since it is the front or face plate layer.

A second cause of variations in the mass thicknesses of elemental areas of a layer of material is caused by what may be called less than perfect packing of the material in the layer. These variations, like the thickness variations discussed above, are from elemental area to elemental area and are in a direction transverse to the beam axis. The dimensions of these elemental areas, as previously stated, are of the order of the particle sizes or less. The nature and effect of this variation in mass thickness will be understood by keeping in mind that the depth of penetration of a particular electron of the impinging electrons depends on how much material this particular electron strikes. In the case of layers of discrete particles, if the packing or arrangement of the particles is too loose and/or non-uniform, some of the impinging electrons will pass through less material of the layer than will other impinging electrons. If the packing of a layer were particularly poor, some impinging electrons would not strike any substantial amount of material in the layer. The effect of less than perfect packing of the material in the layers (whether phosphor layers or separator layers) is to cause the light vs. beam voltage curves to have longer toes than the theoretical ones, i.e., the ones for a perfectly packed material of uniform thickness (see FIGS. 34 and 35).

Whatever the cause of the variations in the mass thickness from elemental area to elemental area, the effect on the electrons in the beam is the same. It is immaterial to the impinging electrons whether these variations in the mass thickness of a layer or layers from elemental area to elemental area is due to the variations in thickness or due to the variations resulting from less than perfect packing. It will now be evident there may be a variation in the mass thicknesses of elemental areas for more than one reason, but that in referring to mass thicknesses or to average mass thickness it is immaterial what has caused the mass thickness variations. It is again pointed out that the average mass thicknesses of the elemental areas within the cross section of impinging electrons, such as an electron beam, is the average mass thickness, that it is a proper measure of the effective mass thickness, and that it may be used in determining the beam energy distribution and the resulting screen performance.

It should be understood that the discussion of variations in the mass thicknesses of elemental areas applies to separator layers as well as to phosphor layers. However, these variations are generally less in the separator layers because of the use of smaller particles of separator material. To sum up, the lengthening of the toes of the graphs as discussed above is due to the fact that the mass thickness of one elemental area of a layer is not substantially the same as the mass thickness of another elemental area. In general, the greater the amount of variation in the mass thicknesses of the elemental areas, the longer will be the toes of the graphs referred to and the less satisfactory will be the layer. As will be better understood from the description which follows, a long toe on these graphs means that some electrons of the beam penetrate through a layer at a lower beam voltage than desired.

DEFINITION OF QUALITY AS TO UNIFORMITY OF MASS THICKNESS

From the foregoing discussion it will be understood that the quality of a layer of material with respect to the uniformity of the mass thicknesses of elemental areas can be defined by comparing it with a reference material such as a layer of material in which the mass thicknesses of the elemental areas have substantially no variation and in which each impinging electron sees the same mass thickness. In this reference material the elemental areas approach the molecular dimensions of the material as a limit. Such a reference material is a metal such as aluminum which has been melted and solidified. Gold leaf is another example of a reference material. It will be understood that the Thomson-Whiddington penetration equation previously referred to is based on the assumption that the material is such a reference material. Gold leaf and aluminum leaf are examples of the materials used experimentally by Whiddington in confirming this Thomson-Whiddington equation. Also, aluminum which has been evaporated to form a layer, has substantially the same uniformity of mass thicknesses as the reference materials.

USE OF GUIDE SCREEN TO LAY DOWN LAYERS

The way in which the screen of FIG. 31 was built up layer by layer will now be described without reference to any specific process for laying down a layer. This screen was built up by using as a guide a screen (which will be referred to as the guide screen) comprising layers having the same mass thicknesses as those in the screen of FIG. 10 and otherwise generally similar to the screen of FIG. 10 (which will be referred to as the pattern screen), but with a different blue phosphor and with somewhat different relative conversion efficiencies for the phosphors. Also the screen of FIG. 31 was built up under the realization that the screen layers that would be laid down would depart somewhat in uniformity in the mass thicknesses of elemental areas from the uniformity assumed for the guide and pattern screens. Therefore, primarily, attention was paid to the light obtained from the different phosphor layers, and secondarily, attention was paid to the layer thicknesses. That is, while layer thickness was considered important, it is not to be controlling to the extent that an exact copy of the FIG. 10 screen was to be attempted.

The procedure used was to take light measurements as the screen layers were built up, and compare these light measurements with those calculated theoretically for the guide screen.

Figure 33:
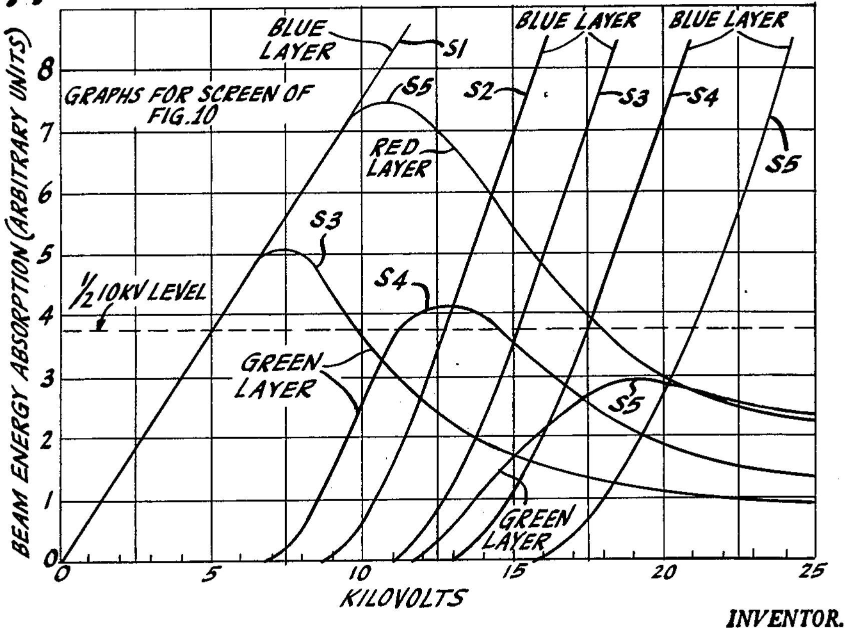
FIG. 33 is a group of graphs showing beam voltage versus electron beam energy absorption for the screen of FIG. 10 in various stages of construction.

In order to make these light measurement comparisons, a set of light vs. beam voltage graphs were drawn for use as a standard or guide. These are the graphs of FIG. 34. They were constructed as follows:

First, the beam energy absorption vs. beam voltage graphs of FIG. 33 were drawn for the pattern screen of FIG. 10. Constant beam current was assumed. As was the case in constructing the graphs of FIG. 9*b*, the graphs of FIG. 33 were constructed by use of the Thomson-Whiddington penetration law and by use of the energy distribution graph (after Gentner) of FIG. 9*a*.

Figure 34:
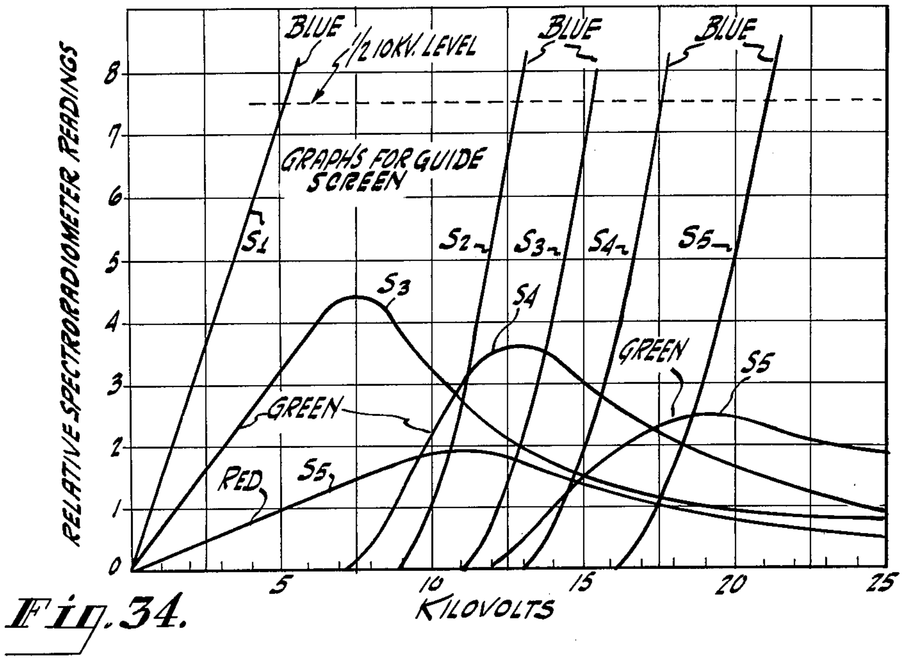
FIG. 34 is a group of graphs showing beam voltage versus blue, green and red light emitted from a guide screen, based on the screen of FIG. 10, in various stages of construction.
Figure 35:
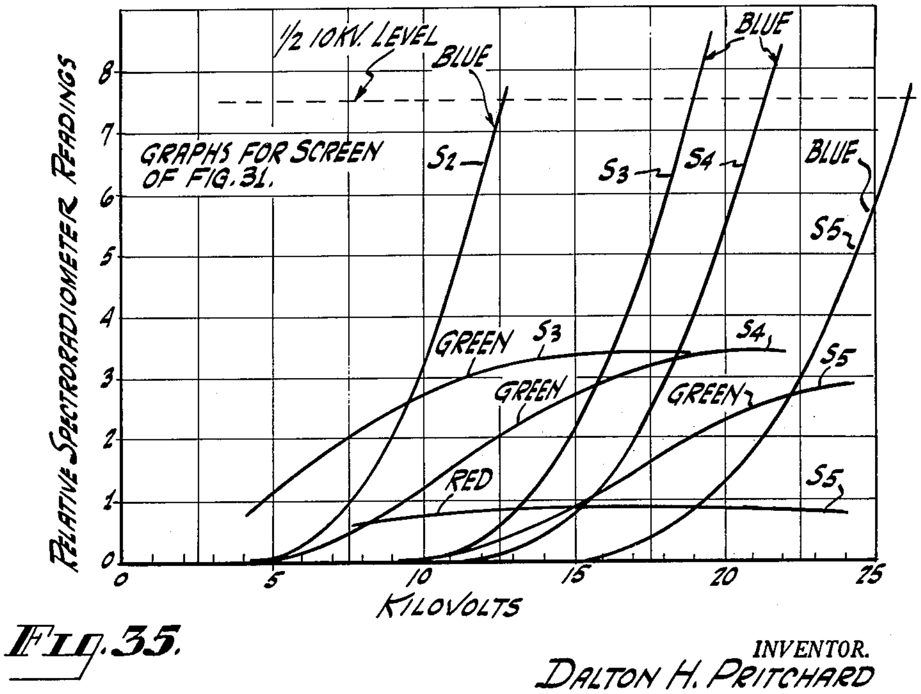
FIG. 35 is a group of graphs showing beam voltage versus blue, green and red light emitted from the screen of FIG. 31 in various stages of construction.

The five graphs of FIG. 33 for the blue layer, the three graphs for the green layer, and the single graph for the red layer are for the five different stages in the screen build up. These stages are indicated in FIG. 31 as stages S1 through S5, and the graphs of FIGS. 33 to 35 are correspondingly marked. At stage S1 only the blue layer is on the face plate. At stage S2 only the first separator layer (mica) has been laid over the blue. Stage S3 is the one where there are the three layers only of blue phosphor, mica, and green phosphor. At stage S4 all layers are down except the red layer. At stage S5 the screen is completed except for the usual aluminizing. Referring to FIG. 33, the correspondence between the stages of screen construction and the graph markings will be seen. For example, at stage S1 (blue layer only on face plate) the energy absorbed in the blue layer is shown by the graph labeled "Blue Layer" and "S1." At stage S2 (blue layer and first separator layer on face plate) the energy absorbed in the blue layer is shown by the graph labeled "Blue Layer" and "S2." At stage S3 (blue layer, separator and green layer on face plate) the energy absorbed in the blue layer is shown by the graph labeled "Blue Layer" and "S3" while the energy absorbed in the green layer is shown by the graph labeled "Green Layer" and "S3." At the stage where the screen is completed except for the addition of the red phosphor layer, i.e., at stage S4, the beam energy absorption in the green layer is shown by green layer graph S4, and the beam energy absorption in the blue layer is shown by blue layer graph S4. For the completed screen, the energy absorption graphs for the red, green and blue layers, respectively, are each marked S5.

Next the graphs of FIG. 34 for the guide screen were drawn. These graphs show the light output from the different phosphor layers at each of the five stages of construction, this light output corresponding to the beam energy absorbed (FIG. 33) in the different phosphor layers at each of the five stages of construction. The graphs of FIG. 34 for the five stages of construction are labeled in the same manner as the graphs of FIG. 33. Since the light output is proportional to the energy absorbed, the light graphs (FIG. 34) are the absorption graphs (FIG. 33) times the proper conversion factor.

The proper conversion factors for the red, green and blue were found as follows:

First the particular phosphors to be used are specified. In this guide screen they are all P22 type phosphors. It may be noted that the P22 blue has a slightly different chromaticity than that of the P22 blue used in certain screens described earlier. Also, the red phosphor is a different one than that actually used in the screen of FIG. 31. However, the color coordinates of these two red phosphors are substantially the same. More specifically, the chromaticities of these P22 phosphors in I.C.I. coordinates are to be Red, $x=.674$, $y=.326$
Green, $x=.203$, $y=.728$
Blue, $x=.146$, $y=.052$ The conversion efficiencies of the phosphors are to be:

| | Ratios |
|---|---|
| Red, 3.6 lumen/watt | 1 |
| Green, 23.6 lumen/watt | 6.55 |
| Blue, 8.1 lumen/watt | 2.25 |

This assignment of conversion efficiencies is one using the P22 blue at its best efficiency, and using P22 red and P22 green at somewhat lower efficiencies than can be obtained for these phosphors in standard size particles.

With the foregoing assignments of chromaticities and conversion efficiencies for the three phosphors of the guide screen, the chromaticity of the combined light from the three phosphors is that of illuminant C when they are excited in the proportion:

Beam energy absorption in red=9
Beam energy absorption in green=3
Beam energy absorption in blue=1

This assumes that the optical collection efficiency is the same for all three phosphors. These ratios of 9:3:1 are the energy absorption ratios required regardless of how the screen is operated in practice. For example, these are the ratios required whether the operation is by simultaneous beams or by beam switching if (assuming no color modulation) the white is to be illuminant C. When beam switching (single gun) is used, these ratios are for a complete beam switching cycle (assuming no color modulation), averaged over the cycle. The way in which these energy absorption ratios of 9:3:1 are calculated need not be described since those skilled in the art can readily calculate them, using the chromaticity diagram which is a triangle having its points at the red, green and blue coordinates of the phosphors used.

In measuring the light from the phosphor layers as the screen of FIG. 31 is built up, a spectroradiometer is to be used which reads the same at every wavelength when exposed to an equal-power-per-unit wavelength white light. This spectroradiometer, when exposed to illuminant C obtained from the above three phosphors of the guide screen, will read in the following proportions when set at the red, green and blue peaks:

Red reading:Green reading:Blue reading=1.17:1.32:1

Thus the relative conversion factors to convert beam energy absorbed to the corresponding readings of the above specified spectroradiometer are:

For Red reading: Multiply energy absorbed in red layer by 1.17/9, i.e., by .13.

For Green reading: Multiply energy absorbed in green layer by 1.32/3, i.e., by .44.

For Blue reading: Multiply energy absorbed in blue layer by unity.

A comparison of FIGS. 33 and 34 will show that the conversion factors of .13, .44 and 1 were used in deriving the graphs of FIG. 34 of the guide screen. In making the comparison it should be noted that the ordinate scale of FIG. 34 is twice that of FIG. 33.

In building up the actual screen of FIG. 31 a slight departure was made from the phosphors assumed in the guide screen in that the P22 type red phosphor was replaced by a complex silicate red phosphor since it could be processed to a fine powder more readily than the P22 type. The composition of the red phosphor actually used is given in the earlier tabulation of screen materials. Its I.C.E. coordinates are $x=0.682$, $y=0.318$; they do not differ substantially from the coordinates of the P22 red phosphor assumed in the guide screen.

The complex silicate red phosphor, however, has a lower conversion efficient than the P22 red. Principally because of this, the relative conversion efficiencies of the phosphors in the screen of FIG. 31 are:

Red=1, Green=10, Blue=4.86

These relative conversion efficiency values are based on the published figures for the efficiencies of the phosphors, namely, red=2.5 lumens/watt, green=31.1 lumens/watt, and blue=8.1 lumens/watt; and they are further based on measurements of how much the efficiencies of the phosphors were reduced from their original efficiencies by processing them to the particle size used in laying down the phosphor layers. These measurements showed that in this particular case the red phosphor efficiency was reduced to about 60% of its original efficiency, the green phosphor efficiency was reduced to about 50% of its original efficiency, and the blue phosphor efficiency was reduced to about 90% of its original efficiency.

In the guide screen the beam energy absorption in the red, green and blue phosphors was in the proportion 9:3:1 to obtain a combined light that is illuminant C.

In the screen of FIG. 31, because of the different relative conversion efficiencies, the beam energy absorption in the three phosphors is in the following proportion to obtain illuminant C:

Beam energy absorbed in red=19.5
Beam energy absorbed in green=4.2
Beam energy absorbed in blue=1

These relative energy absorption values for the screen of FIG. 31 are calculated from the relative conversion efficiencies for the phosphors of the guide screen and of the screen of FIG. 31, and from the beam energy absorption ratios of the guide screen as follows:

$$\text{Red}—\frac{1}{1}\times 9=9$$

$$\text{Green}—\frac{6.55}{10}\times 3=1.96$$

$$\text{Blue}—\frac{2.25}{4.86}\times 1=.46$$

Normalizing:

Red=19.5
Green=4.2
Blue=1

It should be noted that the change in the relative conversion efficiencies of the phosphors for the screen of FIG. 31 as compared with those for the guide screen does not affect the procedure in building up the screen of FIG. 31. The reason is that the procedure involves taking light measurements, rather than relying on layer thickness measurements, in order to insure a predetermined color gamut. For example, a change to a lower efficiency red means that a thicker red layer is used to obtain the desired amount of red light.

The procedure used in building up the screen of FIG. 31 on the face plate of a cathode ray tube will now be described. Throughout the procedure the same beam current was used. First it should be noted that a conductive coating was put on the face plate so that light measurements could be made at the different stages of construction, there being no aluminum coating to which voltage could be applied until after the screen construction was completed. The conductive coating used was a very thin transparent coating of rhodium. It will be understood that this conductive coating on the face plate would not be used for screens being made in production since, after the screen design has been determined, there is no necessity for making light measurements stage by stage of construction. Instead, the process for laying down the screen layers may be duplicated in production and the previously determined correct amount of material laid down for each layer.

*Stage 1.*—First the layer of blue phosphor was formed by laying it down on the face plate to a thickness such that it was from about 80% to 90% transparent to diffused light. The blue phosphor particles are from about 0.4 micron to about 5 or 10 microns in diameter, approximately, and were laid down by the absorption process using gelatin. The procedure followed in laying down this layer, and the procedures followed in laying down the other screen layers will be described in detail later as applied to this specific screen example.

At this point, the screen construction was in stage S1. The face plate was then put in the demountable cathode ray tube and, using the spectroradiometer assumed in the calculations of the graphs of FIG. 34, the blue light was measured at 10 kv.; then the ½ 10 kv. light level was marked for use as a reference in later stages.

*Stage 2.*—Next the first separator layer was laid down over the blue layer. The screen construction was now in stage S2. Again the spectroradiometer was used to measure blue light vs. beam voltage. This is graph S2 in FIG. 35. The first separator layer was built up to have about the same mass thickness as the corresponding layer in the FIG. 10 reference screen. A way in which the mass thickness can be determined was described earlier in connection with the screen of FIG. 10. However, a more accurate way to determine the mass thicknesses of the layers in the screen of FIG. 31, and the way it was actually done, will be described later with reference to FIGS. 35 and 36. Inspection of the resulting graph S2 of FIG. 35 showed that this separator layer should be satisfactory because, comparing S2 of FIG. 35 with S2 of FIG. 34, the toe of graph S2 of the screen being constructed did not start until the beam voltage reached at least half the voltage at which the toe of graph S2 of FIG. 34 started. Specifically, in the guide screen (FIG. 34) blue quenched at about 9 kv., i.e., the toe of S2 started at about 9 kv.; and in the screen being constructed the blue quenched at about 5 kv., i.e., the toe of S2 (FIG. 35) started at about 5 kv. It will be recalled that the graph S2 of FIG. 34 is plotted for material that is assumed to have the reference material characteristic, namely, that its elemental areas have substantially no variation in their mass thicknesses. Also the average thickness of the first separator layer of the guide screen is substantially the same as that of the first separator layer of the screen of FIG. 31 so that the S2 graphs of the two screens may be compared. The longer toe on S2 in the screen under construction was due to the fact that the separator layer departed somewhat in uniformity from the substantially perfect layer assumed for the guide screen, and was also due to the fact that the blue phosphor layer had a rather rough surface because of the comparatively large size of the blue phosphor particles. As to the length of a toe and the voltage quenching or threshold point that are permissible for a satisfactory screen, experience in constructing screens has shown that the toe is not too long, if for a layer of material having a certain average mass thickness the threshold voltage is no less than about one-half the threshold voltage for a layer of reference material (such as metal foil) also having said certain average mass thickness.

It will be recognized that the quench or threshold voltage is the highest beam voltage at which no substantial percentage of the electrons of the beam will pass through a particular layer (or layers) of material.

*Stage 3.*—Next the green phosphor layer was laid down over the first separator layer. The screen construction was now in stage S3. It is at this stage that the correct amount of green phosphor is to be laid down so that the green to blue ratio will be correct in the completed screen. At the same time there is the requirement that the blue light quench at a beam voltage that is not too low.

It was known from experience in building screens to the general specifications of the pattern screen of FIG. 10 that, due to the difficulty in laying down perfectly uniform layers, the screens tended to be somewhat deficient in green. Therefore it was assumed that in the screen being constructed the green phosphor layer should be thicker than called for by the reference screen. Accordingly, a somewhat thicker layer of green was laid down and, using the spectroradiometer, the S3 graphs of FIG. 35 were obtained for blue and green.

To determine how much green phosphor should be laid down, reference was made to the guide screen graphs S3 green and S3 blue (FIG. 34). It was noted that at this construction stage blue should quench at about 11 kv. It was noted also that, according to the guide graphs, at this quench voltage of 11 kv. the amplitude of the green light should be about one-third of the ½ 10 kv. light level. Therefore, the green phosphor layer was increased in thickness until the spectroradiometer vs. beam voltage readings gave the S3 green and S3 blue graphs, shown in FIG. 35, where at about 10 kv. or 11 kv. the blue is substantially quenched (the threshold point), and where, at this beam voltage, the green is at about one-third the ½ 10 kv. light level.

Figure 9C:
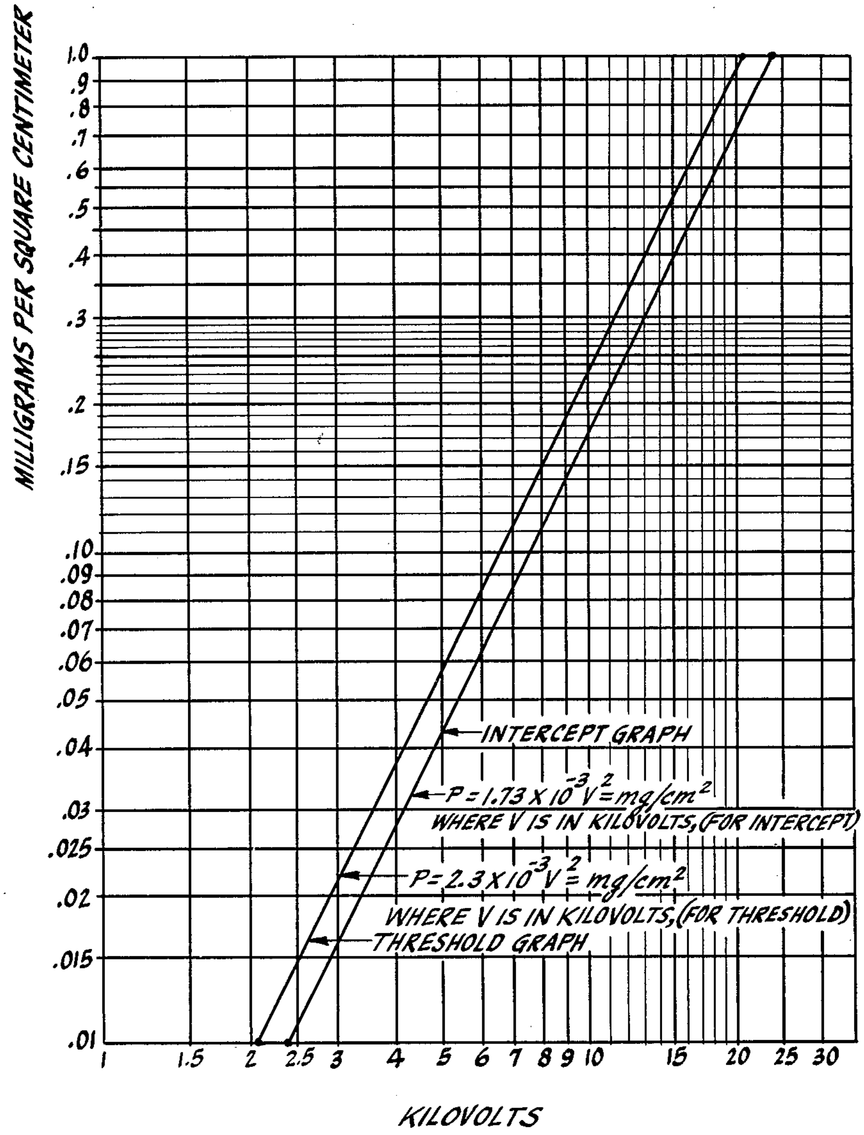
Figure 11:
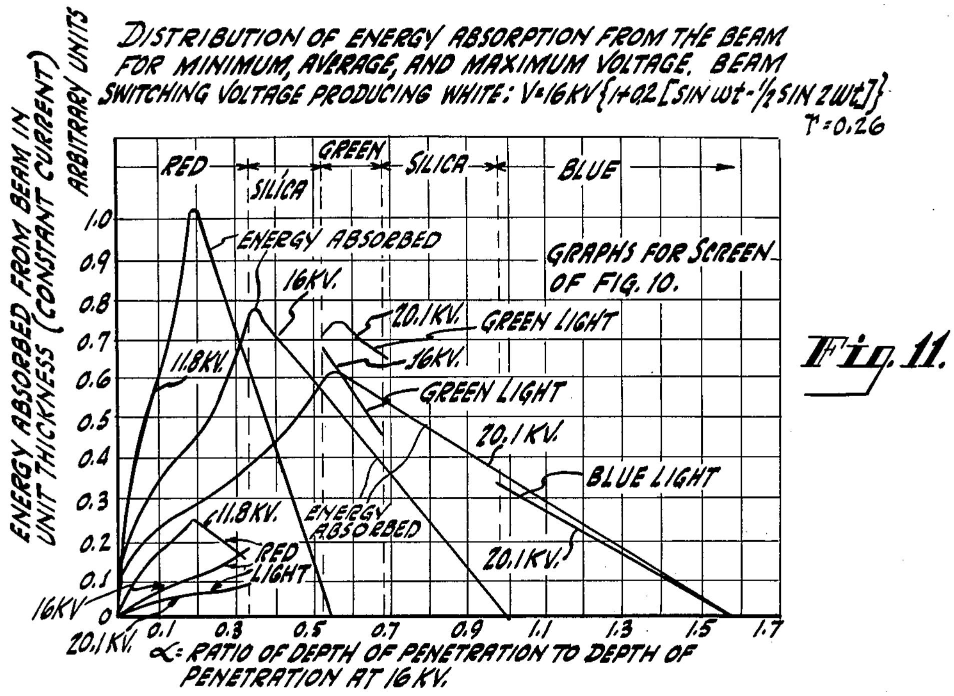
FIG. 11 is a group of graphs showing electron beam energy absorption and light output at three beam voltages for the screen of FIG. 10.
Figure 12:
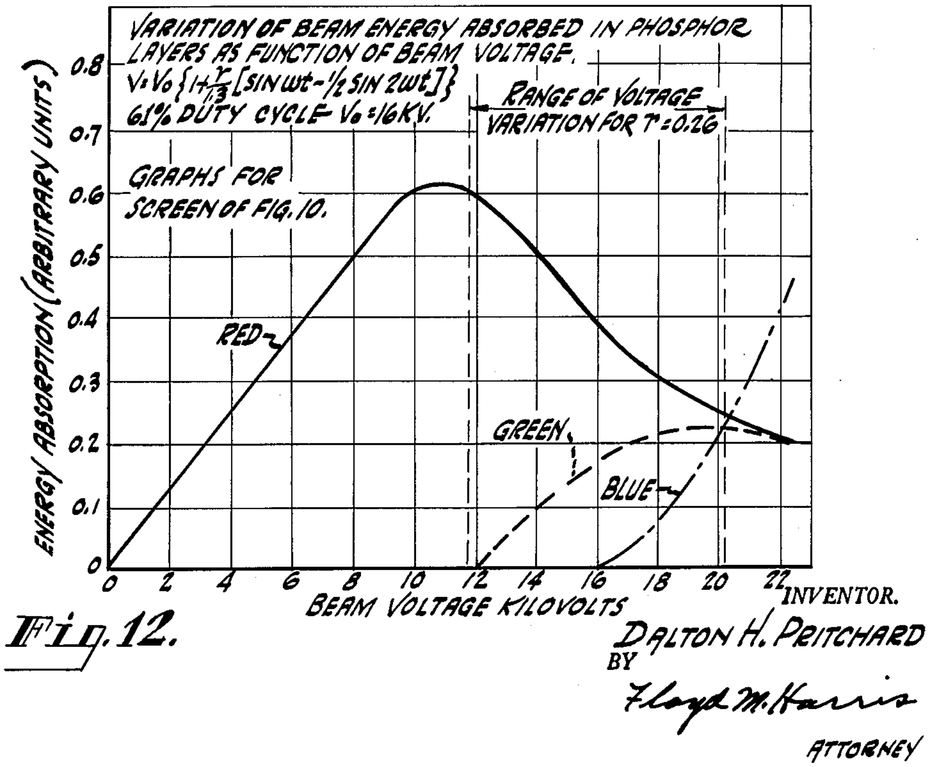
FIG. 12 is a group of graphs showing electron beam energy absorption in the different phosphor layers of the screen of FIG. 10 as a function of electron beam voltage.
Figure 13:
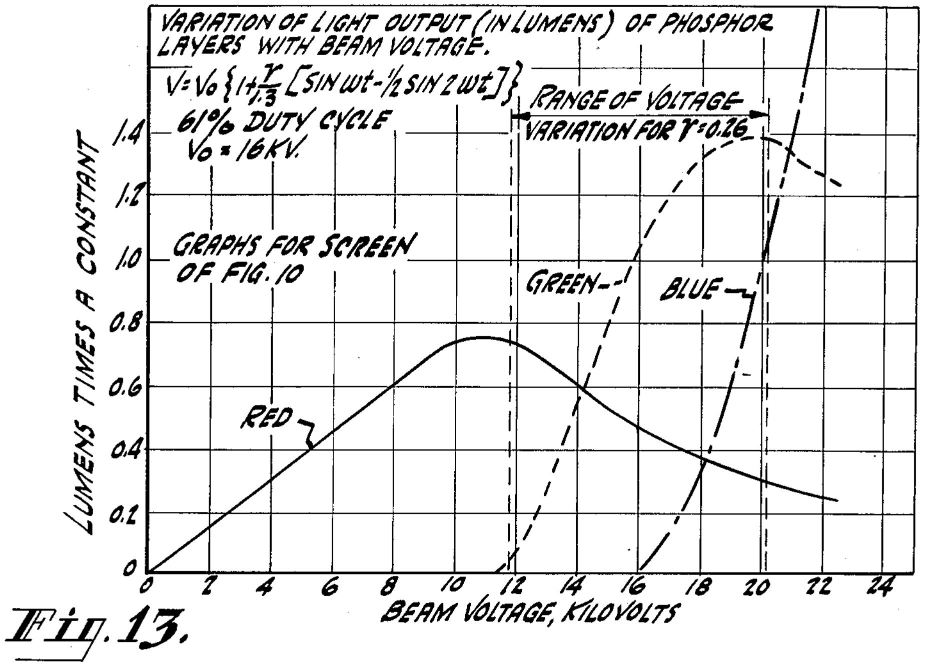
FIG. 13 is a group of graphs showing in arbitrary units the light output (lumens) from the different phosphor layers of the screen of FIG. 10 as a function of electron beam voltage.

The average mass thickness of the material on the blue layer is that of the first separator layer plus that of the green phosphor layer which sum is 0.46 mg./cm.². The measurement of the mass thickness is discussed later. For a reference material layer of this same average mass thickness, the graph corresponding to S3 (blue) of FIG. 35 would have its threshold point at 14 kv. as can be seen by referring to FIG. 9*c* The threshold point of the S3 (blue) graph of FIG. 35 is about 10 kv., which is substantially more than one-half the threshold voltage (14 kv.) for the reference material.

It will be evident from above that a certain mass thickness of green phosphor would not give the correct amount of green light and also move the toe of the blue graph S3 far enough to the right on the abscissa axis until the relative conversion efficiency of the green phosphor was approximately correct. For example, if the green layer were too inefficient, in order to obtain enough green, the layer would have to be too thick, moving the glue graph S3 too far to the right where the switching voltage would be too high.

*Stage 4.*—Next the second separator layer was laid down over the green layer. It was laid down substantially to the mass thickness of the corresponding separator layer of the pattern screen of FIG. 10. The screen construction was now in stage S4. The screen was again put in the demountable tube, and the blue graph S4 and the green graph S4 obtained as shown in FIG. 35 by readings from the spectroradiometer. The position of the toe of the green graph S4 was noted to see that green quenched at a sufficiently high beam voltage. It was noted that in stage S4 in the guide graphs (FIG. 34) green quenched at about 7 kv. Based on past experience, it was known that in the screen being constructed, green preferably should quench at a voltage no lower than one-half 7 kv. Actually, green quenched at about 5 kv. as shown by the green graph S4 of FIG. 35.

The average mass thickness of the material on the blue layer is now the sum of the first and second separator layers and the green layer, which sum is 0.6 mg./cm.². For a reference material layer of this same average mass thickness, the graph corresponding to S4 (blue) of FIG. 35 would have its threshold point at 16 kv. as can be seen by referring to FIG. 9*c*. The threshold point of S4 (blue) graph of FIG. 35 is about 12 kv., which is substantially more than one-half the threshold voltage (16 kv.) for the reference material.

*Stage 5.*—Next the red phosphor layer was put down on the second separator layer. This was the final stage S5 in the screen construction, except for the aluminizing.

The red phosphor was first laid down to about the mass thickness of the pattern screen of FIG. 10, and the graphs S5 for red, green and blue (FIG. 35) were plotted from the spectroradiometer readings. Attention was then directed to the values of red and green light obtained at the center switching voltage, that is, at 16 kv., the voltage that switches into green. The guide graphs (FIG. 34) show that when the red layer was added the green light was reduced (compare S4 and S5). The guide graphs also show that at 16 kv. (the center voltage) a comparison of red and green light (graphs S5) shows that the amplitude of the red is about two-thirds that of the green. Furthermore, at the 16 kv. center voltage the guide graphs show no blue light since S5 (blue) starts at 16 kv.

Still referring to the guide graphs (FIG. 34), it was noted that pure red was obtained when the switching voltage dropped from the center voltage down to 11.8 kv.; that is, green quenched at 11.8 kv.

The first S5 graphs plotted from the FIG. 31 screen being constructed showed that the ratio of red to green was too small at 16 kv. More red phosphor was laid down to further increase the mass thickness of this layer. The red, green, blue S5 graphs were again plotted. These are the S5 graphs shown in FIG. 35. Inspection of these graphs shows that at 16 kv. beam voltage the red is approximately two-thirds the green (only slightly over two-thirds). The green is substantially quenched at stage 5 at 10 kv., which is a practical minimum switching voltage where the center voltage is to be 16 kv.

Inspection of the FIG. 35 graphs also shows (for stage 5) that at 16 kv., the blue is substantially quenched, there being only a very small amount of blue present.

From the foregoing it will be noted that the amount of green obtained was an important controlling factor. When the green layer was put down, the green layer was made thick enough to give the desired amount of green light. When the red layer was put down, it was made thick enough to give substantially the red to green ratio called for by the guide screen.

Again referring to the quality of the layers with respect to uniformity of the mass thicknesses of elemental areas (as defined in terms of actual threshold voltages as compared with reference material threshold voltages), the average mass thickness of the material now on the blue phosphor layer is the sum of the average mass thicknesses of the green and red phosphor layers and the two separator layers, which sum is 0.95 mg./cm.². For a reference material layer of this same average mass thickness, the graph corresponding to S5 (blue) of FIG. 35 would have its threshold point at 20 kv. as can be seen by referring to FIG. 9*c*. The threshold point of the S5 (blue) graph of FIG. 35 is about 16 kv., which is substantially more than one-half the threshold voltage (20 kv.) for the reference material.

CHROMATICITY DIAGRAMS OF FIG. 31 SCREEN

A plot of the chromaticity diagram of the completed screen of FIG. 31 shows that, as expected, it has a more than satisfactory color gamut. This color gamut, both before and after aluminizing the screen, is shown in FIG. 37 by the chromaticity diagrams for the screen of FIG. 31. The chromaticity diagrams may be plotted by the use of spectral distribution measurements as measured by the spectroradiometer previously referred to, the measurements being taken at different beam voltages over the practical operating range. More conveniently, however, the chromaticity diagrams may be plotted from the nomograph in FIG. 37, making use of the observed relative peak amplitudes of the red, green and blue from the three phosphors. These peak amplitude readings are made by means of the spectroradiometer previously referred to. It will be noted that the points of the nomograph triangle are located at the *x, y* coordinates of the particular phosphors being used in the screen of FIG. 31. The nomograph is used by drawing a line from the ratio $P_r/P_g$ to the opposite point of the triangle (the blue point). Also, a line is drawn from the ratio $P_b/P_g$ to the opposite point of the triangle (the red point). The intersection of these two lines is a point on the chromaticity diagram.

The chromaticity diagrams of FIG. 37 show the maximum color gamut that can be obtained in the operating of the screen of FIG. 31.

With regard to aluminizing the screen, in the specific screen example of FIG. 31 the color gamut is reduced somewhat by the aluminizing because of the fact that the mica used as the separator material has a color selective characteristic. Specifically, white light passed through it is given a yellowish cast. In the case of screens made of other separator materials that do not have a differential or selective color absorption characteristic, the aluminizing does not affect the color gamut. For example, in the case of screens having Ludox separator layers the final step of aluminizing does not appear to affect the color gamut.

The reason for the reduction in the color gamut of the FIG. 31 screen caused by aluminizing is that due to the selective color absorption in the mica, there is more reflection of the red than of the green or blue, and there is more reflection of the green than of the blue. Specifically, for the aluminized screen the ordinates of the S5 graphs in FIG. 35 should be multiplied by the following factors:

Red S5—multiply by 1.76
Green S5—multiply by 1.20
Blue S5—multiply by 0.92

Since mica does have a differential color absorption characteristic, it is generally preferred that some other separator material be used, such as colloidal silica, that does not have such a characteristic.

A PROCEDURE FOR MEASURING MASS THICKNESS

Figures 36, 38A, 38B:
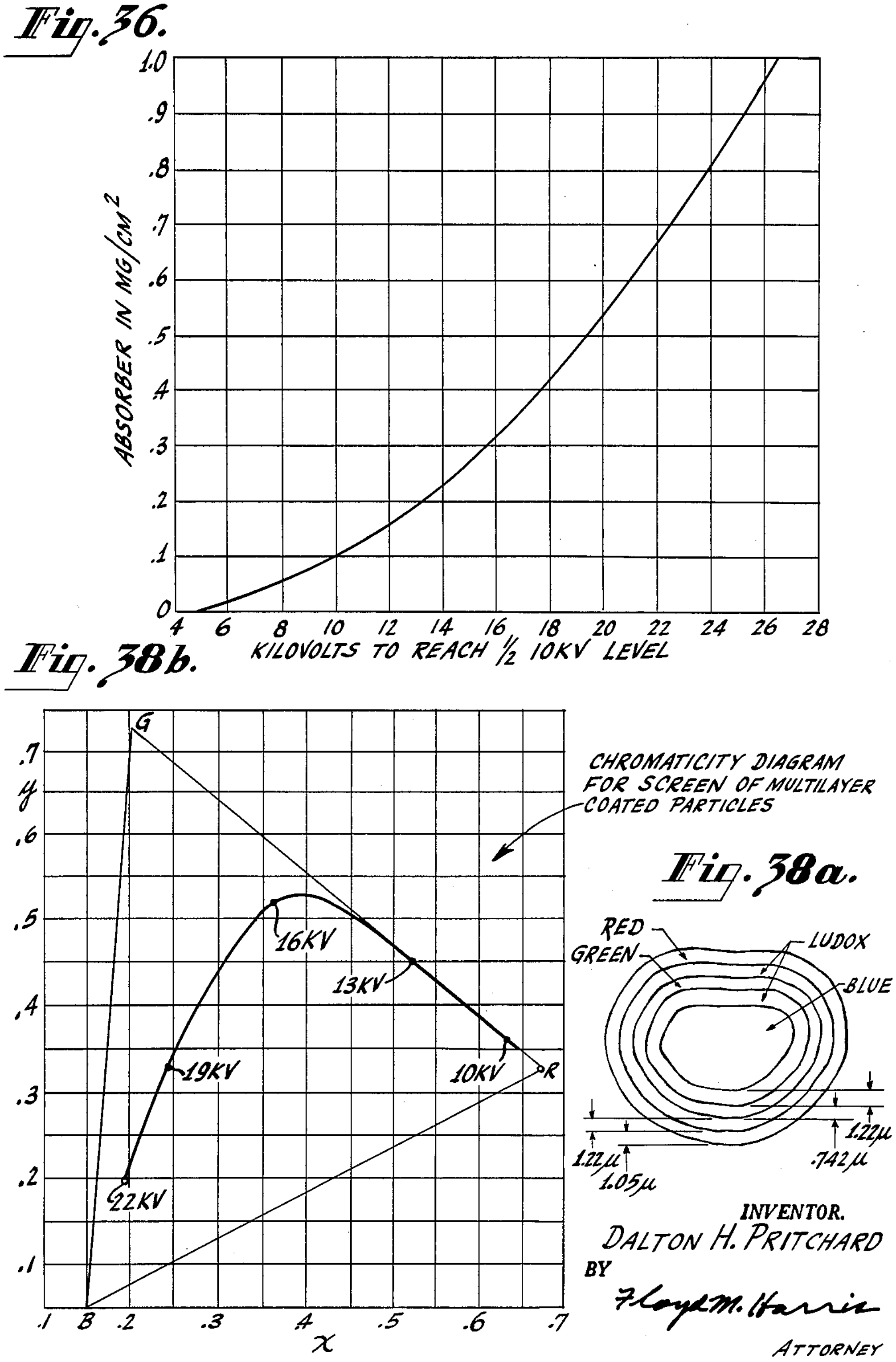
FIG. 36 is a graph of beam voltage versus energy absorbing material penetrated by the beam, this being a graph used in determining the thickness of the layers in the screen of FIG. 31.
FIG. 38*a* is a view in cross section, greatly enlarged, showing schematically a multilayer coated particle of the kind that may be deposited to form a color screen.
FIG. 38*b* is a chromaticity diagram for a screen embodying the invention and comprising multilayer coated particles.

As indicated earlier, the average mass thicknesses of the several layers in the FIG. 31 screen actually were determined, as the screen was being built up, by use of the graphs in FIGS. 35 and 36. The graph of FIG. 36 was drawn by use of the blue light graphs S2, S3, etc. of FIG. 34 that were plotted for the pattern screen of FIG. 10 having known layer thicknesses. Specifically, mass thicknesses were plotted against the beam voltages taken at the points where the blue light graphs cross the ½ 10 kv. light level. For example, graph S2 (FIG. 34) crosses the ½ 10 kv. level at 12.8 kv. For the screen of FIG. 10, it is known that at the S2 stage of construction the beam would pass through 0.175 mg./cm.$^2$ of materials this being the mass thickness of the first separator layer. Thus, a point is obtained for the graph of FIG. 36. Three other points are obtained the same way, and the graph is drawn.

In constructing the screen of FIG. 31, the blue light graphs of FIG. 35 are plotted during the different stages of construction as previously described. For example, at stage S2 the graph S2 is obtained. It intersects the ½ 10 kv. level at 12.7 kv. Referring to the FIG. 36 graph, the amount of material penetrated by the beam is 0.17 mg./cm.$^2$. This is the average mass thickness of the first separator layer. At stage S3 the final check on the green layer thickness gives the blue graph S3 (FIG. 35). It intersects the ½ 10 kv. level at 18.9 kv. Referring to FIG. 36, the amount of material penetrated is 0.46 mg./cm$^2$. This is the total average mass thickness of the first separator layer and the green layer. Therefore, the average mass thickness of the green layer is 0.46 minus 0.17 equals 0.29 mg./cm.$^2$. The average mass thicknesses of other layers are determined in the same way. The average mass thicknesses for the layers in the screen of FIG. 31 are tabulated below.

| | Mg./cm.$^2$ |
|---|---|
| First Separator Layer | 0.17 |
| Green layer | 0.29 |
| Second separator layer | 0.14 |
| Red layer | 0.35 |

DETAILS OF PUTTING DOWN LAYERS BY KELL'S PROCESS

It was stated earlier that all the layers of the FIG. 31 screen were laid down by the Kell absorption process in this specific screen example. The specific details for this particular screen with respect to preparing the materials and building up the layers by this process will now be given.

Four grams of gelatin were added to 400 milliliters of cold water. This was agitated and then allowed to stand for thirty minutes. The gelatin-water solution was then warmed to 60° C. and maintained at this temperature for 15 minutes. This insured that the gelatin would separate into its finest form. This 1 percent gelatin solution, set aside for later use, was used either as is or was diluted as hereinafter specified.

*Blue layer.*—A blue emitting phosphor layer of zinc sulfide activated with silver (commercially designated as P22 and such as used in the commercial shadow-mask color tube 21CYP22) was first laid down on the faceplate as follows. Twenty grams of the blue phosphor was given two washes in separate 250 milliliter quantities of water. With each wash, the phosphor was agitated in the water, permitted to settle for a few minutes, the water and fine particles suspended therein decanted, and the remaining settled phosphor recovered for use. The recovered phosphor, together with 0.06 of a gram of sodium pyro-phosphate was dispersed in another 250 milliliters of water. The sodium pyro-phosphate serves not only to enhance the deposition of the phosphor, but also to prevent agglomeration of the phosphor particles during a subsequent ball-milling thereof.

The phosphor dispersion was then subjected to a ball-milling for 72 minutes, then diluted with another 250 milliliters of water, and centrifuged at 1800 r.p.m. for 16 minutes. All particles less than approximately 0.4 of a micron in size and the excess of sodium pyro-phosphate and water were discarded. Particles of from approximately 0.4 to about 5 or 10 microns in size, which are those packed into a mass at the bottom of the centrifuge bottle, were recovered from the centrifuged material for subsequent use.

Some of the 1 percent gelatin solution was adjusted by the addition of glacial acetic acid to bring the solution to a pH of approximately 4. A standard 21 inch rectangular faceplate was then coated with a film of this gelatin solution by covering it with the solution and gently tilting and spinning it to slosh the solution thereover. The gelatin coated faceplate was then washed with a flush of water. The gelatin coating step was then repeated to insure that the faceplate received a complete coverage with gelatin. This did not however, act to provide a thicker gelatin coating on the faceplate.

The gelatin-coated faceplate was then covered with water to a depth of about 2 inches. Five grams of the centrifuged blue phosphor powder were dispersed in 500 milliliters of water and sprinkled over the surface of the water in the faceplate. This was allowed to set for about 15 minutes, then most of the water was poured off. The remaining water and settled phosphor particles were then sloshed over the faceplate by gently tilting and spinning the faceplate.

After a layer of the blue phosphor particles was adhered to the gelatin-filmed faceplate, the phosphor layer was washed with water to remove all loose particles therefrom and then coated with 2 percent potassium silicate solution to improve adherence. The faceplate was then set on its edge and allowed to dry at room temperature.

The above-described gelatin, phosphor, and silicate coating steps were repeated once so as to produce good blue phosphor particle coverage on the faceplate.

*First separator layer.*—A first separator layer of vermiculite was then laid down on the blue phosphor layer as follows. Two-hundred fifty milliliters of standard commercial expanded vermiculite such as that manufactured and sold by the Zonalite Company of Trenton, New Jersey, and designated Terra-Lite was added to 250 milliliters of water and mixed in a blender, such as a Waring house-hold type blender, for 30 minutes. The vermiculite-water mixture was then centrifuged for 10 minutes at 900 r.p.m.

If the vermiculite particles were spheres, the resulting suspension would contain particles no larger than about 1 micron in diameter. Actually, the particles in the suspension are flake-like particles having a thickness much less than 1 micron. This suspension was then concentrated by centrifuging for one hour at 1800 r.p.m. to produce a concentration of about 18 milligrams per milliliter.

The faceplate was then again washed with the 1 percent gelatin solution having a pH of about 4 and then with water as before. The faceplate was then covered with the vermiculite suspension and spun at about 150 r.p.m. to provide a uniform depth of the vermiculite suspension over the surface thereof. After 15 minutes, the vermiculite suspension was removed and the faceplate was washed in water to remove all vermiculite particles not securely adhered to the gelatin film. A layer of the vermiculite was, however, left adhering to the gelatin film on the blue phosphor layer. These steps of washing with gelatin solution, water, vermiculite dispersion, and water were repeated four times (a total of five times) to provide a vermiculite layer having a total weight of about 0.17 milligram per square centimeter.

*Green layer.*—A green emitting phosphor layer of zinc orthosilicate activated with manganese (commercially designated as P22 and such as used in the commercial shadow-mask color tube 21CYP22) was then laid down on the first separator layer as follows. Twenty-five grams of the green phosphor were added to 250 milliliters of water and ball-milled for 74 hours. This was then allowed to settle for 48 hours and the top ¾ of the suspension removed for subsequent use. This produced a dispersion of green phosphor particles that probably were not larger than about one-half micron in size.

The faceplate was then washed with a 0.1 percent gelatin solution and then given a water wash to remove all excess of the gelatin leaving a thin gelatin film thereon. The faceplate was then dried to set the gelatin, and then given another water wash, and spun to remove the excess water.

The faceplate was covered with the green phosphor suspension and spun in a manner as hereinbefore described in providing the vermiculite layers. The excess of the green phosphor suspension was removed from the faceplate and the faceplate washed with water to remove loose non-adhering green phosphor particles.

The steps of washing with gelatin solution, water, green phosphor dispersion, and water were repeated five times (a total of six times) to provide a green phosphor layer having a total weight of about 0.29 milligram per square centimeter. This green phosphor layer was then washed with a 2 percent potassium silicate solution and dried.

*Second separator layer.*—A second vermiculite separator layer was then applied to the green phosphor layer in the same manner as the first separator was applied to the blue phosphor layer, except that a 0.1 percent gelatin solution was used. The steps of laying down the vermiculite were repeated twice (a total of three times) to produce a separator layer of about 0.14 milligram per square centimeter. After the last sublayer of vermiculite was laid down, the surface was washed with a 2 percent solution of potassium silicate.

*Red layer.*—A red emitting phosphor layer of zinc-magnesium - cadmium - silicate - phosphor activated with manganese was then laid down on the second separator layer as follows. 13.65 grams of this red phosphor was mixed with 273 milliliters of water and ball-milled for 70 hours. This phosphor water mixture was allowed to settle for 96 hours and the top ¾ recovered for subsequent use. This produced a dispersion of red phosphor particles that were not larger than about one-half micron in size.

The red phosphor layer was laid down on the second vermiculite separator in a manner similar to that used in laying down the green phosphor layer. As in the case of the green phosphor layer, the red phosphor was laid down six times to produce a layer of about 0.35 milligram per square centimeter. The red phosphor layer was then washed with a 2 percent solution of potassium silicate. The faceplate was then drained and dried at room temperature.

*Aluminum backing.*—The faceplate having superimposed blue, green, and red phosphor layers was finally aluminized according to known techniques as follows. A film of nitrocellulose was spread over the red phosphor layer by floating the nitrocellulose on a pool of water and then decanting the water out from under it. A layer of aluminum was then evaporated onto the nitrocellulose film. The coated faceplate was then assembled into a finished cathode ray tube with the other parts thereof and subjected to the usual bakeout and exhaust and other tube processing steps commonly employed in the industry.

OPERATION USING SCREEN OF FIG. 31

The screen of FIG. 31 may be operated in a system, as in a television receiver, in various ways. It may be operated in a three-gun cathode ray tube employing simultaneous beam operation. Or it may be operated in a single-gun cathode ray tube employing sequential operation, i.e., beam switching. In any case, the beam energy absorptions in the red, green and blue phosphor layers should be in the ratios previously given, i.e., 19.5:4.2:1, if illuminant C white is to be obtained when there is no color modulation. In the case of simultaneous beam operation, the beam absorption ratios may be brought to the desired values by adjusting the relative beam currents. In the case of beam switching, the beam absorption ratios may be brought to the desired values in various ways, as by increasing or decreasing the center voltage, by employing a switching wave of the correct wave form, or by changing the beam current during switching. These things may be done separately or in combination.

To give one example of the operation of this screen, it may be operated satisfactorily in a television receiver employing a single-gun cathode ray tube with undistorted sine wave voltage switching of the beam velocity. The beam preferably is blanked as the beam switching voltage decreased, thus avoiding switching into green during the reverse sequence. The chrominance signal is boosted to an amplitude about two times that of its normal value. The switching voltage may have a center value of 16 kv., a minimum value of 10 kv. and a maximum value of 22 kv. Thus, the percentage modulation in this example is about 37%. Since in this particular screen the use of mica in the separators reduced the color gamut after aluminizing the screen, a switching voltage of 17 kv. center value, a minimum value of 11 kv. and a maximum value of 23 kv. may be preferred.

With either of these switching voltage ranges, i.e., from 10 kv. to 22 kv. or from 11 kv. to 23 kv., white such as illuminant A or B can be made and the operation is satisfactory. If it is desired to obtain illuminant C white, indicated at W on the chromaticity diagram of FIG. 37, the center value of the switching voltage may be shifted to a higher value, as to 18 kv. for example, for this particular screen, still using the same voltage difference between minimum and maximum switching voltages. Specifically, the center voltage may be 18 kv., and the minimum and maximum voltages 12 kv. and 24 kv., respectively. This provides a color gamut that places the coordinates of illuminant C inside the chromaticity diagram, showing the illuminant C white can be made.

As to blanking the beam to avoid switching into green during the reverse sequence, this may be done by applying a positive pulse through a capacitor to the cathode of the cathode ray tube, with the pulse phased to occur during the time green would occur in the reverse sequence. The positive pulse duration may be for about 90° of the complete 360° cycle. In this particular example, the pulse signal is not clamped; therefore, the portion of the signal between blanking pulses is below the A.-C. axis of the signal (taking the blanking pulses as being above the A.-C. axis) so that it makes the cathode of the cathode ray tube slightly more negative during this portion of the blanking signal. The result is that the beam current is increased slightly at this time whereby the amount of green is increased somewhat during the forward color sequence.

The color television signal in this example of operation is the present standard color signal of asymmetrical form. It is fed directly to the cathode ray tube without any conversion. A picture with an acceptable color gamut is obtained. A still better color gamut may be obtained by employing some type of signal conversion such as described in the Schroeder and Loughlin patents previously identified.

In general, the screen of FIG. 31 may be operated in any of the ways described in connection with the various three-color screens previously given as examples. For some types of operation it may not be the optimum screen design, but it will produce a satisfactory color picture. It may be noted with respect to obtaining a white light mix when there is no color modulation that, while illuminant C is generally preferred for the white, the white can depart substantially from illuminant C, provided the departure is essentially along the black body radiation locus, and still be satisfactory. For example, either illuminant A or illuminant B is satisfactory.

It will be understood that instead of calculating a three-color screen on the basis of one of the center voltages assumed in the foregoing examples, it may be desirable to calculate the screen on the basis of a higher center beam voltage, such as 19 kv., for example. This may be desirable whether the screen is calculated for beam switching or for simultaneous beam operation. Using a 19 kv. center beam voltage, the minimum and maximum beam voltages (in the case of beam switching) might be 13 kv. and 25 kv., respectively. In a corresponding example for simultaneous beam operating, the voltages of the three beams might be 13 kv., 19 kv. and 25 kv. The advantages in using a higher center voltage, particularly when the screen is specifically designed for use with that center voltage, are that increased picture brightness may be obtained, and that a smaller spot size may be obtained from the electron beam or beams.

The fact that an increase in picture brightness may be obtained is due in part to the increase in the energy of the electron beam when its voltage is increased. It is also due to the fact that a screen calculated for operation at a higher center voltage has separator and phosphor layers of increased thickness, thus permitting the use of larger and more efficient phosphor particles in these thicker phosphor layers.

It has previously been stated that in the case of the screen of FIG. 31, as in the other screen examples, when the beam is switched into a phosphor layer away from the gun side of the screen, there is more of the beam energy absorbed in the layers on the gun side of the layer switched into than is absorbed in that layer. Specifically, referring to the screen of FIG. 31, when the beam voltage is 16 kv. for switching into the green layer to produce green, for example, less of the energy of the 16 kv. beam is absorbed in the green layer than in the layers between the green layer and the gun side of the screen, these being the red layer and a separator.

This can be determined from the light graphs of FIG. 35 which were obtained from the FIG. 31 screen. FIGURE 35 is based on spectroradiometer readings. Instead of measuring the light for the separate colors by spectroradiometer readings, in some cases it may be sufficient to make the measurements in other ways, for example by use of suitable optical filters. Refer to the red, green and blue light graphs, each marked S5, for the completed screen. From these graphs one can determine, for example, the relative amount of beam energy that is absorbed in the red and green layers when the beam is switched into the green layer. To be specific, assume simultaneous beam operation (with three beams having equal current) where a 16 kv. beam is the one switched into the green layer, that is, it is the beam that produces green light.

Referring to the red and green S5 graphs of FIG. 35, at 16 kv. the beam produces a red light reading of 0.9 and a green light reading of 1.2. To determine the relative amounts of beam energy absorbed in the red and green layers to produce these light readings, the relative light readings (ordinates) of FIG. 35 are converted to relative lumens. The resulting relative lumens output of a phosphor layer is then divided by the relative conversion efficiency of that phosphor layer to determine the relative amount of beam energy absorbed in it.

To convert the graphs S5 of FIG. 35 to relative lumens, red S5 is multiplied by 1, green S5 is multiplied by 2.75, and blue S5 is multiplied by 0.4. These multiplying factors or ratios of 1 to 2.75 to 0.4 for red, green and blue, respectively, are the normalized relative lumens for the three phosphors used as primaries, and are derived from the relative peak to visual radiant energy as given in the booklet entitled "RCA Phosphors," copyright 1957. As previously indicated, the three phosphors used are:

Blue P22 (for direct-view color picture tubes) RCA No. 33–Z–275

Green P22 (for direct-view color picture tubes) RCA No. 33–W–2A

Red (for projection color picture tubes) RCA No. 33–Z–275.

Referring again to the light obtained from the FIG. 31 screen with a 16 kv. beam, the red reading in relative lumens is $0.9 \times 1 = 0.9$; the green reading in relative lumens is $1.2 \times 2.75 = 3.3$. The blue light reading is zero.

The proportion of the energy absorbed in a phosphor layer is the relative lumens output from that layer divided by the relative conversion efficiency of that layer. In the FIG. 31 screen the relative conversion efficiencies of red to green to blue layers are 1 to 10 to 4.86. Therefore, the energy absorbed in the red layer is 0.9 relative lumens $\div 1 = 0.9$. The energy absorbed in the green layer is 3.3 relative lumens $\div 10 = 0.33$. It is evident that there is 2.7 times as much energy absorbed in the red layer as in the green layer. In addition, there is beam energy absorbed in the separator layer between the red and green layers that is not included in the foregoing calculation.

In a similar way it can be shown that when an electron beam is switched into the blue layer to produce blue, there is more of the beam energy absorbed in the layers (phosphor and separator layers) on the gun side of the blue layer than in the blue layer. In the simultaneous-beam operation being assumed, a 22 kv. beam is the one switched into the blue layer to produce blue light. Referring to FIG. 35, the light readings at 22 kv. are: red=0.8, green=2.7, blue=2.5. Converting to relative lumens, red=0.8×1=0.8, green=2.7×2.75=7.4, blue =2.5×0.4=1.0.

Relative energies absorbed in the phosphor layers are:

In red layer: 0.8 relative lumens÷1=0.8
In green layer: 7.4 relative lumens÷10=0.74
In blue layer: 1.0 relative lumens÷4.86=0.21

It is evident from the above that there is more of the beam energy absorbed in the red and green layers than in the blue layer when the beam is switched into the blue layer to produce blue light. In addition to the relative amount of beam energy absorbed in the red and green layers as tabulated above, there is additional beam energy that is absorbed in the separator layers.

The above discussion of relative beam energy absorption in the different layers assumes simultaneous beam operation. It also applies to the case of single beam operation where the velocity of the beam is varied to switch it into the different phosphor layers.

*Multiple-coated-particle screens*

The screens so far described have been formed by laying down a layer across the entire face plate, laying down another layer across the entire face, and repeating this until the multi-layer screen is completed.

Instead of forming the screens in this way, they may be formed by first coating small particles, such as minute glass beads or particles of phosphor, with separator and phosphor layers, and depositing the coated particles on the face plate, by, for example, the well known settling process. This type of screen will be referred to as the multiple-coated-particle screen.

The color screen, however it may be formed, may be thought of as a screen area comprising a multitude of fractional areas. In the multiple-coated-particle screen one of these fractional areas may include one or more of the coated particles.

If glass spheres or beads are used as the base for the several layers, the beads correspond to the face plate that was the base for screens previously described. The beads used may be from about 5 to 40 microns in diameter, for example. Each bead has formed thereon, to give an example, first a layer of blue phosphor which is the base phosphor material, next a separator layer of Ludox, next a layer of green phosphor, next a separator layer of Ludox, and then a layer of red phosphor. Thus a multiple layer screen is formed on each bead. Its design is the same as that of the screens first described, that is, the phosphor efficiencies, the layer thicknesses, etc. are selected and determined as explained in connection with the previously explained screen examples.

Preferably the base for the several layers is the blue phosphor particles themselves in this particular screen example. They may be from about 5 to 40 microns in diameter, for example. To give a specific screen example, on each blue phosphor particle, which in this example is the base phosphor material, there is formed a separator layer of Ludox, next a layer of green phosphor, next a separator layer of Ludox, and then a layer of red phosphor. FIG. 38*a* is a schematic illustration of a multiple-coated particle of this character.

Multiple-coated-particle screens and the process for making them are described in detail in application Serial No. 108,535 filed May 8, 1961 in the name of Ray D. Kell and entitled Luminescent Screens. A brief description of how such screens are made is given below.

Assuming that the base for the several layers is to be the blue phosphor particles, some blue phosphor is put into a bottle containing a solution of gelatin in water. The mixture is agitated to get a coating of gelatin on the individual phosphor particles. The particles are then allowed to settle, and the liquid is poured off. Water is poured into the bottle, and the phosphor particles are agitated in it to wash them. They are allowed to settle, and then the water is poured off. This washing is repeated several times.

Next the first separator layer is formed by pouring Ludox suspended in water into the bottle with the blue phosphor particles. The bottle is agitated to coat the individual phosphor particles with Ludox. The particles are then allowed to settle and the liquid (still Ludox in suspension) is poured off. The particles are then washed in water. Still more Ludox is laid down to increase the separator thickness. This is done by again putting gelatin on the particles, washing them, agitating the particles in the Ludox dispersion, and again washing them.

When the first separator layer is thick enough, the particles are again agitated in a gelatin solution, settled, and washed. Green phosphor particles in water are now poured into the bottle to put a green phosphor layer over the first separator layer. The bottle is agitated and then the coated particles, now having a coating of green phosphor, are allowed to settle. The size of the green phosphor particles is from about 0.1 to 0.8 micron in diameter. Since they are so small that they tend to remain in suspension for some hours, after the coated particles have settled the remaining liquid is a dispersion of green phosphor particles. This dispersion is poured off and the particles are washed in water. The process of coating with gelatin and washing is repeated. Then another coating of green phosphor is put on the coated particles. Again there is a water wash. This process is repeated for about eight times, for example, until the green layer has the desired thickness. The coated particles are then washed in water to remove loose particles of green phosphor.

The second separator layer is then laid down over the green layer in a way similar to that in which the first separator layer was laid down.

Next the red phosphor layer is formed on each individual coated particle. The size of the red phosphor particles is about the same as that of the green phosphor particles. The red layer is laid down over the second separator layer in a way similar to that in which the green layer is laid down over the first separator layer. After the final coating of red phosphor is laid down, and the dispersion of red phosphor has been poured out of the bottle, water is put into the bottle and the coated particles agitated in it to wash off any remaining loose red phosphor particles. This wash step may be repeated two or three times.

It may be desirable, after the loose red phosphor particles have been washed away, to provide a final protective treatment to avoid any washing away of the red phosphor layer in the process of putting the coated particles on a face plate, as by settling. This protective treatment may be that of providing a hardened gelatin coating.

After the final coating has been laid down on the individual particles, they may be deposited on the face plate of a cathode ray tube in the same way that a phosphor for a black and white television picture would be laid down, as by settling.

The coated particles may be stored either wet or dry until it is desired to put them on a face plate, as by settling. If stored wet, they simply remain in some of the final wash water. If to be stored dry, the water is poured off them, and they are spread out and allowed to dry at room temperature, for example.

In making a screen of these multiple layer coated particles there is no difficulty in making a very uniform screen so far as large area uniformity is concerned. As to small area uniformity, this is at least as good as in screen made by laying down each layer across the entire face plate.

A screen made of multilayer coated particles has an undulating surface much like that of the screen of FIG. 31 where the blue phosphor particles are fairly large. Thus, following the design and techniques described in connection with the screen of FIG. 31, a multilayer coated particle screen can be made that will be similar to the screen of FIG. 31, and usually better as to color gamut and/or reduced beam voltage differences, as well as providing improved large area color uniformity.

In building up a multilayer coated particle screen, the same techniques and procedures as described in connection with the screen of FIG. 31 may be used. A multilayer coated particle screen that corresponds substantially to the screen of FIG. 31 will have approximately the same layer mass thicknesses as those of the screen of FIG. 31. One of the coated particles of such a screen is illustrated schematically in FIG. 38*a*. In the specific example of a multilayer coated particle illustrated in FIG. 38*a*, the thicknesses in microns corresponding to mass thicknesses are indicated. While a screen made of these specific coated particles corresponds substantially to the screen of FIG. 31, the separator layer mass thicknesses are somewhat greater than in FIG. 31. Because of this, and because the separator layers of the coated particles are Ludox instead of mica, the thicknesses of the separator layers in microns are greater in FIG. 38*a* than in FIG. 31. (Ludox is less dense than mica, the density of Ludox being $\rho=1.64$ and the density of mica being $\rho=2.9$.) The red and green phosphors used for the coated particle of FIG. 38*a* are the same as those for the screen of FIG. 31. The thicknesses of the phosphor layers of the coated particles are substantially the same as in the screen of FIG. 31, the red phosphor layer being slightly thicker.

The blue phosphor used is the RCA No. 33–Z–20C having I.C.I. coordinates $x=0.151$, $y=0.032$ and an efficiency (Lumens/watt) of 5. This phosphor was used because it could be obtained conveniently in particles of the desired size. It will be noted that this is a slightly better blue than obtained from the P22 blue phosphor used in the FIG. 31 screen. The efficiency is slightly less than that of the P22 blue phosphor used in the FIG. 31 screen, but this is largely compensated by the fact that the blue is better than the P22 blue. The relative conversion efficiencies of the phosphors are nearly the same as in the screen of FIG. 31.

In the case of a multilayer coated particle screen it is unnecessary to cover a large face plate with coated particles in order to make measurements at the various stages of construction, that is, the stages in coating the individual particles. When it is desired to check the thickness of a layer and/or the light emitted from a layer, some of the coated particles at that stage of construction are settled on a small glass plate, such as a plate two inches square, this small plate is put in a demountable cathode ray tube, and light output versus beam voltage measurements are made as described in connection with the screen of FIG. 31. It will be understood that, in order to make the measurements, there should be a conductive coating either under or over the settled particles. The conductive coating may be, for example, "TIC" coating on the glass plate, or an evaporated aluminum layer on the settled particles.

FIG. 38*b* shows a chromaticity diagram for a three-color screen made by settling multilayer coated particles of the type described above. The large triangle is a chromaticity diagram of the phosphors used in a shadow mask tube, such as the 21CYP22A, included for comparison purposes. The improvement in the color gamut over that of the FIG. 31 screen is largely due to some improvement in the small area (particle dimension) uniformity.

It may be desirable in making a multiple-coated-particle screen to have the multiple-coated particles of a fairly uniform size, or, at least, to avoid having them differ greatly in size, because the use of multiple-coated particles of fairly uniform size results in improved color gamut.

*Simultaneous beam operation with a three-gun tube*

It has been stated that the various screens described may be operated either in a single-gun tube with beam switching or in a multiple-gun tube with simultaneous beam operation. One example (note FIGS. 29 and 30) has been given of a screen having an optimum design for simultaneous beam operation.

A satisfactory cathode ray tube and circuit for simultaneous beam operation will now be described briefly. The tube and its operation are described in application Serial No. 108,431 filed May 8, 1961, in the names of J. Gross and P. J. Messineo, and entitled "Cathode Ray Tube", now Patent No. 3,164,737 issued January 5, 1965.

Figures 39, 40:
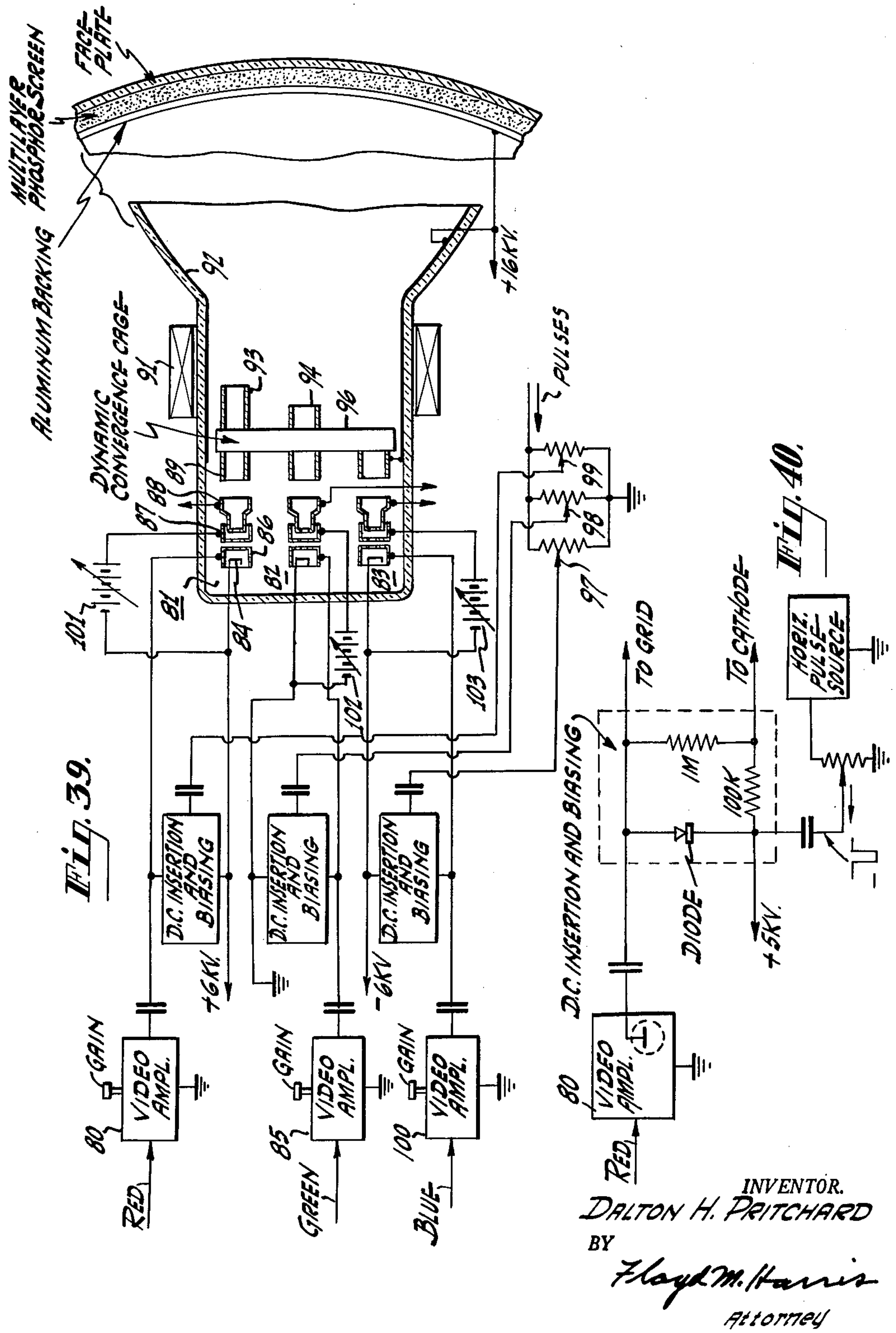
FIG. 39 is a schematic diagram illustrating an example of the invention employing simultaneous beam operation.
FIG. 40 is a circuit diagram of a direct-current insertion and biasing circuit that may be employed in the apparatus of FIG. 39.

FIG. 39 shows in schematic diagram, partly in section, the three-gun tube described in the above-identified Gross et al. application. FIG. 39 also shows in block diagram some of the associated color television circuit. The cathode ray tube comprises three electron guns 81, 82 and 83. Each gun includes a cathode 84, a control grid 86, a screen grid 87, a focus electrode 88, and an anode 89.

A three-color screen of the multilayer type is on the face plate of the cathode ray tube. This may be any one of the three-color screens previously described such as, for example, the screen of FIG. 31. If desired, it may be a screen of the multiple-coated-particle type. The screen is provided with the usual aluminum backing layer.

A deflecting yoke 91 is provided for deflecting the three beams horizontally and vertically across the three-color screen in accordance with usual television receiver practice.

The usual aquadag coating 92 is on the inside of the glass envelope. It is electrically connected to the aluminum backing layer, and both are maintained at a high voltage such as 16 kilovolts. The three anodes 89 are electrically connected to each other and are each maintained at the same voltage as the aquadag coating.

The cathodes of guns 81, 82 and 83 are held at plus 6 kv., at ground potential, and at minus 6 kv., respectively, so that the electron beams from these three guns are of 10 kv., 16 kv. and 22 kv. velocity, respectively. Thus, as previously explained, the 10 kv. makes the screen emit red, the 16 kv. beam makes the screen emit green, and the 22 kv. beam makes the screen emit blue.

In simultaneous beam operation, the deflecting field common to the three different velocity beams will deflect the three beams different amounts, unless provisions are made to avoid this. The tube shown in FIG. 39 provides different length magnetically permeable shielding tubes 93 and 94 for the two lower velocity beams. The longer tube is used for the lowest velocity beam. Each shielding tube shields a beam from a portion of the magnetic deflecting field. The lowest velocity beam (from gun 81) will be deflected by the deflecting field only after the beam electrons leave the shielding tube 39 which extends into the deflecting field. The beam from gun 82 will be deflected as soon as the beam electrons leave the shorter shielding tube 94. The highest velocity beam (from gun 83) is not provided with a shielding tube; therefore it is under the influence of the complete deflection field.

When the parameters of the shielding elements are properly selected, the deflection rasters of the three beams are in substantial register. If the three rasters are to be in even better register, dynamic convergence, similar to present commercial practice, should also be employed, as indicated schematically by the dynamic convergence cage 96.

The three anodes 89 and the shield tubes 93 and 94 are mechanically supported by the cage 96, and are all electrically connected by the cage, so that they are all maintained at 16 kv., in the example shown.

In the color television receiver operation, the processing of the incoming signals may be the same as in the operation of a receiver using a three-gun shadow mask tube. In one well known type of circuit, red, green and blue signals are fed to the control grids of the three guns. As shown in FIG. 39, red, green and blue are fed through video amplifiers 80, 85 and 100, each provided with a gain control, and through coupling capacitors to the grids of the guns 81, 82 and 83, respectively.

The red, green and blue color signals supplied as inputs to the apparatus of FIG. 39 may be derived from received modulated color subcarrier waves in accordance with well known color demodulation and matrixing techniques. It will be understood that, in the example illustrated, each of these red, green and blue input signals is a color difference signal plus the luminance signal. Where the phosphors employed in the cathode ray reproducing device of FIG. 39 effectively constitute primaries altered from those upon which the FCC color signal standards are based, it may be found desirable to choose different demodulation angles and/or matrixing constants than those otherwise employed, in order to present the color information most accurately in terms of the altered primaries.

Each control grid is biased with respect to its cathode by means of a direct current insertion and biasing circuit of the keyed type. An example of such a circuit is shown in FIG. 40. It is keyed by pulses occurring at the horizontal deflection rate. The bias voltages for the three guns are individually adjustable by means of adjustable taps 97, 98 and 99 as shown in FIG. 39.

The screen grid voltage sources are indicated in FIG. 39 as batteries 101, 102 and 103. These voltages also are individually adjustable. Suitable voltages are applied to the focusing electrodes 88 through leads as indicated in FIG. 39.

Referring now to certain desirable adjustments of the receiver and three-gun tube of FIG. 39, the procedure for adjusting to obtain a balanced gray scale and to provide tracking over the characteristics of the three guns is similar to the procedure employed with the three-gun shadow mask tube. Briefly, with no picture signal on, the grid biases are adjusted by taps 97, 98 and 99 so that each beam is at just beam current cut-off so that the screen is black.

Next, with black and white picture signal on, the gains of the video amplifiers 80, 85 and 100 are adjusted so that the picture on the screen is a black and white picture. It will be recalled that the multilayer screens are designed so that a white light mix can be obtained. In the specific example given earlier of an optimum design of a screen for simultaneous beam operation, a white light mix is obtained when the three beam currents are made equal, as may be done by adjusting the video amplifier gains.

The third adjustment to obtain a balanced gray scale and tracking is an adjustment of the voltages on the screen grids 87 of the three guns so that there is a tracking of the operation over the characteristics of the three guns. This adjustment also is made with black and white picture signal on.

*Single-color-emitting-particle screens*

In the foregoing description and discussion of electron penetration type screens, reference has been made only to screens comprising multiple layers of phosphors, whether in large area layers or in minute areas, as in the case of coated particles. However, it should be recognized that the invention also applies to a screen structure comprising, for example, single-color emitting particles. One suitable mixture being one-third red emitting particles, one-third green emitting particles and one-third blue emitting particles.

The design of such a screen follows the principles that have been discussed. Taking the design of the screen of FIG. 31, for example, and assuming the screen is to consist of a mixture of one-third each of red, green and blue emitting particles, the particles may be as follows:

*Red emitting particles.*—A 20 micron diameter glass bead coated with the fine powder red phosphor to a thickness of 0.35 mg./cm.$^2$. This is the same red layer as in the FIG. 31 screen.

*Green emitting particles.*—A 20 micron diameter glass bead coated with fine powder green phosphor to a thickness of 0.29 mg./cm.$^2$. This is the same green layer as in the FIG. 31 screen. On top of the green layer there is a coating of Ludox to a thickness of 0.49 mg./cm.$^2$. The mass thickness of this Ludox coating is equal to the sum of the red layer and the separator layer mass thicknesses of the FIG. 31 screen.

*Blue emitting particles.*—A blue phosphor particle of about 20 micron size coated with Ludox to a thickness of 0.95 mg./cm.$^2$. This Ludox coating equals the sum of the mass thicknesses of the red layer, the separator layer between red and green, the green layer, and the other separator layer of the FIG. 31 screen.

The above-described single-color emitting particles may be used in combination with the previously described particles that are coated with multiple layers of phosphors. For example, if a screen comprising the particles coated with multiple layers of phosphors is found to be somewhat deficient in blue light, the amount of blue may be increased by adding some of the above-described particles that can emit blue only.

*Conclusion*

Various examples of electron penetration type color screens embodying the invention have been described, in each of which the screen may be operated to provide a satisfactory color gamut at reasonable electron voltage differences. These examples include three-color screens which are satisfactory for home television receivers. The examples include screens formed by laying down phosphor and separator layers across the entire face plate, they include screens formed by coating small particles with phosphor and separator layers and depositing the resulting multiple-coated particles on the face plate, and they include screens formed by coating small particles with the proper thickness of inert material over the phosphor to produce single-color-emitting particles and depositing them on the face plate.

In a screen consisting of single-color emitting particles, each fractional area of the color screen includes at least one of these particles. If the smallest possible fractional area is assumed, then one fractional area emits only blue, another fractional area emits only green, etc.

Also, in the multiple-coated-particle screens each fractional area of the screen includes at least one multiple-coated-particle. In these screens one fractional incremental area emits blue at a certain beam voltage and another fractional area emits green at a different beam voltage, for example but, also, all fractional areas emit blue at said certain voltage, and all fractional areas emit green at said different voltage.

The fractional areas of a screen, in the sense used in the claims, may each include more than the smallest possible fractional area referred to above. A fractional area may include several multiple-coated-particles, for example. In the case of a mixture of multiple-coated-particles and single-color-emitting particles, a fractional area may include one or more particles of each kind. In the case of continuous layer screens, such as that illustrated in FIG. 31, for example, a fractional area may be any arbitrary small fraction of the total screen area.

From the foregoing it will be apparent that, in general, regardless of the screen structure, whether comprising layers put down across the entire face plate, whether comprising multiple-coated particles, or whether comprising single-color emitting particles, the phosphor excited by the comparatively low velocity electrons has substantially no electron energy absorbing material between it and the electron source other than the aluminum backing coating, whereas the phosphor excited by higher velocity electrons has a certain amount of electron energy absorbing material between it and the electron source. This certain amount of energy absorbing material includes the first phosphor and some inert material in the case of the first two structures mentioned above where one phosphor layer is superimposed on another phosphor; but it includes only inert material in the case of a screen comprising single-color emitting particles only.

The invention has been described in terms of specific examples and embodiments. However, various changes and modifications may be made therein without departing from the spirit and scope of the invention as defined by the following claims.

What is claimed is:

1. A color screen of the electron penetration type comprising a plurality of phosphors including a first phosphor to be excited by comparatively low velocity electrons to emit light of a first color and a second phosphor to be excited by higher velocity electrons to emit light of a second color, the second phosphor having a certain amount of electron energy absorbing material between it and the electron source, the second phosphor having a greater effective conversion efficiency than the effective conversion efficiency of the first phosphor, and the mass thickness of said certain amount of energy absorbing material being such that more of the energy of the higher velocity electrons is absorbed in said certain amount of energy absorbing material than in said second phosphor.

2. A color screen of the electron penetration type comprising a first phosphor material to be excited by comparatively low velocity electrons in the form of a beam to emit light of a first color, a second phosphor to be excited by higher velocity electrons in the form of a beam to emit light of a second color, the second phosphor having a certain amount of electron absorbing material between it and the electron source, said certain amount of material having an average mass thickness that is greater than the average mass thickness of the first phosphor material, the second phosphor material having a greater conversion efficiency than the effective conversion efficiency of the first phosphor material, said certain amount of electron energy absorbing material having an average mass thickness that is the average of the mass thicknesses of the elemental areas within the cross sectional area of the beam of electrons, said certain amount of material being characterized in that the mass thicknesses of elemental areas are so nearly alike in value that when the material is struck by a beam of electrons no substantial percentage of the electrons in said beam will pass through the material until the beam voltage is at least approximately one-half the highest beam voltage at which no substantial percentage of the electrons of the beam will pass through the same average mass thickness of a material in which the mass thicknesses of the elemental areas are substantially equal and in which the elemental areas thereof approach the molecular dimensions of the material as a limit.

3. A color screen comprising a multitude of fractional areas, each of which comprises one phosphor that emits light of one color when excited by electrons of a certain velocity and a different phosphor that emits light of a different color when excited by electrons of a higher velocity than said certain velocity, said one phosphor being in the form of a layer of discrete fine phosphor particles and having a certain average mass thickness and a certain effective conversion efficiency, said different phosphor having a conversion efficiency that is greater than the effective conversion efficiency of said one phosphor, there being a certain amount of energy absorbing material between said different phosphor and, the electron source, said energy absorbing material being so packed and distributed that no substantial percentage of the electrons can pass through said packed materials without striking said materials, and the average mass thickness of said fractional areas of said energy absorbing material being such that more of the energy of said higher velocity electrons is absorbed in said energy absorbing material than in said different phosphor.

4. In a cathode ray tube of the electron penetration type, an electron gun structure for producing a stream of comparatively low velocity electrons and a stream of higher velocity electrons, first and second light producing layers forming a display screen for said tube, said first layer being on the electron gun structure side of said display screen with respect to the second layer, said first layer having a predetermined average mass thickness so related to the velocity of said comparatively low velocity electrons that most of the energy of the comparatively low velocity electrons is absorbed in said first layer, the velocity of said higher velocity electrons being so related to said mass thickness that some of the energy of the higher velocity electrons is absorbed in said second layer but with more of the energy of the higher velocity electrons absorbed in said first layer than in said second layer.

5. A three-color screen which is to be scanned by at least one electron beam and which comprises a multitude of fractional areas, each of said areas comprising a base phosphor material that emits one color when excited by electrons, a middle layer of phosphor material that emits a second color when excited by electrons, a back or beam-side layer of phosphor material that emits a third color when excited by electrons, a first separator layer of inert material separating said front phosphor material and said middle layer of phosphor, a second separator layer of inert material separating said middle layer of phosphor and said back layer of phosphor, said base phosphor and said middle layer phosphor each having a greater conversion efficiency than the effective conversion efficiency of said back or beam-side phosphor, the materials of said middle layer of phosphor, of said beam-side layer of phosphor, and of said separator layers being so packed that no substantial percentage of the electrons in said beam is allowed to pass through said layers without striking said materials.

6. A three-color screen which is to be scanned by at least one electron beam and which comprises a multitude of minute fractional areas, each of said areas comprising a base phosphor material that emits one color when excited by electrons, a middle layer of phosphor in the form of discrete fine phosphor particles that emits a second color when excited by electrons, a back or beam-side layer of phosphor in the form of discrete fine phosphor particles that emits a third color when excited by electrons, a first separator layer of inert material separating said base phosphor material and said middle layer of phosphor, a second separator layer of inert material separating said middle layer of phosphor and said back layer of phosphor, said base phosphor and said middle layer phosphor each having a greater conversion efficiency than the effective conversion efficiency of said back or beam-side phosphor, each of said layers having an average mass thickness that is the average of the mass thicknesses of the elemental areas within the cross sectional area of the electron beam, each of said layers being characterized in that said mass thicknesses of the elemental areas are so nearly alike in value that when the layer is struck by a beam of electrons no substantial percentage of the electrons in said beam will pass through the layer until the beam voltage is at least approximately one-half the highest beam voltage at which no substantial percentage of the electrons of the beam will pass through the same average mass thickness of a material in which the mass thicknesses of the elemental areas are substantially equal and in which the elemental areas thereof approach the molecular dimensions of the material as a limit.

7. A color screen of the electron penetration type comprising a first phosphor material to be excited by comparatively low velocity electrons in the form of a beam to emit light of a first color, a second phosphor material to be excited by intermediate velocity electrons in the form of a beam to emit light of a second color, and a third phosphor to be excited by comparatively high velocity electrons in the form of a beam to emit light of a third color, the second phosphor material having a certain amount of electron absorbing material between it and the electron source, said certain amount of material having an average mass thickness that is greater than the average mass thickness of the first phosphor material, and the third phosphor having energy absorbing material between it and the electron source which has an average mass thickness greater than the sum of the average mass thickness of said certain amount of material and the average mass thickness of the second phosphor material, the second phosphor material and the third phosphor having a greater conversion efficiency than the effective conversion efficiency of the first phosphor material, each of the electron energy absorbing materials, including the first and second phosphor materials, that are between the third phosphor and the electron source having an average mass thickness that is the average of the mass thicknesses of the elemental areas within the cross sectional area of the beam of electrons, each of said materials being characterized in that the mass thicknesses of the elemental areas are so nearly alike in value that when the material is struck by a beam of electrons no substantial percentage of the electrons in said beam will pass through the material until the beam voltage is at least approximately one-half the highest beam voltage at which no substantial percentage of the electrons of the beam will pass through the same average mass thickness of a material in which the mass thicknesses of the elemental areas are substantially equal and in which the elemental areas thereof approach the molecular dimensions of the material as a limit.

8. A screen for a color picture tube, said screen comprising a multitude of fractional areas, said screen being designed to be operated by penetration of electrons at different voltages, each of the fractional areas comprising a base phosphor material and further comprising a phosphor layer on the back or electron-source side of said screen and a middle phosphor layer between said base phosphor material and said back layer, said base phosphor material and said middle phosphor layer being separated by a first separator layer of inert material, said back and middle phosphor layers being separated by a second separator material of inert material, all of said layers through which electrons must pass being substantially uniform and homogeneous in the sense that substantially all of said electrons will strike electron energy absorbing material as they pass through a layer, and will strike substantially the same amount of material in the layer regardless of where the electrons impinge on the layer area, said base phosphor material and each of said phosphor layers emitting light when excited by said electrons, the emitted light from each phosphor having a spectral distribution such that the light from said three phosphors can mix to produce a white light, the middle phosphor layer having a greater conversion efficiency than the effective conversion efficiency of the back phosphor layer, the base phosphor material also having a greater conversion efficiency than the effective conversion efficiency of the back phosphor layer, and said middle phosphor layer having an average mass thickness that is substantially less than the average mass thickness of said back phosphor layer.

9. A screen for a color picture tube, said screen comprising a multiude of fractional areas, said screen being designed to be operated by penetration of electrons at different voltages, each of the fractional areas comprising a base phosphor material and further comprising a phosphor layer on the back or electron-source side of said screen and a middle phosphor layer between said base phosphor material and said back layer, said base phosphor material and said middle phosphor layer being separated by a first separator layer of inert material, said back and middle phosphor layers being separated by a second separator material of inert material, all of said layers through which electrons must pass being substantially uniform and homogeneous in the sense that substantially all of said electrons will strike electron energy absorbing material as they pass through a layer, and will strike substantially the same amount of material in the layer regardless of where the electrons impinge on the layer area, said base phosphor material and each of said phosphor layers emitting light when excited by said electrons, the emitted light from each phosphor having a spectral distribution such that the light from said three phosphors can mix to produce a white light, the middle phosphor layer having a greater conversion efficiency than the effective conversion efficiency of the back phosphor layer, the base phosphor material also having a greater conversion efficiency than the effective conversion efficiency of the back phosphor layer, said middle phosphor layer having an average mass thickness that is substantially less than the average mass thickness of said back phosphor layer, and said first separator layer having an average mass thickness that is greater than that of the second separator layer.

10. A screen for a color picture tube, said screen comprising a multitude of fractional areas, said screen being designed to be operated by penetration of electrons at different voltages, each of the fractional areas comprising a base phosphor material that emits blue when excited by electrons and further comprising a phosphor layer on the back or electron-source side of said screen that emits red when excited by electrons and a middle phosphor layer between said base phosphor material and said back layer that emits green when excited by electrons, said base phosphor material and said middle phosphor layer being separated by a first separator layer of inert material, said back and middle phosphor layers being separated by a second separator material of inert material, all of said layers through which electrons must pass being substantially uniform and homogeneous in the sense that substantially all of said electrons will strike electron energy absorbing material as they pass through a layer, and will strike substantially the same amount of material in the layer regardless of where the electrons impinge on the layer area, the middle phosphor layer having a greater conversion efficiency than the effective conversion efficiency of the back phosphor layer, the base phosphor material also having a greater conversion efficiency than the effective conversion efficiency of the back phosphor layer, and said middle phosphor layer having an average mass thickness that is substantially less than the average mass thickness of said back phosphor layer.

11. A three-color screen which is to be scanned by at least one electron beam and in which the area of the screen comprises a multitude of fractional areas, each of said fractional areas of the screen comprising a base phosphor material that emits one color when excited by electrons, a middle layer of phosphor material in the form of discrete fine phosphor particles that emits a second color when excited by electrons, a back or beam-side layer of phosphor material in the form of discrete fine phosphor particles that emits a third color when excited by electrons, said base phosphor and said middle layer phosphor each having a greater conversion efficiency than the effective conversion efficiency of said back or beam-side phosphor, the materials of said middle layer of phosphor and of said beam-side layer of phosphor being so packed that no substantial percentage of the electrons in said beam is allowed to pass through said layers without striking said material, the three phosphors each having a spectral distribution such that the colors emitted from the three phosphors may be combined to produce white light, the relative conversion efficiencies of said phosphors, the color order of the phosphor layers, and the average mass thicknesses of said phosphor layers being such that the color screen is capable of producing a certain minimum color gamut under excitation by electron beam energy lying within the limits of from 9 kv. minimum energy to 27 kv. maximum energy, said minimum color gamut being defined by a chromaticity diagram passing through the C.I.E. coordinates $x=.63$, $y=.36$; $x=.44$, $y=.45$; and $x=.25$, $y=.25$.

12. In a cathode ray tube, a screen having an area that comprises a multitude of fractional areas, said screen to be scanned by at least one electron beam, each of said fractional areas of the screen comprising a base phosphor material that emits light of one color when excited by comparatively high voltage electrons, a phosphor layer thereon which emits light of a different color when excited by comparatively low voltage electrons, and a middle phosphor layer between said base phosphor and said first-mentioned phosphor layer which emits light of a still different color when exicted by intermediate voltage electrons, said base phosphor material and said middle phosphor layer being separated by a layer of inert material, said two phosphor layers being separated by a second layer of inert material, said first-mentioned phosphor layer having an average mass thickness greater than that of the middle phosphor layer, and said middle phosphor layer and said base phosphor each having a conversion efficiency greater than the effective conversion efficiency of said first-mentioned phosphor layer, said screen being further characterized in that each of said layers has an average mass thickness that is the average of the mass thicknesses of the elemental areas within the cross sectional area of said electron beam, each of said layers being characterized in that said mass thicknesses are so nearly alike in value that when the layer is struck by a beam of electrons no substantial percentage of the electrons in said beam will pass through the layer until the beam voltage is at least approximately one-half the highest beam voltage at which no substantial percentage of the electrons of the beam will pass through the same average mass thickness of a material in which the mass thickness of the elemental areas are substantially equal and in which the elemental areas thereof approach the molecular dimensions of the material as a limit.

13. In a cathode ray tube, a screen having an area that comprises a multitude of fractional areas, each of said fractional areas of the screen comprising a base phosphor material that emits a blue light when excited by electrons, a phosphor layer thereon which emits a green light when excited by electrons, and a phosphor layer thereon which emits red light when excited by electrons, said base phosphor material and said phosphor layers each being separated by layers of inert material, said phosphors being positioned in the color order named reading from the base phosphor to the electron-source side of the screen, said red phosphor layer having an average mass thickness greater than that of the green phosphor layer, and said green phosphor layer and said blue base phosphor each having a conversion efficiency greater than the effective conversion efficiency of said red phosphor layer.

14. A cathode ray tube having a screen designed to be operated by penetration of comparatively low voltage electrons, by penetration of intermediate voltage electrons, and by penetration of comparatively high voltage electrons, said screen comprising a multitude of fractional areas, each of said fractional areas comprising a base or viewing-side phosphor, a middle phosphor layer and a back or electron-source side phosphor layer, a layer of inert material between said base phosphor and said middle phosphor layer, a second layer of inert material between said two phosphor layers, said inert and phosphor layers having a combined mass thickness such that when penetrated by said comparatively high voltage electrons the viewing-side phosphor is penetrated by said electrons but with the greater part of the electron energy absorbed in the screen between said viewing-side phosphor and the surface of said screen facing the electron source, the screen layers between the middle phosphor layer and the surface of the screen facing the electron source having a mass thickness such that the middle phosphor layer is penetrated by said intermediate voltage electrons, but with more of the electron energy absorbed in the layers between the middle phosphor layer and the surface of the screen facing the electron source than in the middle phosphor layer, and the back or electron-source side phosphor layer and the second layer of input material also having a mass thickness such that the greater part of the energy of said comparatively low voltage electrons is absorbed in the screen material between the middle phosphor layer and the surface of the screen facing the electron source.

15. A cathode ray tube having a screen designed to be operated by penetration of comparatively low voltage electrons, by penetration of intermediate voltage electrons, and by penetration of comparatively high voltage electrons, said screen comprising a multitude of fractional areas, each of said fractional areas comprising a base or viewing-side phosphor layer that emits light of one color when excited, a middle phosphor layer that emits light of a second color when excited and a back or electron-source side phosphor layer that emits light of a third color when excited, a layer of inert material between said base phosphor and said middle phosphor layer, a second layer of inert material between said two phosphor layers, said inert and phosphor layers having a combined mass thickness such that when penetrated by said comparatively high voltage electrons the sum of the value obtained by dividing the light, in relative lumens, from the back side phosphor layer by the relative conversion efficiency of said bask side phosphor layer plus the value obtained by dividing the light, in relative lumens, from the middle phosphor layer by the relative conversion efficiency of said middle phosphor layer is greater than the value obtained by dividing the light, in relative lumens, from the base phosphor by the relative conversion efficiency of said base phosphor, the screen layers between the middle phosphor layer and the surface of the screen facing the electron source having a mass thickness such that when penetrated by said intermediate voltage electrons, the value obtained by dividing the light, in relative lumens, from the back side phosphor layer by the relative conversion efficiency of said back side phosphor layer is greater than the value obtained by dividing the light, in relative lumens, from the middle phosphor layer by the relative conversion efficiency of said middle phosphor layer, and the back or electron-source side phosphor layer and the second layer of inert material also having a mass thickness such that the greater part of the energy of said comparatively low voltage electrons is absorbed in the screen material between the middle phosphor layer and the surface of the screen facing the electron source.

16. A cathode ray tube having a color screen designed to be operated by penetration of comparatively low voltage electrons, by penetration of intermediate voltage electrons, and by penetration of comparatively high voltage electrons, said screen comprising a multitude of fractional areas, each of said fractional areas comprising a base or electron-source side phosphor layer that emits light of a first color when excited by electrons, a middle phosphor layer that emits light of a second color when excited by electrons, and a base phosphor that emits light of a third color when excited by electrons, a layer of inert material between said base phosphor and said middle phosphor layer, a second layer of inert material between said two phosphor layers, said inert and phosphor layers having a mass thickness such that when penetrated by said comparatively high voltage electrons the base phosphor is penetrated by said electrons but with the greater part of the electron energy absorbed in the screen between said base phosphor and the surface of said screen facing the electron source, the screen layers between the middle phosphor layer and the surface of the screen facing the electron source having a mass thickness such that the middle phosphor layer is penetrated by said intermediate voltage electrons but with more of the electron energy absorbed in the layers between the middle phosphor layer and the surface of the screen facing the electron source than in the middle phosphor layer, and the phosphor layer facing the electron source and the second layer of inert material also having a mass thickness such that the greater part of the energy of said comparatively low voltage electrons is absorbed in the screen material between the middle phosphor layer and the surface of the screen facing the electron source, the conversion efficiency of the base phosphor and of the middle phosphor layer both being enough greater than the effective conversion efficiency of the back phosphor layer so that when there is screen penetration only by said comparatively high voltage electrons there is produced a color that subjectively is said third color, and so that when there is screen penetration only by said intermediate voltage electrons there is produced a color that subjectively is said second color.

17. A cathode ray tube having a color screen designed to be operated by penetration of comparatively low velocity electrons, by penetration of intermediate velocity electrons and by penetration of comparatively high velocity electrons, means including at least one electron gun for producing said comparatively low velocity electrons, said intermediate velocity electrons and said comparatively high velocity electrons, said screen comprising a multitude of fractional areas, each of said fractional areas comprising a back or gun-side phosphor layer that emits light of a first color when excited by electrons, a middle phosphor layer that emits light of a second color when excited by electrons, and a base phosphor that emits light of a third color when excited by electrons, the colors emitted by the phosphors each having a spectral distribution such that, in the absence of electron-beam intensity modulation, the colors may be added to give a light mix that is white light, a layer of inert material between said base phosphor and said middle phosphor layer, a second layer of inert material between said two phosphor layers, said inert and phosphor layers having a mass thickness such that when penetrated by said comparatively high velocity electrons the base phosphor is penetrated by said electrons sufficiently to provide a proper contribution of the third color to the white light mix but with the greater part of the electron energy absorbed in the screen between said base phosphor and the surface of said screen facing the electron source, the screen layers between the middle phosphor layer and the surface of the screen facing the electron source having a mass thickness such that the middle phosphor layer is so penetrated by said intermediate velocity electrons as to provide a proper contribution of the second color to the white light mix but with more of the electron energy absorbed in the layers between the middle phosphor layer and the surface of the screen facing the electron source than in the middle phosphor layer, and the gun-side phosphor layer and the second layer of inert material also having a mass thickness such that the greater part of the energy of said comparatively low velocity electrons is absorbed in the screen material between the middle phosphor layer and the gun-side surface of the screen, the resulting emission of the first color being a proper contribution to the white light mix, said screen being further characterized in that when there is screen penetration only by said comparatively high velocity electrons there is produced a color that subjectively is said third color, and so that when there is screen penetration only by said intermediate velocity electrons there is produced a color that subjectively is said second color.

18. A color screen of the electron penetration type comprising a first phosphor to be excited by comparatively low velocity electrons to emit light of a first color, a second phosphor to be excited by intermediate velocity electrons to emit light of a second color, and a third phosphor to be excited by comparatively high velocity electrons to emit light of a third color, the second phosphor having a certain amount of electron energy absorbing material between it and the electron source, and the third phosphor having more electron energy absorbing material than said certain amount between it and the electron source, the second and third phosphors each having a greater conversion efficiency than the effective conversion efficiency of the first phosphor, the average mass thickness of said certain amount of material being such that no more than a small part of the energy of the comparatively low velocity electrons is absorbed in said second phosphor, the average mass thickness of said certain amount of energy absorbing material also being such that more of the energy of the intermediate velocity electrons is absorbed in said certain amount of energy absorbing material than in said second phosphor, and the average mass thickness of the energy absorbing material between said third phosphor and the electron source being such that more of the energy of the comparatively high velocity electrons is absorbed in said last-mentioned energy absorbing material than in said third phosphor.

19. A color screen of the electron penetration type comprising a first phosphor material to be excited by comparatively low velocity electrons to emit light of a first color, a second phosphor material to be excited by intermediate velocity electrons to emit light of a second color, and a third phosphor to be excited by comparatively high velocity electrons to emit light of a third color, the second phosphor material having a certain amount of electron energy absorbing material between it and the electron source, and the third phosphor having more electron energy absorbing material than said certain amount between it and the electron source, the second phosphor material and the third phosphor each having a greater conversion efficiency than the effective conversion efficiency of the first phosphor material, the average mass thickness of said certain amount of material being such that no more than a small part of the energy of the comparatively low velocity electrons is absorbed in said second phosphor material, the average mass thickness of said certain amount of energy absorbing material being such that more of the energy of the intermediate velocity electrons is absorbed in said certain amount of energy absorbing material than in said second phosphor material, and the average mass thickness of the energy absorbing material between said third phosphor and the electron source being such that more of the energy of the comparatively high velocity electrons is absorbed in said last-mentioned energy absorbing material than in said third phosphor, all of said materials being so packed that no substantial percentage of the electrons is allowed to pass through said materials without striking said materials.

20. A color screen of the electron penetration type comprising a first phosphor to be excited by comparatively low velocity electrons to emit light of a first color, a second phosphor to be excited by intermediate velocity electrons to emit light of a second color, and a third phosphor to be excited by comparatively high velocity electrons to emit light of a third color, the colors emitted by the phosphors each having a spectral distribution such that, in the absence of color signal modulation of the electrons, the colors may be added to give a light mix that is a white light, the second phosphor having a certain amount of electron energy absorbing material between it and the electron source, and the third phosphor having more electron energy absorbing material than said certain amount between it and the electron source, the second and third phosphors each having a greater conversion efficiency than the effective conversion efficiency of the first phosphor, the average mass thickness of said certain amount of material being such that no more than a small part of the energy of the comparatively low velocity electrons is absorbed in said second phosphor, the resulting emission of the first color being a proper contribution to the white light mix, the average mass thickness of said certain amount of energy absorbing material being such that the second phosphor is so penetrated by said intermediate velocity electrons as to provide a proper contribution of the second color to the white light mix but with more of the energy of the intermediate velocity electrons absorbed in said certain amount of energy absorbing material than in said second phosphor, and the average mass thickness of the energy absorbing material between said third phosphor and the electron source being such than when penetrated by the comparatively high velocity electrons said third phosphor is penetrated by said electrons sufficiently to provide a proper contribution of the third color to the white light mix but with more of the energy of the comparatively high velocity electrons absorbed in said last-mentioned enregy absorbing material than in said third phosphor.

21. A color screen of the electron penetration type comprising a first phosphor in the form of discrete fine phosphor particles to be excited by comparatively low velocity electrons to emit light of a first color, a second phosphor in the form of discrete fine phosphor particles to be excited by intermediate velocity electrons to emit light of a second color, and a third phosphor to be excited by compartively high velocity electrons to emit light of a third color, the colors emitted by the phosphors each having a spectral distribution such that, in the absence of color signal modulation of the electrons, the colors may be added to give a light mix that is a white light, the second phosphor having a certain amount of electron energy absorbing material between it and the electron source, and the third phosphor having more electron energy absorbing material than said certain amount between it and the electron source, the second and third phosphors having a greater conversion efficiency than the effective conversion efficiency of the first phosphor, the average mass thickness of said certain amount of material being such that no more than a small part of the energy of the comparatively low velocity electrons is absorbed in said second phosphor, the resulting emission of the first color being a proper contribution to the white light mix, the average mass thickness of said certain amount of energy absorbing material being such that the second phosphor is so penetrated by said intermediate velocity electrons as to provide a proper contribution of the second color to the white light mix but with more of the energy of the intermediate velocity electrons absorbed in said certain amount of energy absorbing material than in said second phosphor, and the average mass thickness of the energy absorbing material between said third phosphor and the electron source being such that when penetrated by the comparatively high velocity electrons said third phosphor is penetrated by said electrons sufficiently to provide a proper contribution of the third color to the white light mix but with more of the energy of the comparatively high velocity electrons absorbed in said last-mentioned energy absorbing material than in said third phosphor, the conversion efficiency of the third phosphor and of the second phosphor both being enough greater than the effective conversion efficiency of the first phosphor so that when there is screen penetration only by said electrons of said comparatively high velocities there is produced a color that subjectively is said third color, and so that when there is screen penetration only by said electrons of said intermediate velocities there is produced a color that subjectively is said second color.

22. A cathode ray tube including an electron beam source and a multilayer screen comprising layers of red phosphor, separator, green phosphor, and separator on a blue phosphor base, all positioned in the direction of electron beam travel in the order named, said green and blue phosphors being more efficient than said red phosphor, said green phosphor layer having an average mass thickness that is less than that of said red phosphor layer, the efficiencies of the phosphors and the average mass thicknesses of the layers being in such ratios that, when the screen is operated to dissipate in the screen most of the beam energy for green light production and most of the beam energy for blue light production on the gun-side of the green phosphor layer and the blue phosphor base, respectively, the relative amounts of red, green, and blue light emitted are such as to produce a white light mixture.

23. In combination, a cathode ray tube having an electron gun that functions as a source of electrons, a color screen of the electron penetration type in said tube, said screen comprising a first phosphor to be excited by comparatively low velocity electrons from said source to emit light of a first color, a second phosphor to be excited by intermediate velocity electrons from said source to emit light of a second color, and a third phosphor to be excited by comparatively high velocity electrons from said source to emit light of a third color, the second phosphor having a certain amount of electron energy absorbing material between it and the electron source, and the third phosphor having more electron energy absorbing material than said certain amount between it and the electron source, the second and third phosphors each having a greater conversion efficiency than the effective conversion efficiency of the first phosphor, the average mass thickness of said certain amount of material being such that no more than a small part of the energy of the comparatively low velocity electrons is absorbed in said second phosphor, the average mass thickness of said certain amount of energy absorbing material being such that more of the energy of the intermediate velocity electrons is absorbed in said certain amount of energy absorbing material than in said second phosphor, the average mass thickness of the energy absorbing material between said third phosphor and the electron source being such that more of the energy of the comparatively high velocity electrons is absorbed in said last-mentioned energy absorbing material than in said third phosphor, means for producing a switching voltage, and means for imparting successively to said electrons said low, intermediate and high velocities as a function of the instantaneous voltage values of said switching voltage.

24. A single-gun cathode ray tube having a color screen designed to be operated by penetration of electron beams of three different voltage ranges and where the beams are to be modulated by a color television signal that includes a color subcarrier, means including said gun for producing successively an electron beam of a certain lowest voltage range, an electron beam of a higher middle voltage range, and an electron beam of a highest voltage range, means for producing said three different voltage range beams during one cycle of said subcarrier and in a predetermined phase relation thereto, said screen comprising a multitude of fractional areas each comprising a back or gunside phosphor layer that emits light of a certain color when excited by electrons, a middle phosphor layer that emits light of a different color when excited by electrons, and a base phosphor layer that emits light of a still different color when excited by electrons, layers of inert material between said phosphor layers and said base phosphor, said layers having a mass thickness such that when penetrated by said electron beam of highest voltage range the base phosphor is penetrated by said electron beam but with less of the electron energy absorbed in it than in the screen between said base phosphor and the gun-side surface of said screen, the screen layers between the middle phosphor layer and the gun-side surface of the screen having a mass thickness such that the middle phosphor layer is penetrated by said electron beam of middle voltage range but with less electron energy absorbed in it than in the layers between the middle phosphor layer and the gun-side surface of the screen, and the screen layers between the middle phosphor layer and the gun-side surface of the screen also having a mass thickness such that no more than a small part of the energy of said electron beam of lowest voltage range is absorbed in the middle phosphor layer, the conversion efficiency of the base phosphor and of the middle phosphor layer both being enough greater than the effective conversion efficiency of the gun-side phosphor layer so that when there is screen penetration only by said electron beam of highest voltage range there is produced a color that subjectively is said still different color, and so that when there is screen penetration only by said electron beam of the middle voltage range there is produced a color that subjectively is said different color, the relative conversion efficiencies of said phosphors also being such that during the cycle of producing successively said electron beams of the three different voltage ranges the three phosphor layers emit light in the correct relative proportions to give a white light mix in the absence of color modulation of said electron beams.

25. In combination, a cathode ray tube having an electron gun that functions as a source of electrons, a color screen of the electron penetration type is said tube, said screen comprising a first phosphor to be excited by comparatively low velocity electrons from said source to emit light of a first color, a second phosphor to be excited by intermediate velocity electrons from said source to emit light of a second color, and a third phosphor to be excited by comparatively high velocity electrons from said source to emit light of a third color, the second phosphor having a certain amount of electron energy absorbing material between it and the electron source, and the third phosphor having more electron energy absorbing material than said certain amount between it and the electron source, the second and third phosphors each having a greater conversion efficiency than the effective conversion efficiency of the first phosphor, the average mass thickness of said certain amount of energy absorbing material being such that most of the energy of the comparatively low velocity electrons is absorbed in said certain amount of energy absorbing material, the average mass thickness of said certain amount of energy absorbing material also being such that more of the energy of the intermediate velocity electrons is absorbed in said certain amount of energy absorbing material than in said second phosphor, the average mass thickness of the energy absorbing material between said third phosphor and the electron source being such that more of the energy of the comparatively high velocity electrons is absorbed in said last-mentioned energy absorbing material than in said third phosphor, switching voltage generating means which comprises means for producing and so combining a fundamental frequency voltage wave and a second harmonic voltage wave that the combined voltage wave has a substantially flat portion at an intermediate voltage value, said combined voltage wave being the desired switching voltage, and means for imparing successively to said electrons said low, said intermediate and said high velocities as a function of the instantaneous voltage value of said switching voltage.

26. In combination, a cathode ray tube having three electron guns that function as a source of electrons, a color screen of the electron penetration type comprising a first material to be excited by comparatively low velocity electrons from one of said guns to emit light of a first color, a second material to be excited by intermediate velocity electrons from another of said guns to emit light of a second color, and a third material to be excited by comparatively high velocity electrons from still another of said guns to emit light of a third color, the colors emitted by the excited materials each having a spectral distribution such that, in the absence of color signal modulation of the electrons, the colors may be added to give a light mix that is a white light, the second material having a centain amount of electron energy absorbing material between it and the electron source, and the third material having more electron energy absorbing material than said certain amount between it and the electron source, the second and third materials each having a greater conversion efficiency than the effective conversion efficiency of the first material, the average mass thickness of said certain amount of material being such that no more than a small part of the energy of the comparatively low velocity electrons is absorbed in said second material, the resulting emission of the first color being a proper contribution to the white light mix, the average mass thickness of said certain amount of energy absorbing material also being such that the second material is so penetrated by said intermediate velocity electrons as to provide a proper contribution of the second color to the white light mix but with more of the energy of the intermediate velocity electrons absorbed in said certain amount of energy absorbing material than in said second material, and the average mass thickness of the energy absorbing material between said third material and the electron source being such that when penetrated by the comparative high velocity electrons said third material is penetrated by said electrons sufficiently to provide a proper contribution of the third color to the white light mix but with more of the energy of the comparatively high velocity electrons absorbed in said last-mentioned energy absorbing material than in said third material, the conversion efficiency of the third material and of the second material both being enough greater than the effective conversion efficiency of the first material so that when there is screen penetration only by said electrons of said comparatively high velocities there is produced a color that subjectively is said third color, and so that when there is screen penetration only by said electrons of said intermediate velocities there is produced a color that subjectively is said second color.

27. A multi-gun cathode ray tube having a color screen designed to be operated by selective penetration of electrons of three different velocities, means including one of said guns for producing electrons of a comparatively low velocity, means including another of said guns for producing electrons of an intermediate velocity, means including still another of said guns for producing electrons of a comparatively high velocity, said screen comprising a multitude of fractional areas each of which comprises a bad or gun-side phosphor layer that emits light of a certain color when excited by electrons, a middle phosphor layer that emits light of a different color when excited by electrons, and a base phosphor that emits light of a still different color when excited by electrons, layers of inert material between said phosphor layers and said base phosphor, said layers having a mass thickness such that when penetrated by said electrons of comparatively high velocity the base phosphor is penetrated by said electrons but with less electron energy absorbed in it than in the screen between said base phosphor and the gun-side surface of said screen, the screen layers between the middle phosphor layer and the gun-side surface of the screen having a mass thickness such that the middle phosphor layer is penetrated by said electrons of the intermediate velocity but with less electron energy absorbed in it than in the layers between the middle phosphor layer and the sun-side surface of the screen, and the gun-side phosphor layer and the adjacent layer of inert material also having a mass thickness such that the greater part of the energy of said electrons of the comparatively low velocity is absorbed in the screen layers between the middle phosphor layer and the gun-side surface of the screen, the conversion efficiency of the base phosphor and of the middle phosphor layer both being enough greater than the effective conversion efficiency of the gun-side phosphor layer so that when there is screen penetration only by said electrons of the comparatively high velocity there is produced a color that subjectively is said still different color, and so that when there is screen penetration only by said electrons of the intermediate velocity there is produced a color that subjectively is said different color, the relative conversion efficiencies of said phosphors also being such that with said electrons of the three different velocities impinging simultaneously on said screen the three phosphor layers emit light in the correct relative proportions to give a white light mix in the absence of color modulation of said cathode ray tube.

28. A color screen of the electron penetration type comprising a first material to be excited by comparatively low velocity electrons to emit light of a first color and a second material to be excited by higher velocity electrons to emit light of a second color, there being a certain amount of electron energy absorbing material between said second material and the electron source, the second material having a greater effective conversion efficiency than the effective conversion efficiency of the first material, the average mass thickness of said certain amount of energy absorbing material being such that more of the energy of the higher velocity electrons is absorbed in said certain amount of energy absorbing material than in said second material, the mass thickness of said certain amount of energy absorbing material and the effective conversion efficiencies also being such that a sufficient amount of the energy of said higher velocity electrons is absorbed in said second material to give light therefrom that is subjectively said second color.

29. A color screen of the electron penetration type comprising a first material to be excited by comparatively low velocity electrons to emit light of a first color and a second material to be excited by higher velocity electrons to emit light of a second color, there being a certain amount of electron energy absorbing material between said second material and the electron source, the second material having a greater effective conversion efficiency than the effective conversion efficiency of the first material, the light from each of said electron excited materials having spectral distributions such that the lights from the excited materials may be added to give a desired light mix in the absence of color modulation of the electrons, the average mass thickness of said certain amount of energy absorbing material being such that more of the energy of the higher velocity electrons is absorbed in said certain amount of energy absorbing material than in said second material, the average mass thickness of said certain amount of energy absorbing material and the effective conversion efficiencies also being such that a sufficient and correct amount of the energy of said higher velocity electrons is absorbed in said second material to give the necessary and correct amount of light therefrom to contribute its proper amount of light for said desired light mix.

30. A color screen of the electron penetration type comprising a first material to be excited by comparatively low velocity electrons to emit light of a first color, a second material to be excited by higher velocity electrons to emit light of a second color, and a third material to be excited by still higher velocity electrons to emit light of a third color, there being a certain amount of electron energy absorbing material between said second material and the electron source, there being more electron absorbing material than said certain amount between said third material and the electron source, the second material and the third material each having a greater effective conversion efficiency than the effective conversion efficiency of the first material, the light from each of said electron excited materials having spectral distributions such that the lights from the excited material may be added to give a desired light mix such as one that is a white light, in the absence of color modulation of the electrons, the average mass thickness of said certain amount of energy absorbing material being such that more of the energy of the higher velocity electrons is absorbed in said certain amount of energy absorbing material than in said second material, the average mass thickness of said certain amount of energy absorbing material and the effective conversion efficiencies of said first and second materials also being such that a sufficient and correct amount of the energy of said higher velocity of electrons is absorbed in said second material to give the necessary and correct amount of light therefrom to contribute its proper amount of light for said desired light mix, the average mass thickness of the energy absorbing material between said third material and the electron source being such that more of the energy of the still higher velocity electrons is absorbed in said last-mentioned energy absorbing material than in said third material, and the average mass thickness of the energy absorbing material between said third material and the election source and the effective conversion efficiencies of said first, second and third materials also being such that a sufficient and correct amount of the energy of said still higher velocity electrons is absorbed in said third material to give the necessary and correct amount of light therefrom to contribute its proper amount of light for said desired light mix.

References Cited by the Examiner

UNITED STATES PATENTS

| | | | |
|---|---|---|---|
| 2,303,563 | 12/42 | Law | 313—92 |
| 2,446,248 | 8/48 | Shrader | 313—92.5 |
| 2,455,710 | 12/48 | Szegho | 178—5.4 |
| 2,461,515 | 2/49 | Bronwell | 313—92.5 X |
| 2,566,713 | 9/51 | Zworykin | 313—92.5 X |
| 2,580,073 | 12/51 | Burton | 313—92.5 X |
| 2,590,018 | 3/52 | Koller et al. | 313—92.5 |
| 2,704,783 | 3/55 | Sziklai | 178—5.4 |
| 2,730,653 | 1/56 | Schagen | 178—5.4 X |
| 2,795,730 | 6/57 | Fromm et al. | 315—21 |
| 2,836,715 | 5/58 | Spielberg | 328—28 |
| 2,848,530 | 8/58 | Schmalz et al. | 178—5.4 |
| 2,863,048 | 12/58 | Theall et al. | 328—31 |
| 2,943,232 | 6/60 | Roberts | 313—92 X |
| 2,958,002 | 10/60 | Cusano et al. | 315—21 |
| 2,967,262 | 1/61 | Madey | 313—92 X |

FOREIGN PATENTS

| | | |
|---|---|---|
| 1,258,225 | 3/61 | France. |

DAVID G. REDINBAUGH, *Primary Examiner.*

ROBERT SEYAL, *Examiner.*

UNITED STATES PATENT OFFICE

CERTIFICATE OF CORRECTION

Patent No. 3,204,143 August 31, 1965

Dalton H. Pritchard

It is hereby certified that error appears in the above numbered patent requiring correction and that the said Letters Patent should read as corrected below.

Column 4, lines 73 and 74, for "FIG. 9b is a group of graphs based on electron beam sorption" read -- FIG. 9a is a graph showing electron beam energy absorption --; column 19, line 16, for "It is known that to obtain white light (C-illuminant)" read -- It is now assumed that 40 percent of the total beam --; column 21, lines 44 to 46, for that portion of the equation reading $E_r{}^w \frac{1}{2\pi}$ read $E_r^w = \frac{1}{2\pi}$ column 62, line 51, for "39" read -- 93 --; column 70, line 57, for "base" read -- back --; column 78, line 29, for "election" read -- electron --.

Signed and sealed this 17th day of January 1967.

(SEAL)
Attest:

ERNEST W. SWIDER
Attesting Officer

EDWARD J. BRENNER
Commissioner of Patents

UNITED STATES PATENT OFFICE

CERTIFICATE OF CORRECTION

Patent No. 3,204,143

August 31, 1965

Dalton H. Pritchard

It is hereby certified that error appears in the above numbered patent requiring correction and that the said Letters Patent should read as corrected below.

Column 4, lines 73 and 74, for "FIG. 9b is a group of graphs based on electron beam sorption" read -- FIG. 9a is a graph showing electron beam energy absorption --; column 19, line 16, for "It is known that to obtain white light (C-illuminant)" read -- It is now assumed that 40 percent of the total beam --; column 21, lines 44 to 46, for that portion of the equation reading $E_r^w \frac{1}{2\pi}$ read $E_r^w = \frac{1}{2\pi}$ column 62, line 51, for "39" read -- 93 --; column 70, line 57, for "base" read -- back --; column 78, line 29, for "election" read -- electron --.

Signed and sealed this 17th day of January 1967.

(SEAL)
Attest:

ERNEST W. SWIDER
Attesting Officer

EDWARD J. BRENNER
Commissioner of Patents